United States Patent
Davis et al.

(10) Patent No.: US 10,348,102 B2
(45) Date of Patent: Jul. 9, 2019

(54) MAGNETIC CAPACITOR ENERGY MODULE AND APPLICATIONS THEREOF

(71) Applicants: Walter Lee Davis, Rogersville, MO (US); Timothy W. Markison, Mesa, AZ (US)

(72) Inventors: Walter Lee Davis, Rogersville, MO (US); Timothy W. Markison, Mesa, AZ (US)

( * ) Notice: Subject to any disclaimer, the term of this patent is extended or adjusted under 35 U.S.C. 154(b) by 423 days.

(21) Appl. No.: 14/830,707

(22) Filed: Aug. 19, 2015

(65) Prior Publication Data

US 2016/0149417 A1 May 26, 2016

Related U.S. Application Data

(60) Provisional application No. 62/039,636, filed on Aug. 20, 2014.

(51) Int. Cl.
*H02J 7/00* (2006.01)
*H02J 7/04* (2006.01)
*H02J 7/34* (2006.01)

(52) U.S. Cl.
CPC ............ *H02J 7/0021* (2013.01); *H02J 7/008* (2013.01); *H02J 7/0018* (2013.01); *H02J 7/0019* (2013.01); *H02J 7/045* (2013.01); *H02J 7/0004* (2013.01); *H02J 7/345* (2013.01); *Y02T 10/7055* (2013.01)

(58) Field of Classification Search
CPC .................................................. B60L 11/1809
USPC ........................................................ 320/101
See application file for complete search history.

(56) References Cited

U.S. PATENT DOCUMENTS

| | | | |
|---|---|---|---|
| 2009/0141423 A1 | 6/2009 | Lai | |
| 2011/0013339 A1 | 1/2011 | Lai et al. | |
| 2012/0012456 A1* | 1/2012 | Darrel | C25B 1/04 204/278 |
| 2013/0264870 A1* | 10/2013 | Keysar | H02J 1/00 307/24 |
| 2014/0225581 A1* | 8/2014 | Giuliano | H02M 3/07 323/282 |

FOREIGN PATENT DOCUMENTS

CN 202076852 U * 12/2011

* cited by examiner

*Primary Examiner* — Suresh Memula
(74) *Attorney, Agent, or Firm* — Garlick & Markison; Timothy W. Markison

(57) ABSTRACT

An energy module includes a capacitance-based power source structure, charging circuitry, a DC-to-DC conversion system, and an energy control module. The capacitance-based power source structure is operable to supply a voltage when the energy module is in a voltage supply mode, wherein, when substantially fully charged, the voltage is at least 48 volts and to receive a charge when the energy module is in a charge mode. The charging circuitry is operable to provide a regulated charge voltage to the capacitance-based power source structure when the energy module is in the charge mode. The DC-to-DC conversion system is operable to convert the voltage into one or more regulated supply voltages when the energy module is in the voltage supply mode. The energy control module is operable to determine the voltage supply mode and the charge mode.

4 Claims, 65 Drawing Sheets

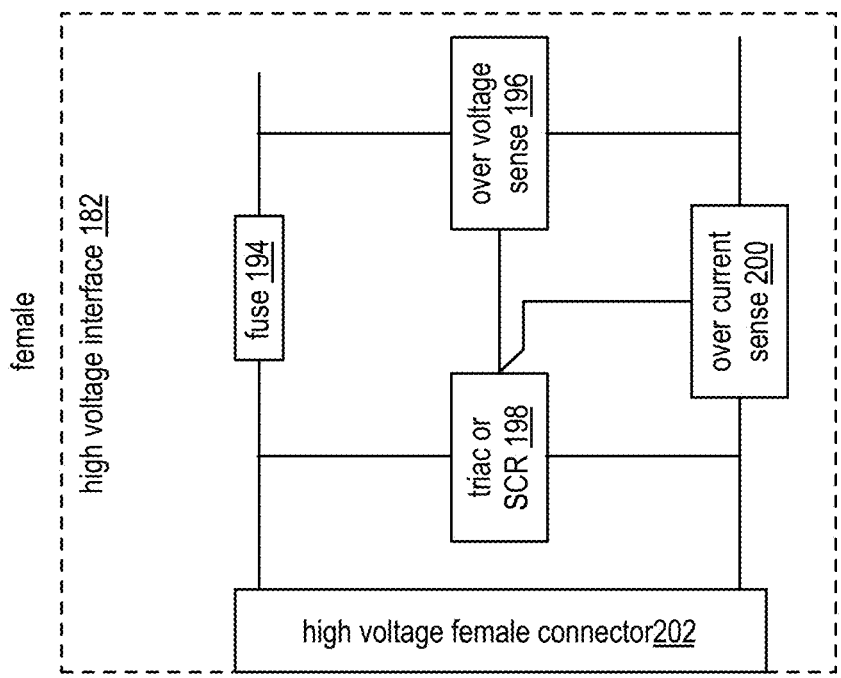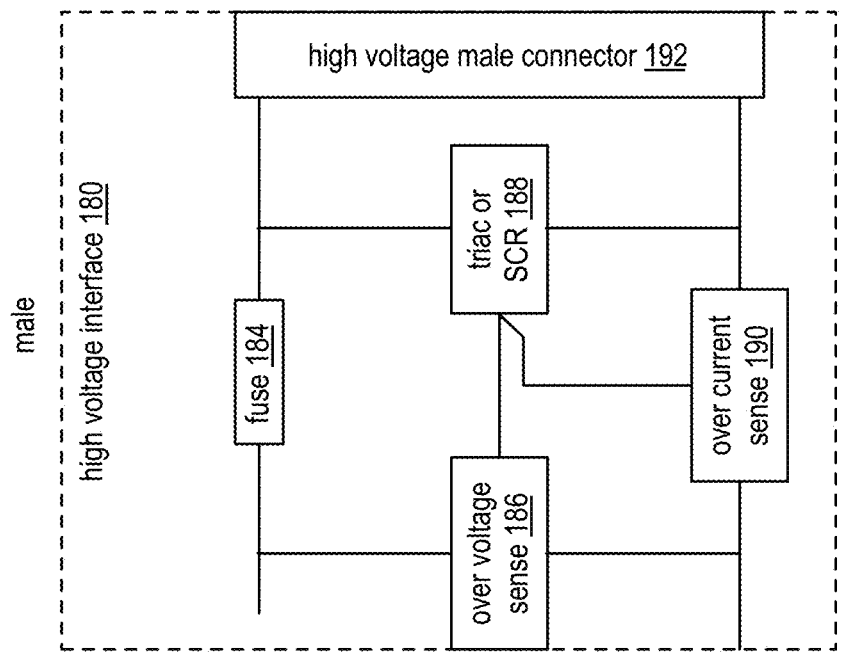
FIG. 44

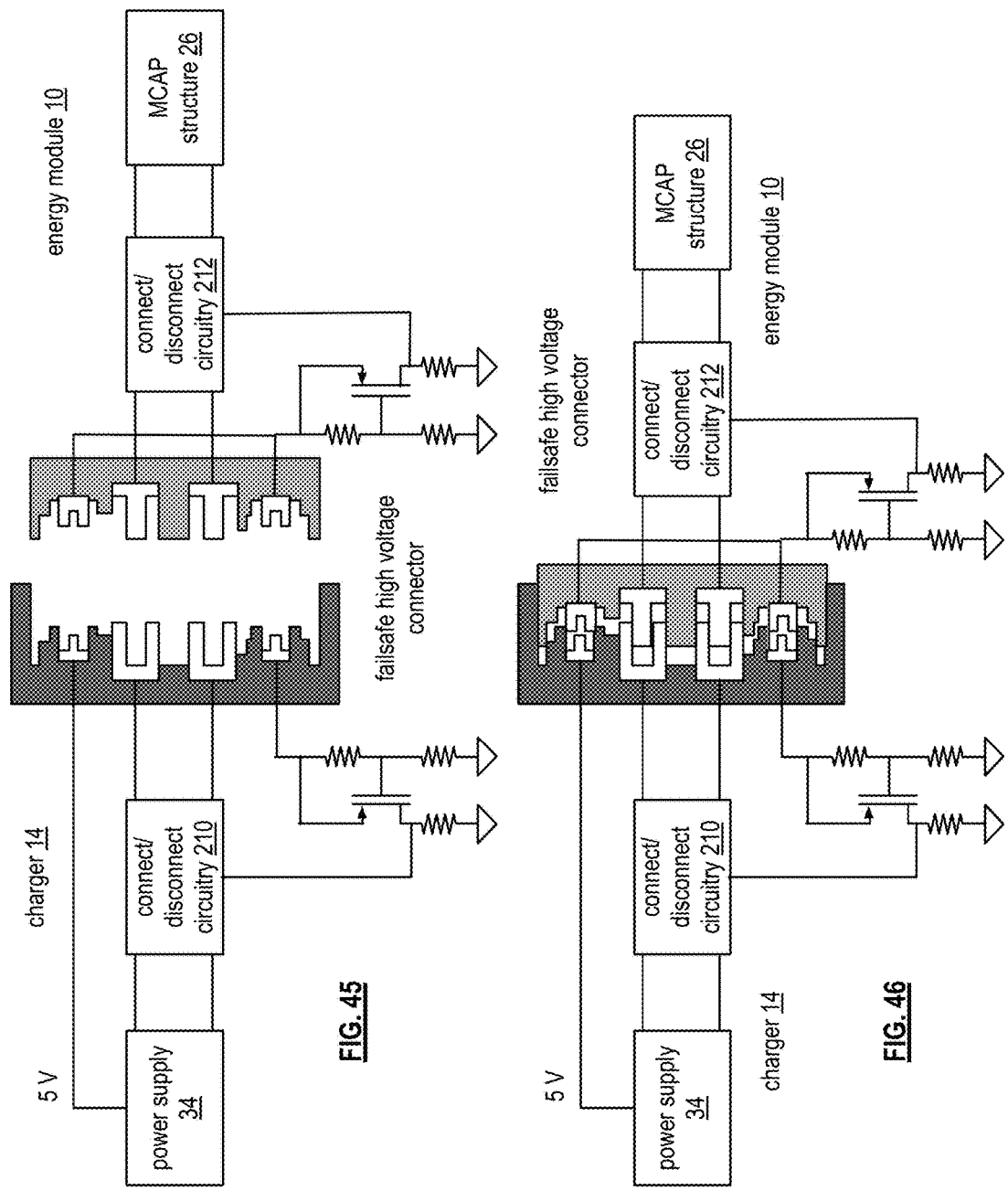

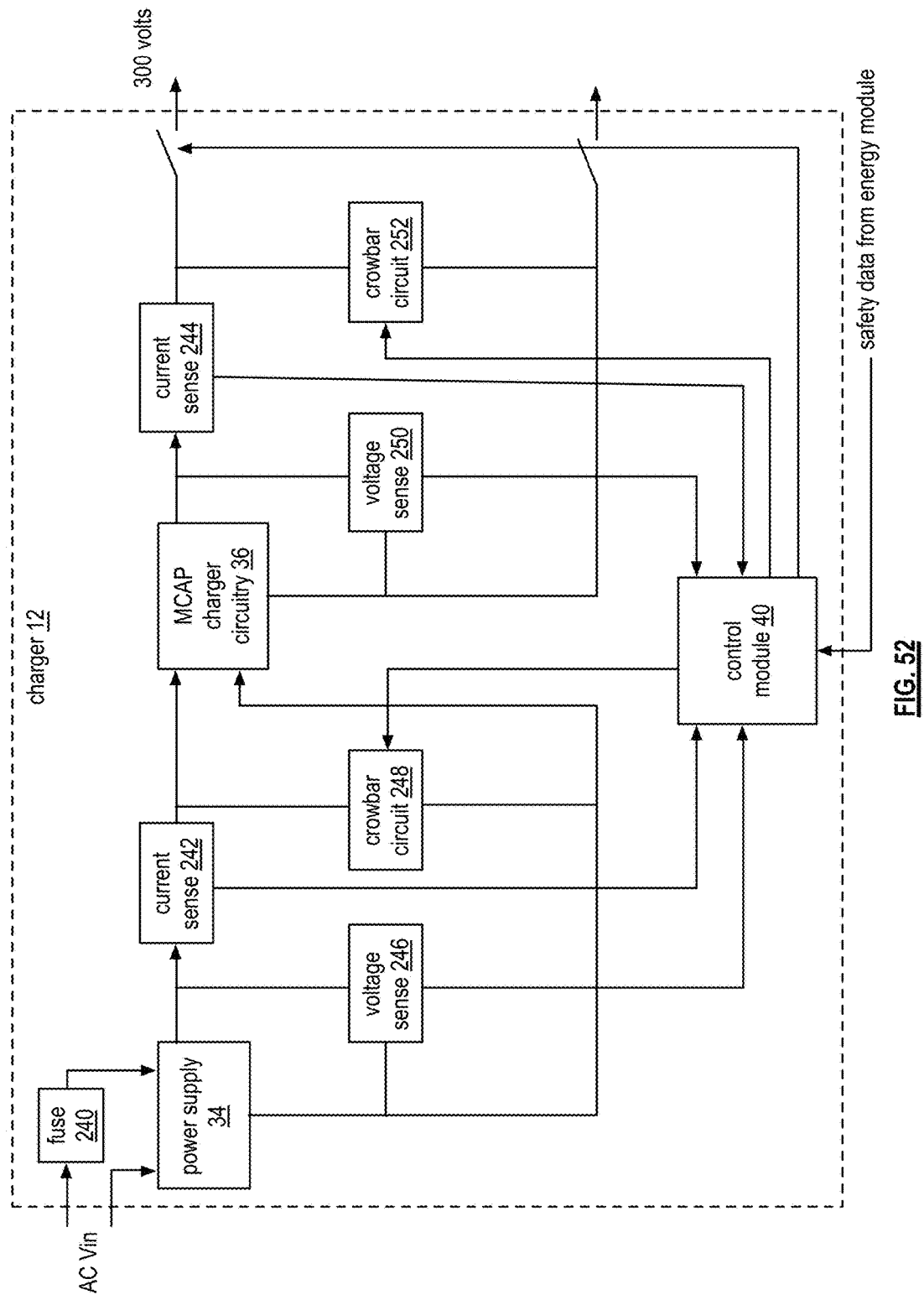

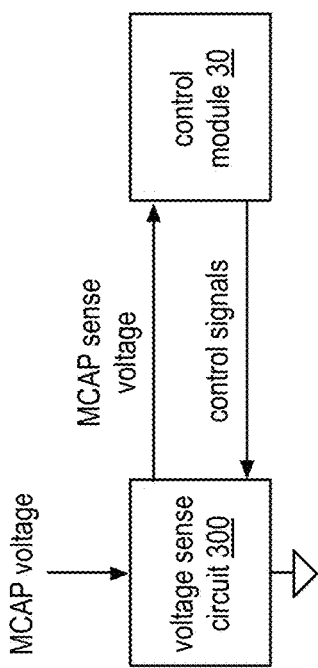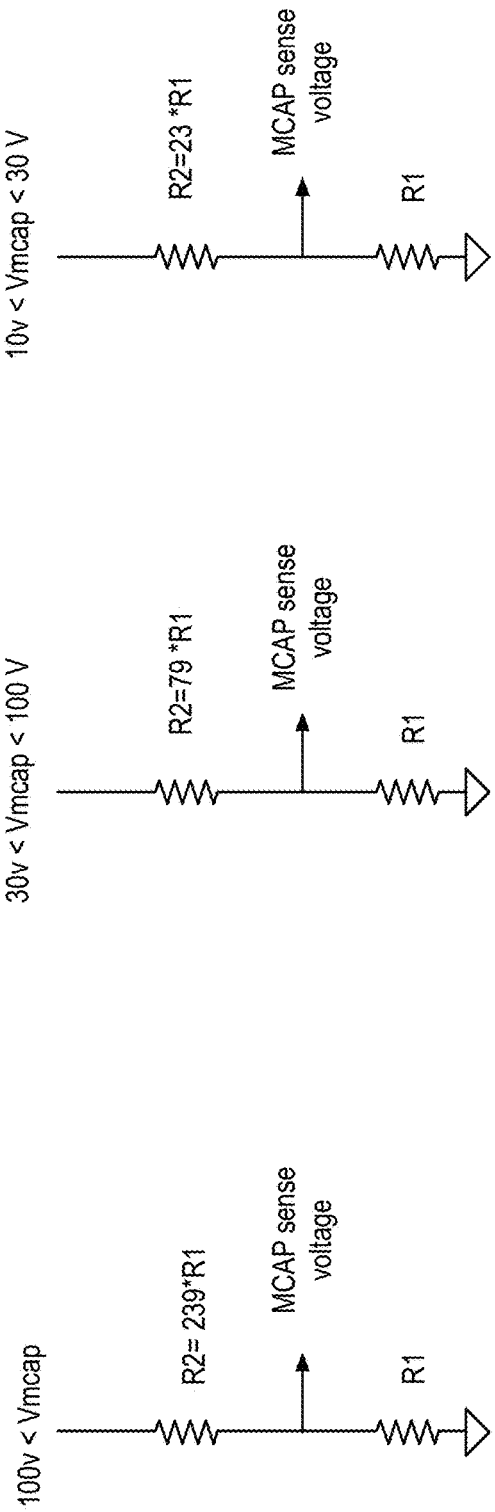

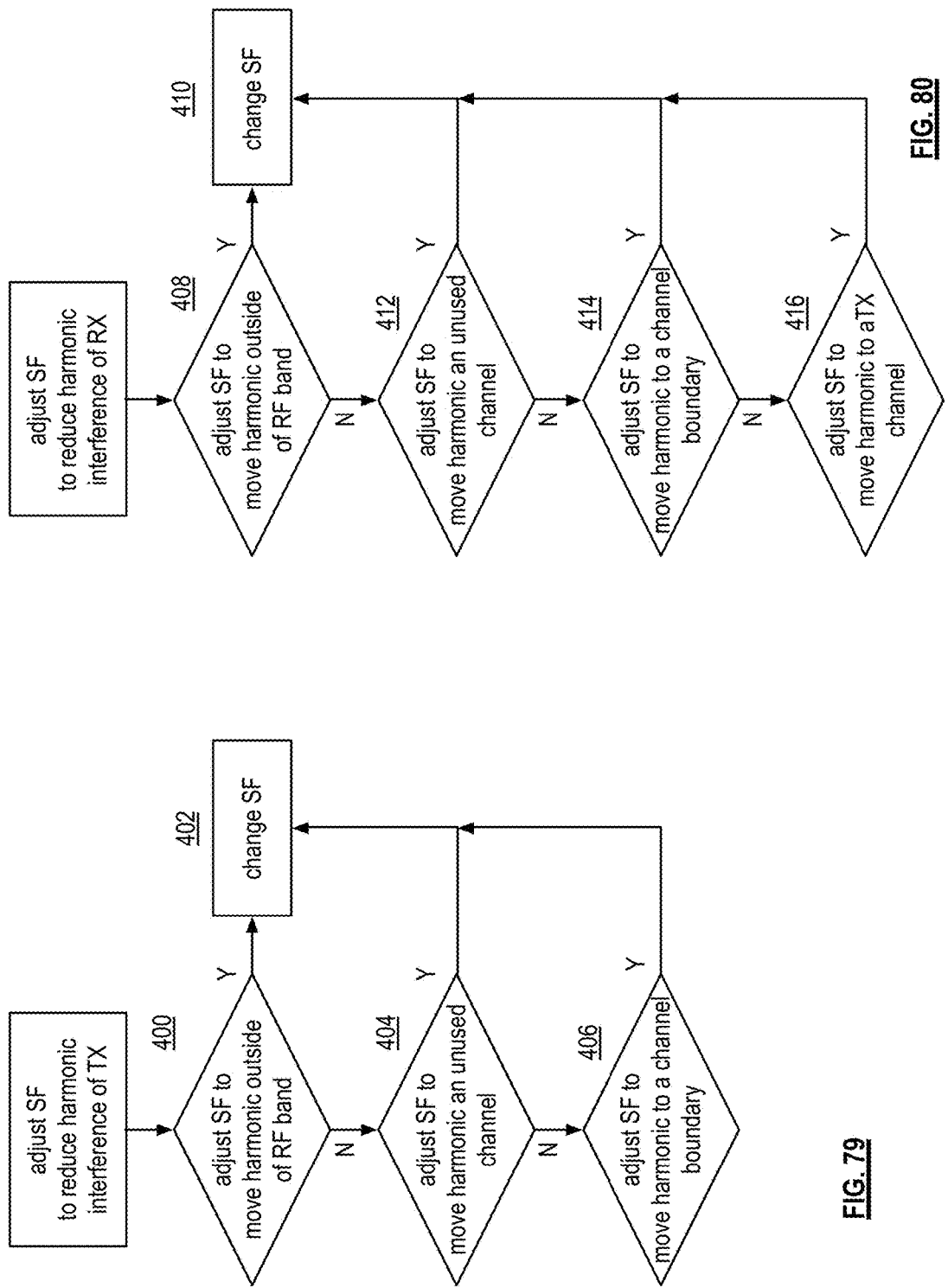

US 10,348,102 B2

MAGNETIC CAPACITOR ENERGY MODULE AND APPLICATIONS THEREOF

CROSS REFERENCE TO RELATED PATENTS

The present U.S. Utility patent application claims priority pursuant to 35 U.S.C. § 119(e) to U.S. Provisional Application No. 62/039,636, entitled "MAGNETIC CAPACITOR ENERGY MODULE AND APPLICATIONS THEREOF", filed Aug. 20, 2014, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention is related to energy storage devices and applications thereof and more particularly to magnetic capacitor energy modules and applications thereof.

Description of Related Art

There are a variety of types of electrical energy storage devices including rechargeable batteries, batteries, electrochemical accumulators, electrolytic capacitors, and electrochemical capacitors (i.e., super capacitors or ultra capacitors). Such electrical energy storage devices are used in a wide variety of applications ranging from portable electronic devices to electric vehicles to alternative power sources. For example, rechargeable batteries are used in cellular telephones, in electric cars, toys, etc.

An electrochemical capacitor, or super capacitor, is a pseudo-hybrid of a conventional capacitor (e.g., an electrolytic capacitor) and a rechargeable battery. In particular, a super capacitor does not have a conventional solid dielectric of an electrolytic capacitor, but includes an electrochemical core that allows the super capacitor to be charged and discharged much faster than a rechargeable battery. Further, the electrochemical core allows the super capacitor to be recharged significantly more times than a rechargeable battery.

While a super capacitor has about 10% of the energy density of a rechargeable battery, it has about 10 to 100 times the power density. Since a super capacitor is a low voltage device (e.g., less than 5 volts), it may be used as an alternative electric power source to that of a rechargeable battery in some low voltage applications.

BRIEF DESCRIPTION OF THE SEVERAL VIEWS OF THE DRAWING(S)

FIG. 44 is a schematic block diagram of an embodiment of a high voltage interface between an energy module and another unit in accordance with the present invention;

FIG. 45 is a schematic block diagram of an embodiment of a high voltage interface between an energy module and an energy module charger in accordance with the present invention;

FIG. 46 is a schematic block diagram of another embodiment of a high voltage interface between an energy module and an energy module charger in accordance with the present invention;

FIG. 52 is a schematic block diagram of an embodiment of an energy module charger in accordance with the present invention;

FIG. 59 is a schematic block diagram of an embodiment of an energy module voltage sensing circuit in accordance with the present invention;

Figure 62:
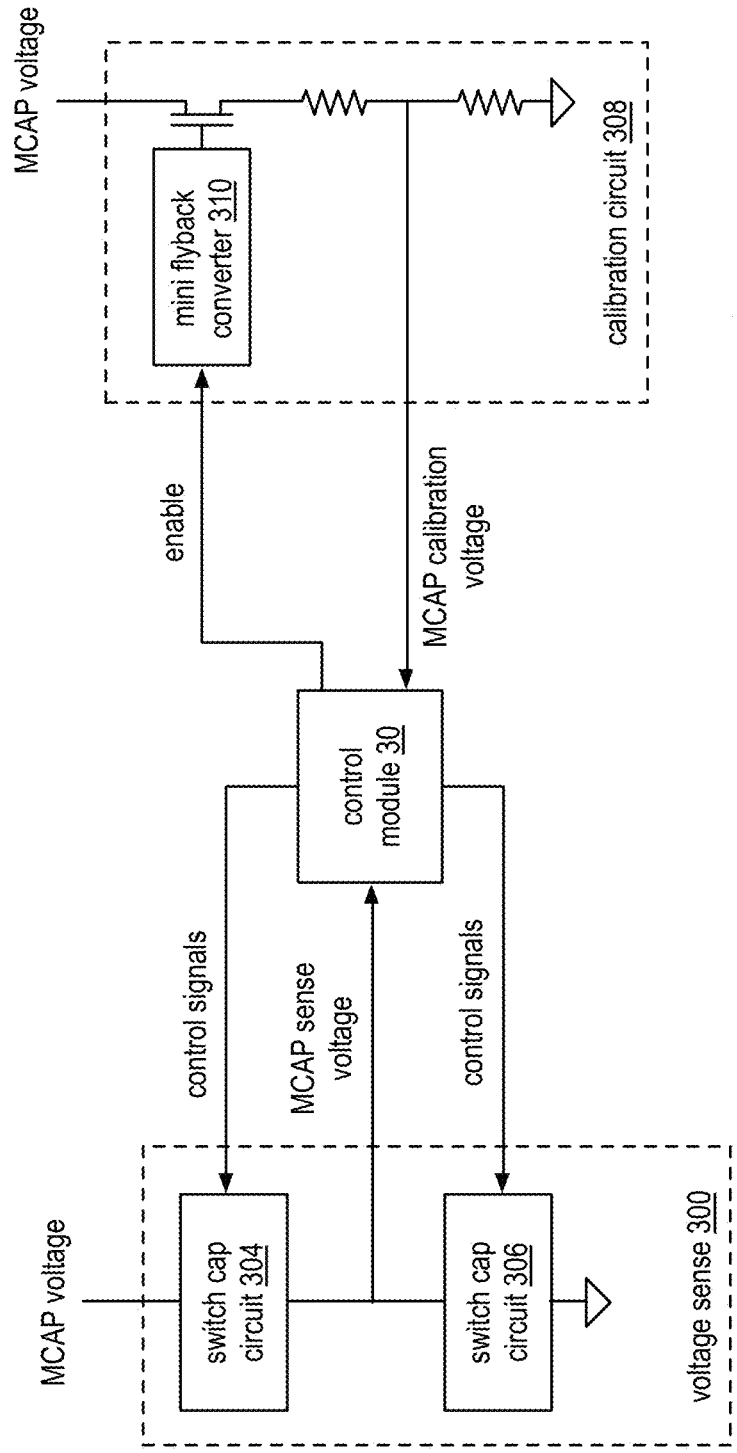
Figure 63:
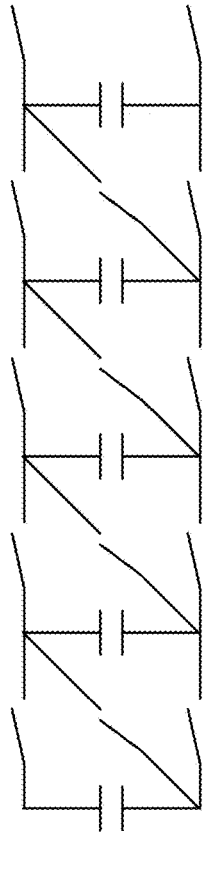
Figure 64:
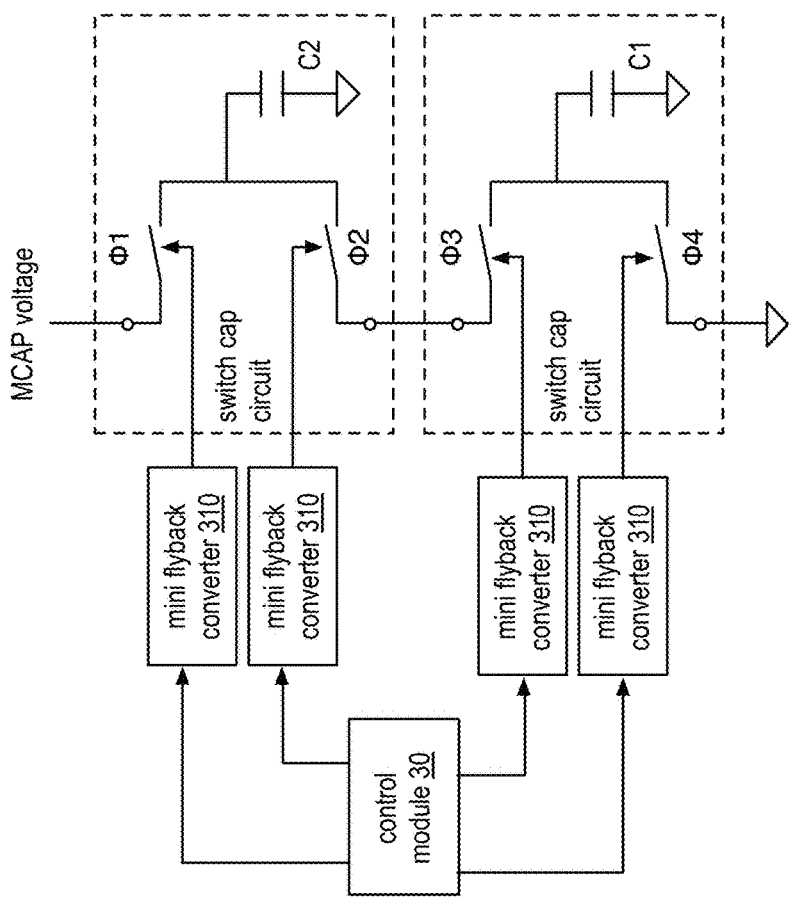
Figure 65:
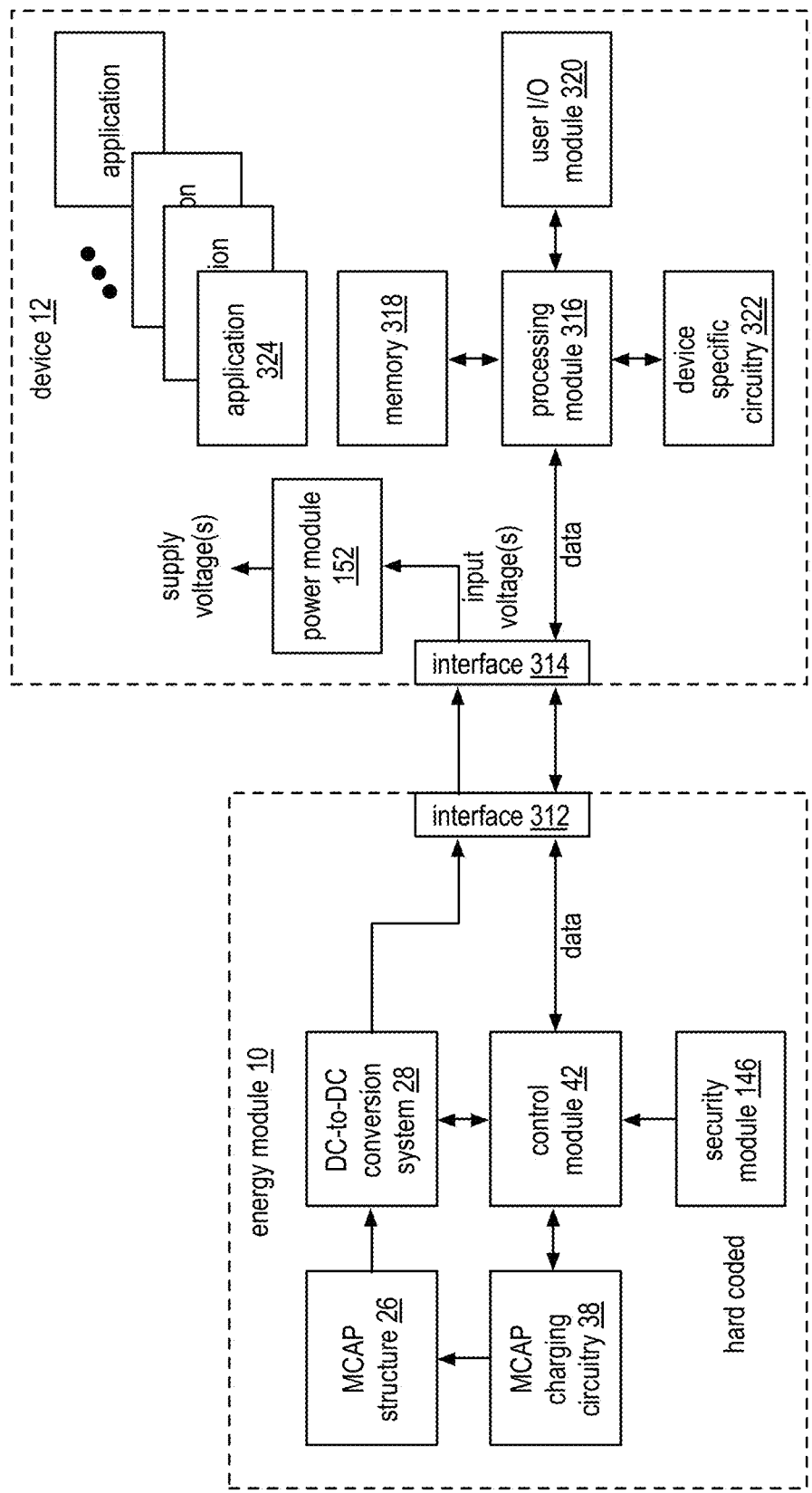
Figure 66:
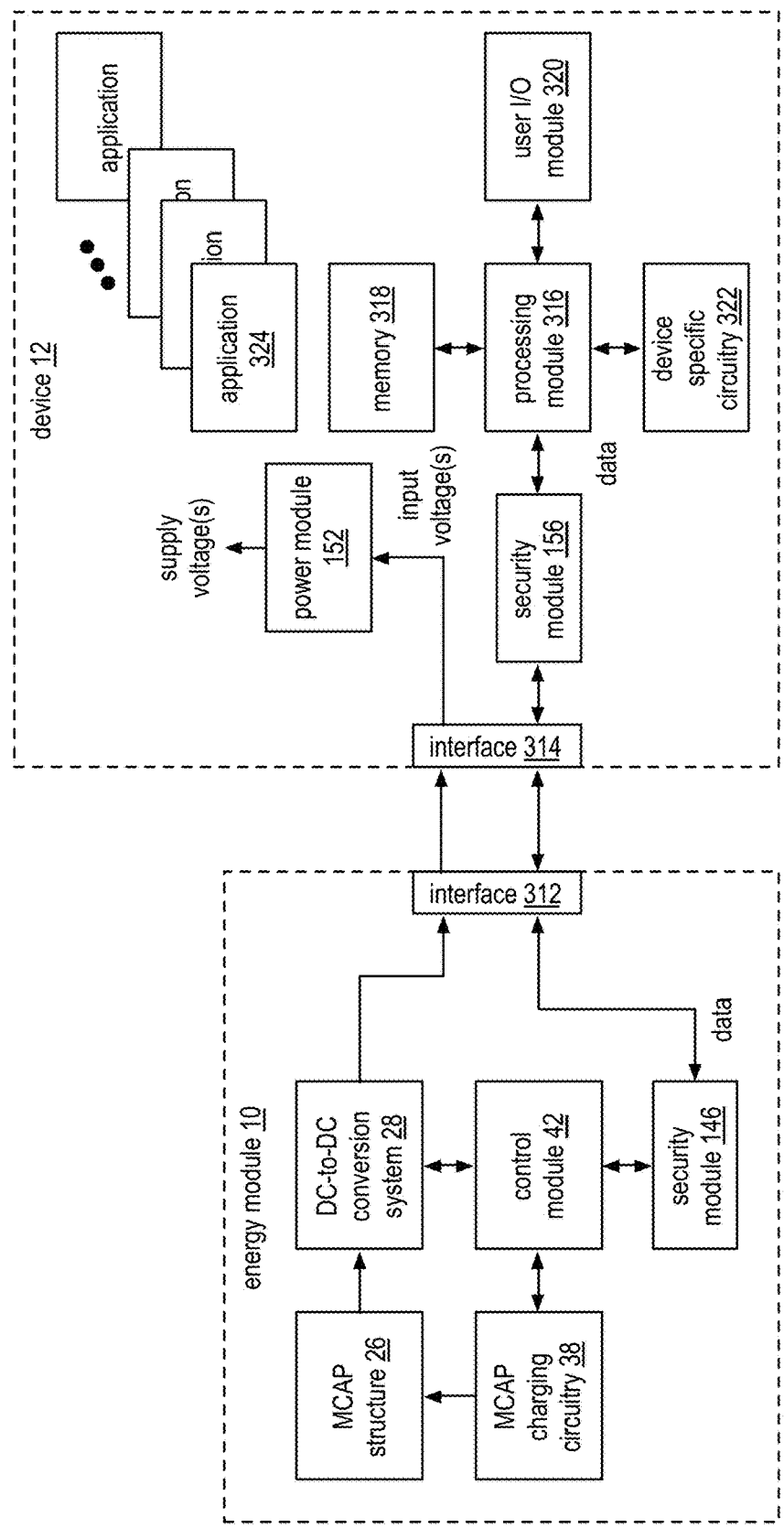
Figure 67:
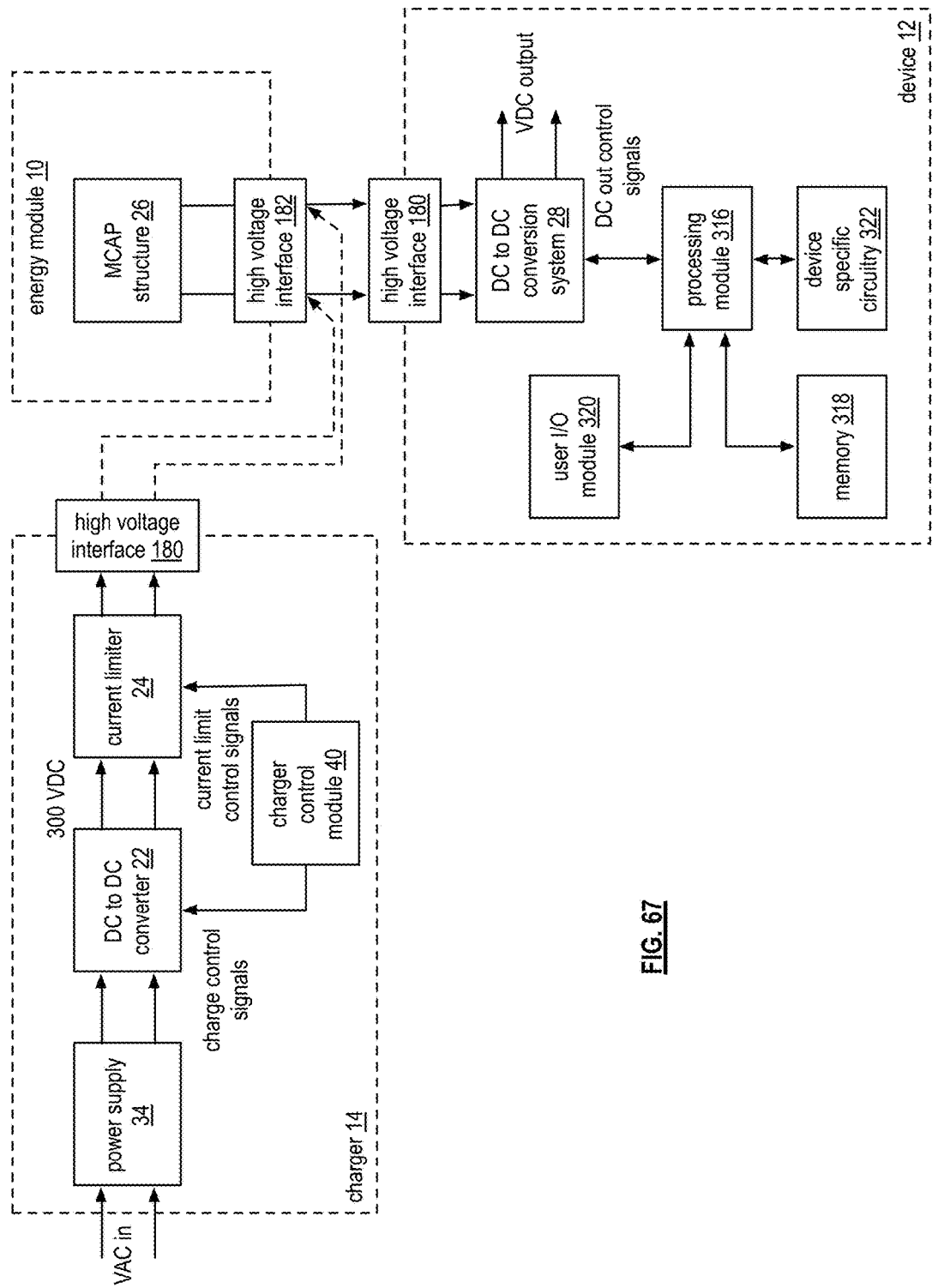
Figure 68:
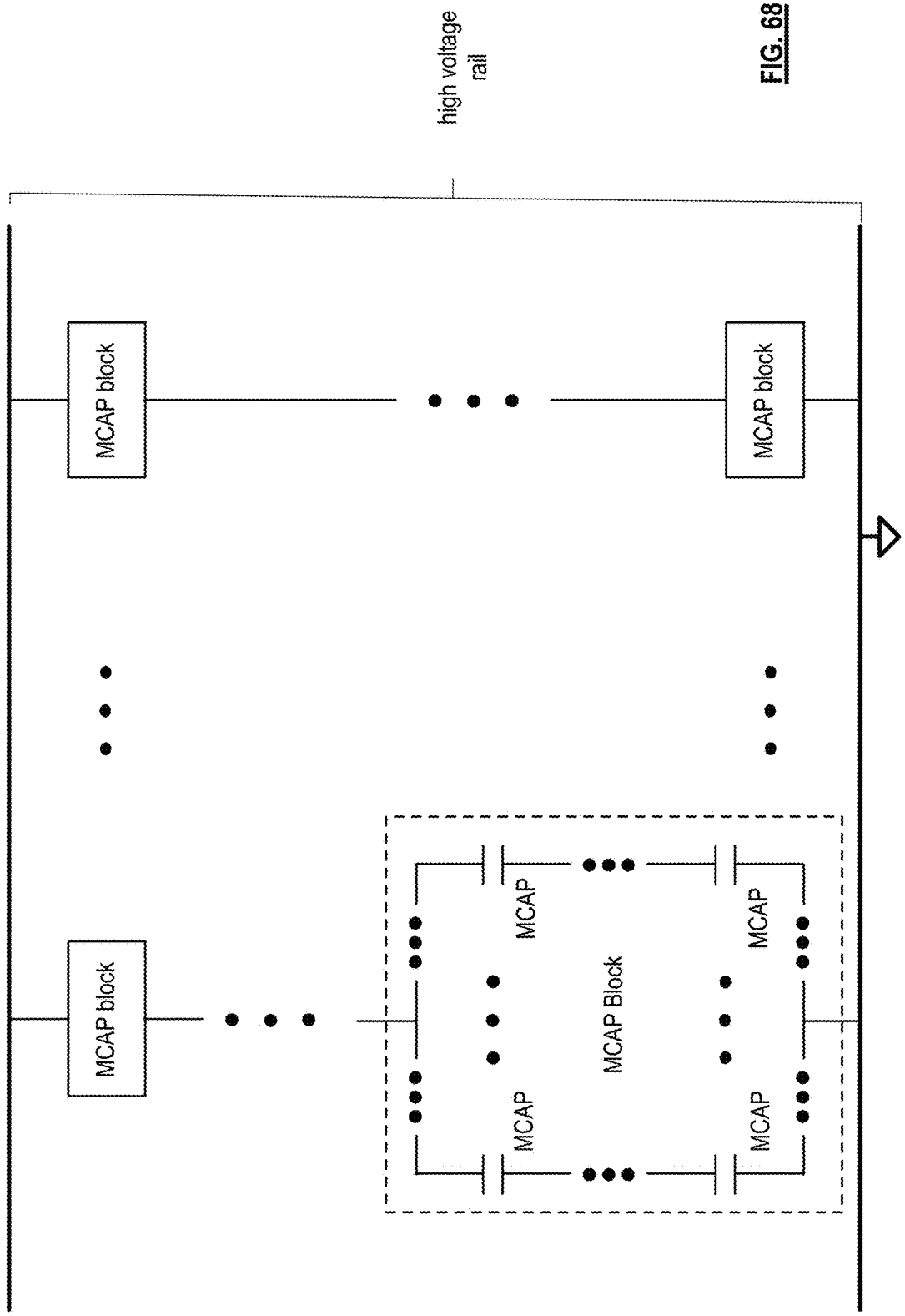
Figure 69:
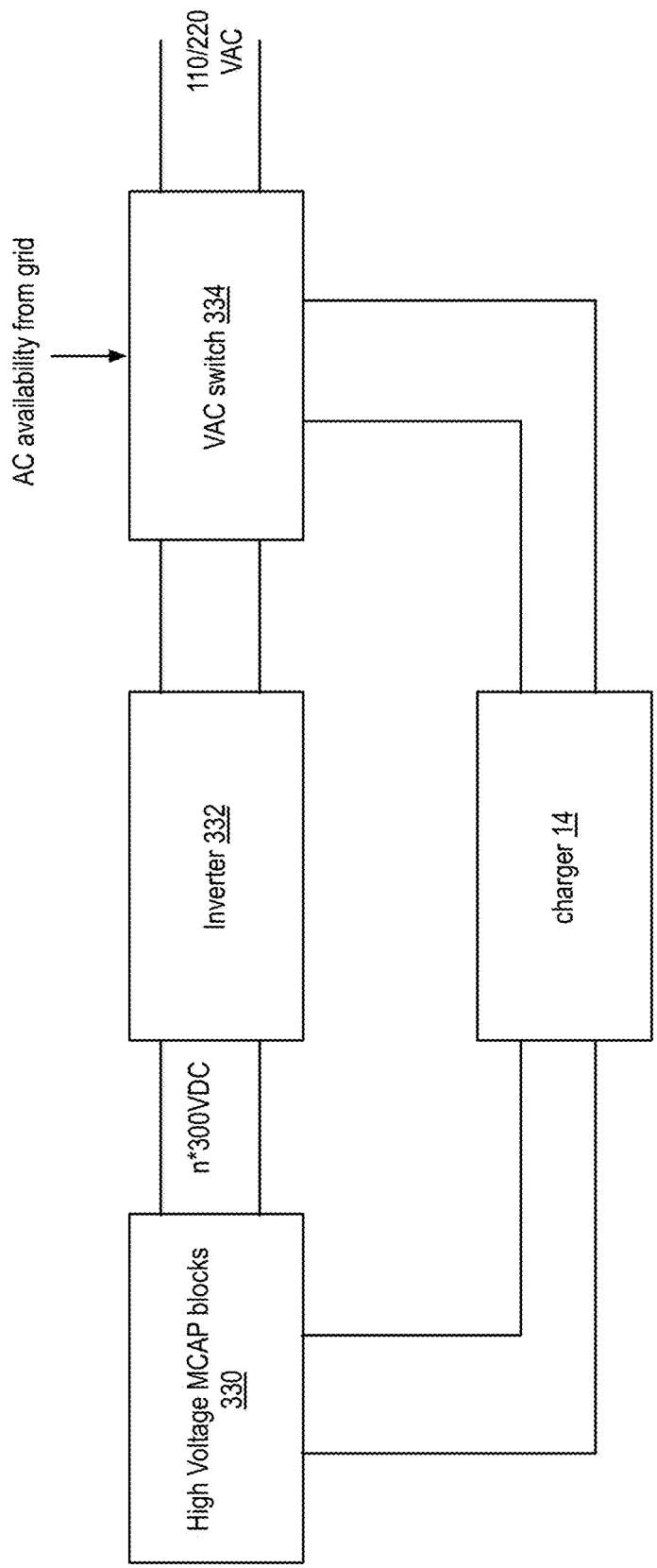
Figure 70:
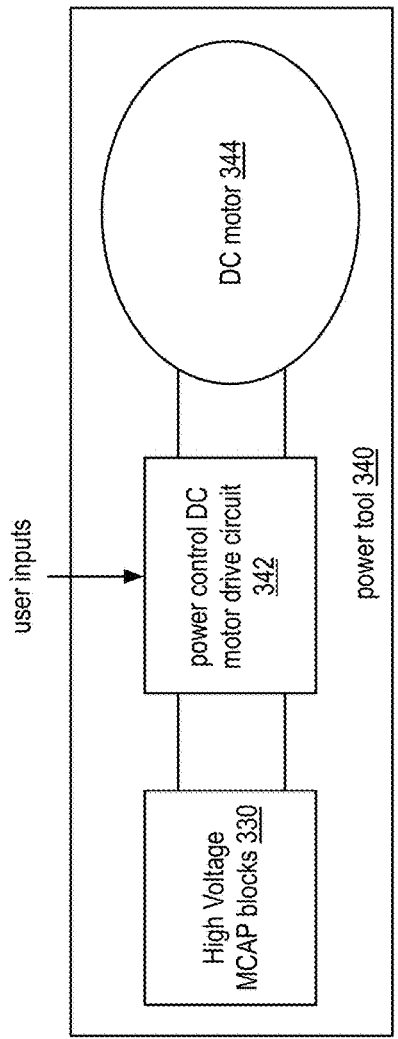
Figure 71:
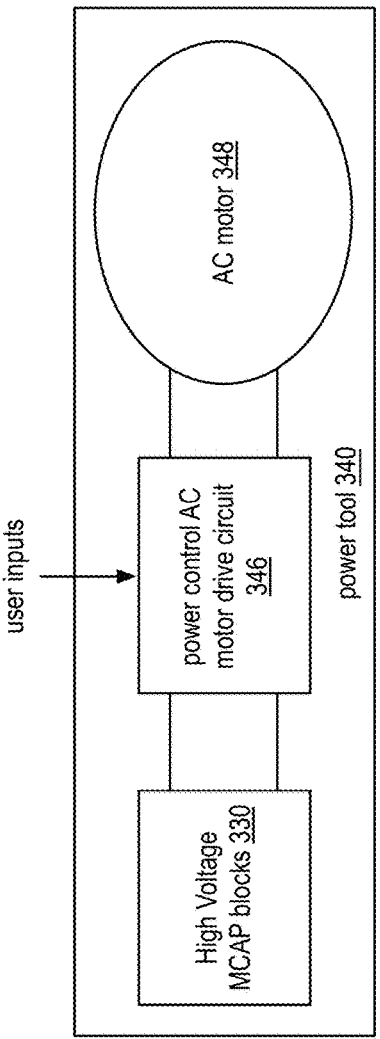
Figure 72:
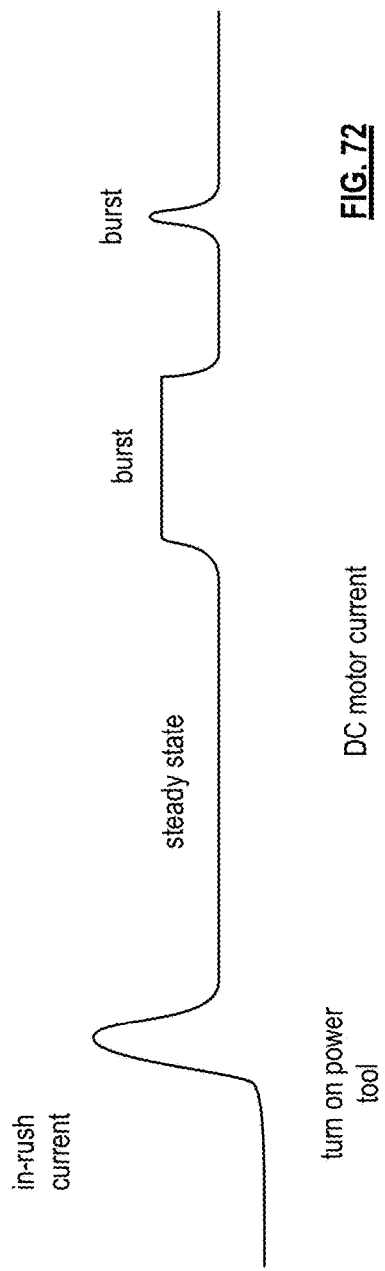
Figure 73:
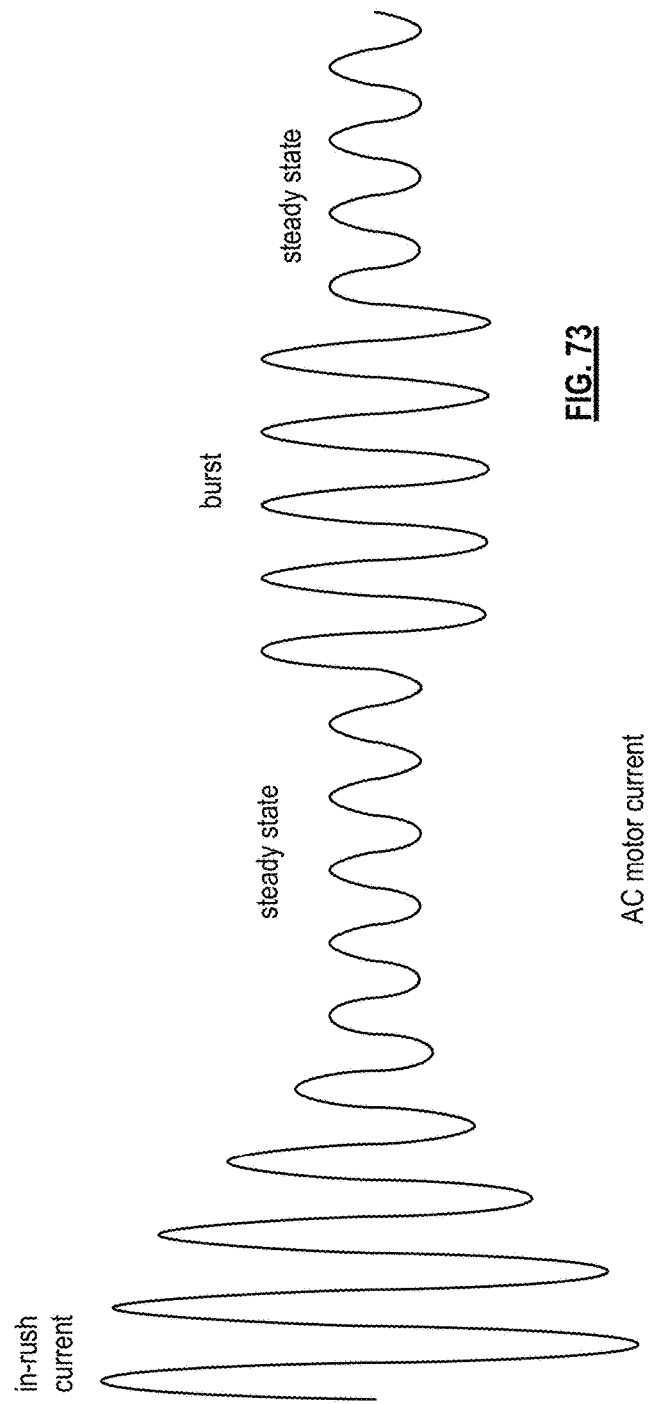
Figure 74:
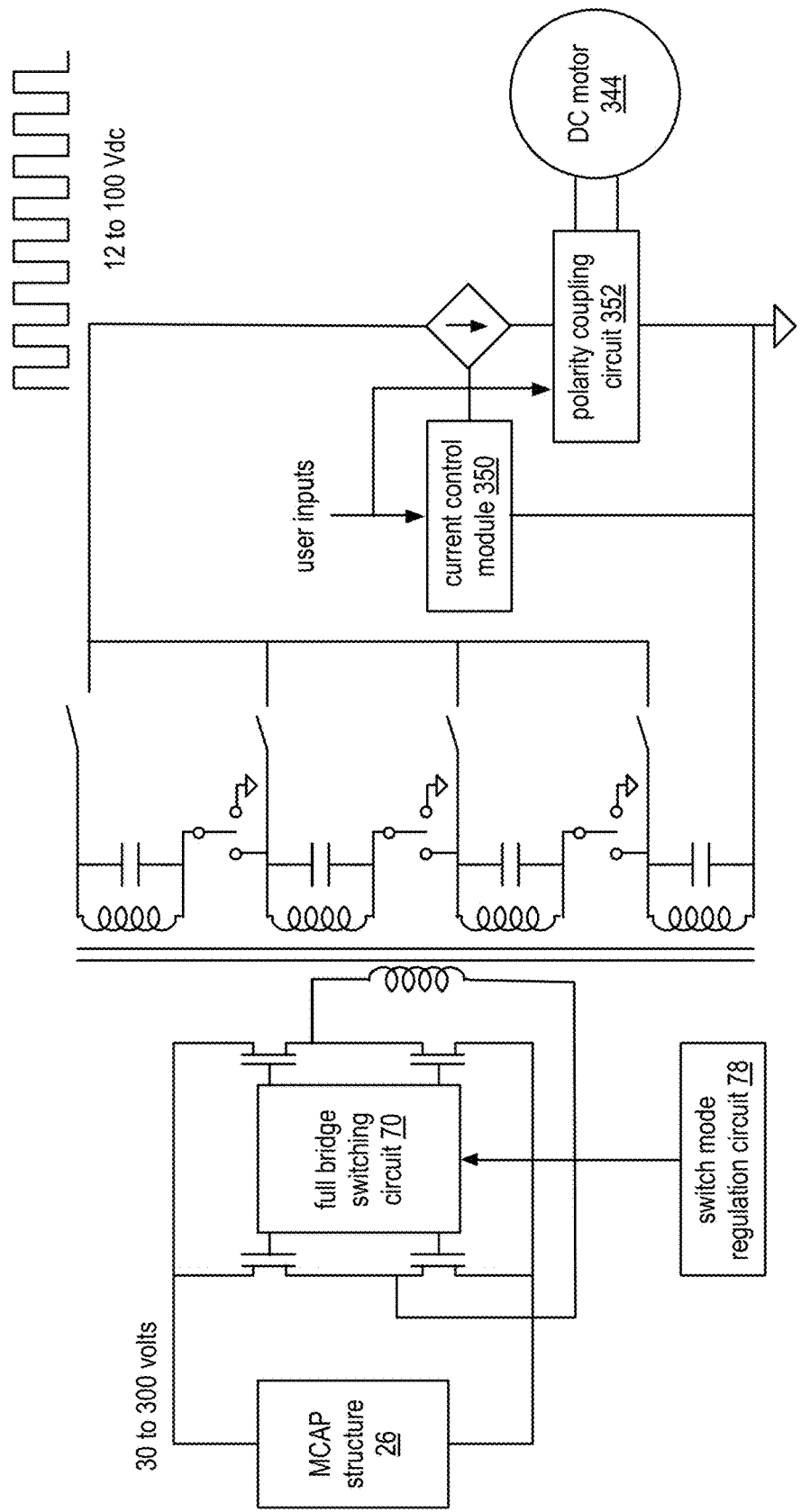
Figure 75:
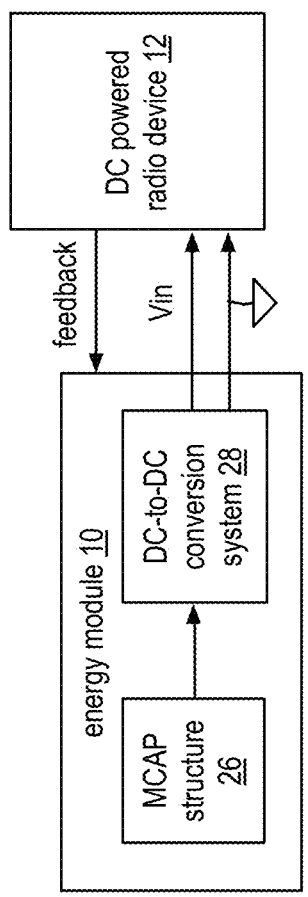
Figure 76:
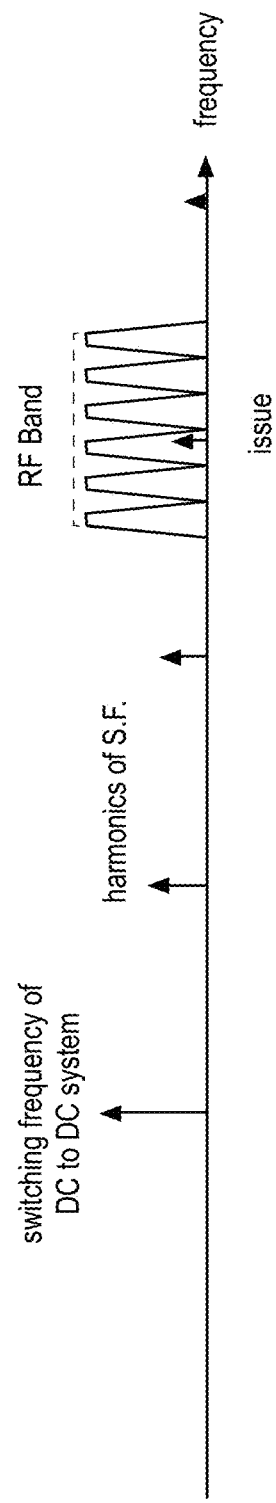
Figure 77:
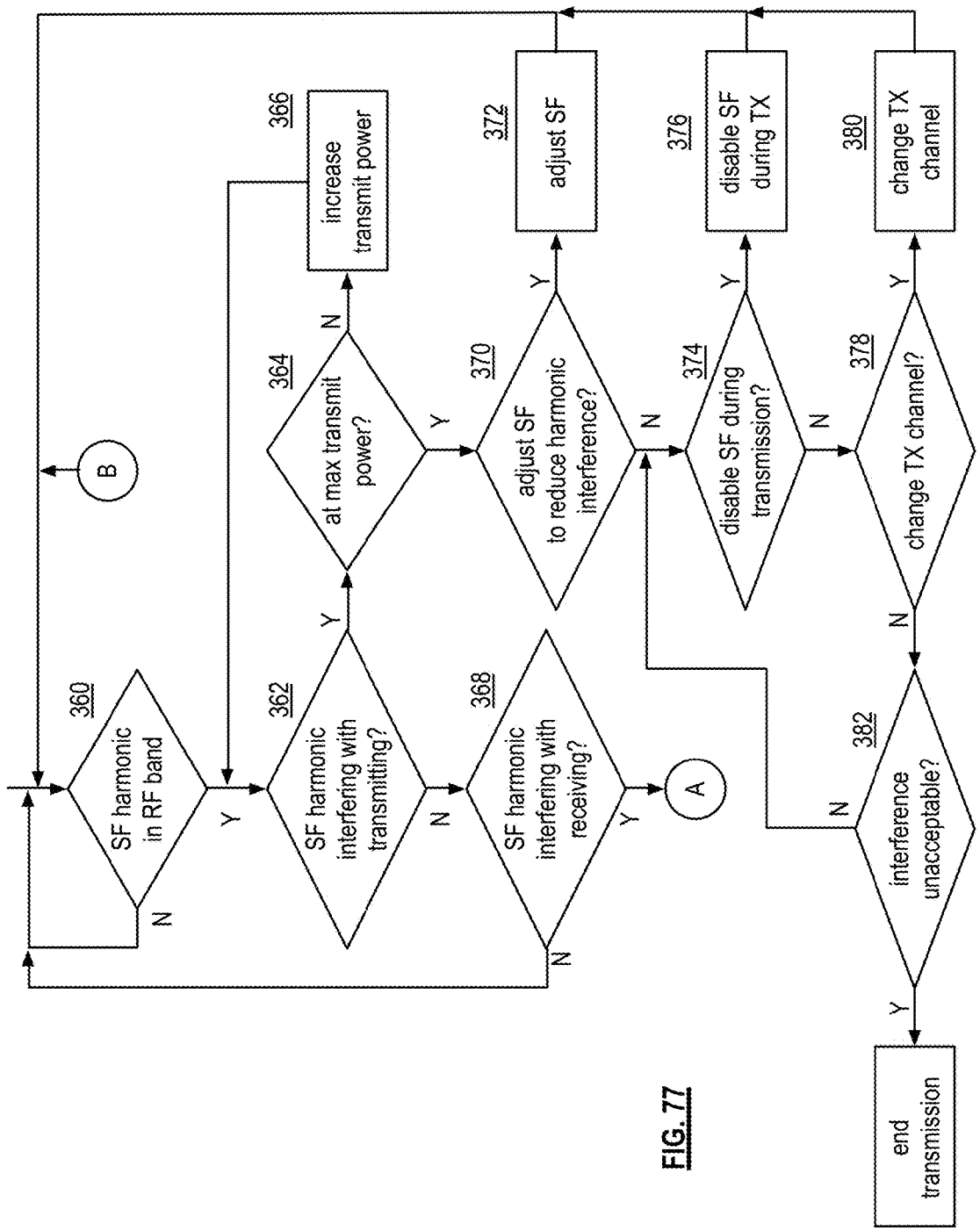
Figure 78:
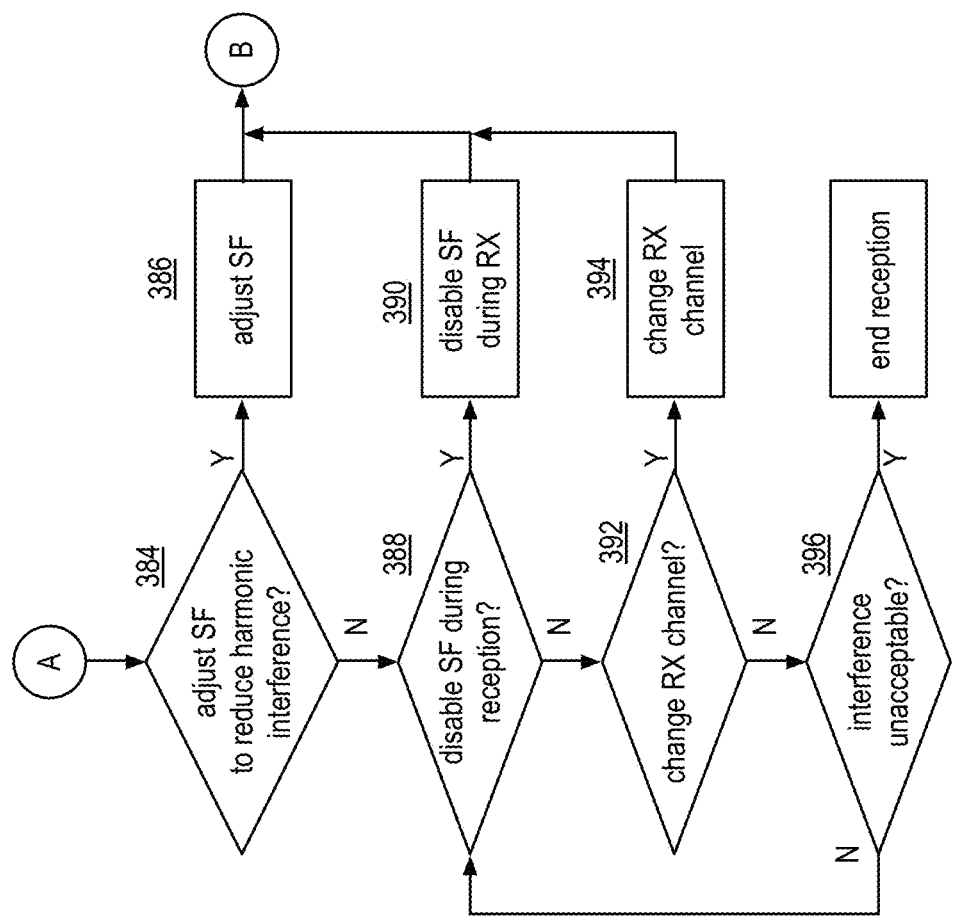
Figure 81:
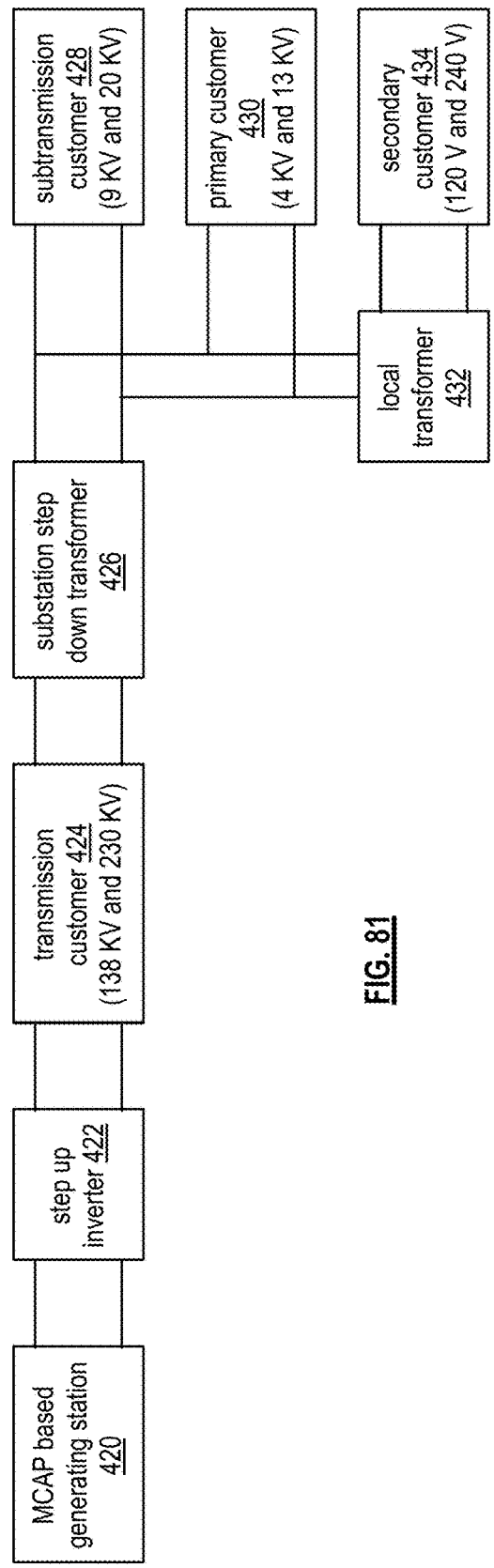

FIGS. 60, 61-A, and 61-B are schematic block diagrams of examples of operation of an energy module voltage sensing circuit in accordance with the present invention;

FIG. 62 is a schematic block diagram of another embodiment of an energy module voltage sensing circuit in accordance with the present invention;

FIG. 63 is a schematic block diagram of another embodiment of an energy module voltage sensing circuit in accordance with the present invention;

FIG. 64 is a schematic block diagram of an embodiment of a capacitor circuit for an energy module voltage sensing circuit in accordance with the present invention;

FIG. 65 is a schematic block diagram of another embodiment of an energy module and a device in accordance with the present invention;

FIG. 66 is a schematic block diagram of another embodiment of an energy module and a device in accordance with the present invention;

FIG. 67 is a schematic block diagram of another embodiment of an energy module, an energy module charger, and a device in accordance with the present invention;

FIG. 68 is a schematic block diagram of an embodiment of a high voltage energy module in accordance with the present invention;

FIG. 69 is a schematic block diagram of an embodiment of uninterruptable power system that includes a high voltage energy module in accordance with the present invention;

FIG. 70 is a schematic block diagram of an embodiment of a power tool that includes a high voltage energy module and a DC motor in accordance with the present invention;

FIG. 71 is a schematic block diagram of an embodiment of a power tool that includes a high voltage energy module and an AC motor in accordance with the present invention;

FIG. 72 is a diagram of an example of current for a power tool that includes a high voltage energy module and a DC motor in accordance with the present invention;

FIG. 73 is a diagram of an example of current for a power tool that includes a high voltage energy module and an AC motor in accordance with the present invention;

FIG. 74 is a schematic block diagram of another embodiment of a power tool that includes a high voltage energy module and a DC motor in accordance with the present invention;

FIG. 75 is a schematic block diagram of an embodiment of an energy module and a DC powered radio frequency (RF) device in accordance with the present invention;

FIG. 76 is a diagram of an example of a potential RF issue for a DC powered radio frequency (RF) device that is powered by an energy module;

FIG. 77 is a logic diagram of an embodiment of a method for reducing a potential RF issue for a DC powered radio frequency (RF) device that is powered by an energy module in accordance with the invention;

FIG. 78 is a logic diagram of an embodiment of a method for reducing a potential RF issue for a DC powered radio frequency (RF) device that is powered by an energy module in accordance with the invention;

FIG. 79 is a logic diagram of an embodiment of a method for adjusting switching frequency of an energy module in accordance with the invention;

FIG. 80 is a logic diagram of another embodiment of a method for adjusting switching frequency of an energy module in accordance with the invention; and FIG. 81 is a schematic block diagram of an embodiment of a power grid having an MCAP based generating station in accordance with the present invention.

DETAILED DESCRIPTION OF THE INVENTION

Figure 1:
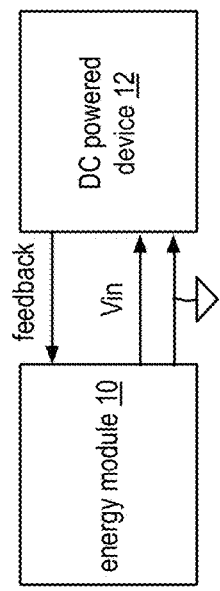
FIG. 1 is a schematic block diagram of an embodiment of an energy module coupled to a DS powered device in accordance with the present invention.

FIG. 1 is a schematic block diagram of an embodiment of an energy module 10 coupled to a device 12. The device 12 may be a handheld portable device, a power tool, a landscaping tool, an electric vehicle, a generator backup system, a power grid system, etc. As specific examples, the device 12 may be a cellular telephone, an audio and/or video player, an audio and/or video recorder, a laptop computer, a tablet style computer, a weed-whacker, a hedge trimmer, a drill, a power saw, an uninterruptable power source, an electric car, an electric bicycle, etc.

The energy module 10 includes one or more magnetic capacitors (MCAP) and a voltage conversion system. The one or more MCAPs store energy as a function of a capacitance and voltage (e.g., energy=$CV^2/2$). Accordingly, the greater the capacitance and/or the higher the voltage, the more energy the MCAP is storing. For example, an MCAP constructed in accordance with US patent application entitled "Parallel Plate Magnetic Capacitor And Electric Energy Storage Device" having a publication number of US20090141423 and/or with US patent application entitled "Assembly Of Magnetic Capacitor With Packaging" having a publication number of US20110013339 may have a charge voltage of 300 volts or more, a capacitance of 0.1 Farad, and be constructed on an integrated circuit die having a one square centimeter footprint. Such an MCAP yields five watt-hours of energy, which, in comparison to a lithium ion battery of equivalent size, is up to one hundred times more energy.

In another example, an MCAP may be constructed of a two magnetic conductors separated by a dielectric. In this construction, the capacitance of the MCAP equals the product of the area of the magnetic conductors, a magnetic-dielectric constant, and the permittivity of free space divided by the distance between the two magnetic conductors. The magnetic-dielectric constant is the product of the dielectric constant of the material (or relative permittivity) and a colossal magnetic capacitance effect factor, which has a theoretical limit of $10^{17}$. In an embodiment of this MCAP, an MCAP nanocell is formed in a silicon wafer to have the two magnetic conductors separated by the dielectric. A plurality of MCAP nanocells (e.g., hundreds to millions or more) is coupled together using conductive layers to form the MCAP.

Within an MCAP nanocell, each of the magnetic conductors includes a plurality of thin film deposit layers (e.g., each about 1 nanometer thick or less). The thin film deposit layers include one or more copper layers, one or more magnetic material layers, and/or one or more other layers. The magnetic conductors may further include contact points for coupling to the conductive layers of the MCAP. The dielectric material may be tetraethylorthosilicate (TEOS) and/or one or more other materials.

The voltage conversion system may be a DC-to-DC conversion system 28 or an inversion conversion system that converts the voltage of the MCAP into one or more supply voltages (e.g., Vin). For instance, the DC-to-DC conversion system 28 converts the MCAP voltage into A DC supply voltage that may range from a fraction of a volt to a few volts for low voltage applications; may range from a few volts to tens of volts for moderately low voltage applications; may range from tens of voltages to hundreds of volts for moderate voltage applications; and may range from hundreds of volts to thousands of voltage for high voltage applications. For example, if the energy module 10 is used as a replacement for a 1.5-volt battery, then the DC-to-DC conversion system 28 will produce a 1.5-volt supply voltage. As another example, if the energy module 10 is used to replace a 4-volt battery, then the DC-to-DC conversion system 28 will produce a 4-volt supply voltage. As yet another example, if the energy module 10 is used to power a motor, then the DC-to-DC conversion system 28 will produce a supply voltage in the range of a few volts to tens of volts or more. As a further example, when the energy module 10 is used in higher DC voltage applications, the DC-to-DC conversion system 28 will produce in the range of hundreds of volts to thousands of volts.

When the energy module 10 includes the inversion conversion system, the inversion conversion system converts the voltage of the MCAP into one or more AC supply voltages (e.g., Vin). As an example, if the energy module 10 is used in an uninterruptable power source, then the inversion conversion system will produce a supply voltage in the range of tens of volts to hundreds of volts or more. As yet a further example, if the energy module 10 is used in a power grid system, then the inversion conversion system will produce a supply voltage in the range of hundreds of volts to thousands of volts or more.

To facilitate providing the supply voltage from the energy module 10 to the device 12, the device provides feedback to the energy module. The feedback includes operational characteristics of the device 12 (e.g., power requirements based on current loading of the device, what type of device it is, over voltage protection requirements, current limit requirements, etc.), supply voltage requirements (e.g., voltages, current limits, etc.), and/or other data that facilitates the operation of the device 12.

Figure 2:
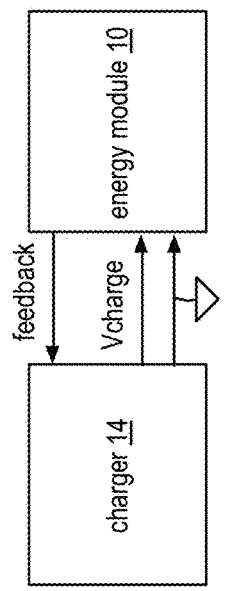
FIG. 2 is a schematic block diagram of an embodiment of an energy module coupled to charger in accordance with the present invention.

FIG. 2 is a schematic block diagram of an embodiment of an energy module 10 coupled to charger 14. In this diagram, the charger 14 provides a charging voltage to the energy module 10 to charge the one or more MCAPs of the energy module. The energy module 10 provides feedback to facilitate the charging.

Figure 3:
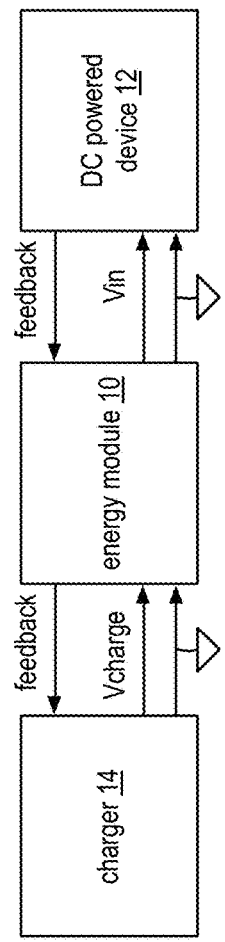
FIG. 3 is a schematic block diagram of an embodiment of an energy module coupled to a DS powered device and to a charger in accordance with the present invention.

FIG. 3 is a schematic block diagram of an embodiment of an energy module 10 coupled to a DS powered device 12 and to a charger 14. In this embodiment, the energy module 10 may directly power the device 12 or the charger 14 may power the device 12 via the energy module. Various embodiments of the energy module, the energy module charger 14 ("charger"), and/or the device 12 are provided in one or more of the subsequent figures.

Figure 4:
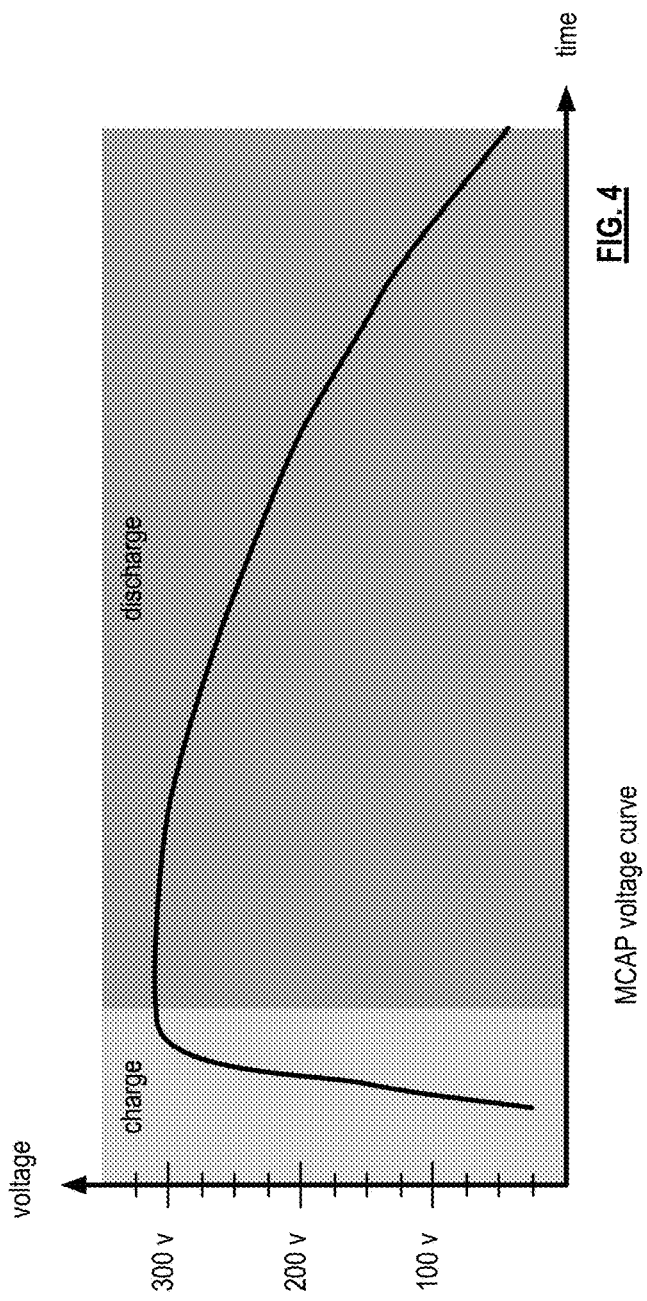
FIG. 4 is a diagram of an example voltage curve that represents charging and discharging of an energy module in accordance with the present invention.

FIG. 4 is a diagram of an example voltage curve that represents charging and discharging of an energy module. In this example, the curve represents a graphical illustration of the charging and discharging voltages of an MCAP of the energy module. When the energy module 10 is coupled to the charger 14 and charging is enabled, the charger 14 provides a charging voltage to the energy module 10 to charge it. For instance, a 0.1 Farad MCAP may be fully charged (or substantially fully charged) to 300 volts in about 60 seconds. At 300 voltages, the 0.1 Farad MCAP has approximately 5 Watt-Hours of stored energy.

When the energy module 10 is coupled to the device 12 and providing a supply voltage is enabled, the energy module 10 provides one or more supply voltages to the device. The duration of discharging of the energy module 10 depends on the number of 0.1 Farad MCAPs (and/or other valued MCAPs) within the energy module 10 and the loading of the device 12. For instance, if the device 12 is a cellular telephone manufactured in 2014 and the energy module 10 includes just one 0.1 Farad MCAP on a one square centimeter integrated circuit die, the energy module 10 offers 10-40 hours of talk time and 7-30 days of standby time before requiring a 60 second recharging.

Figure 5:
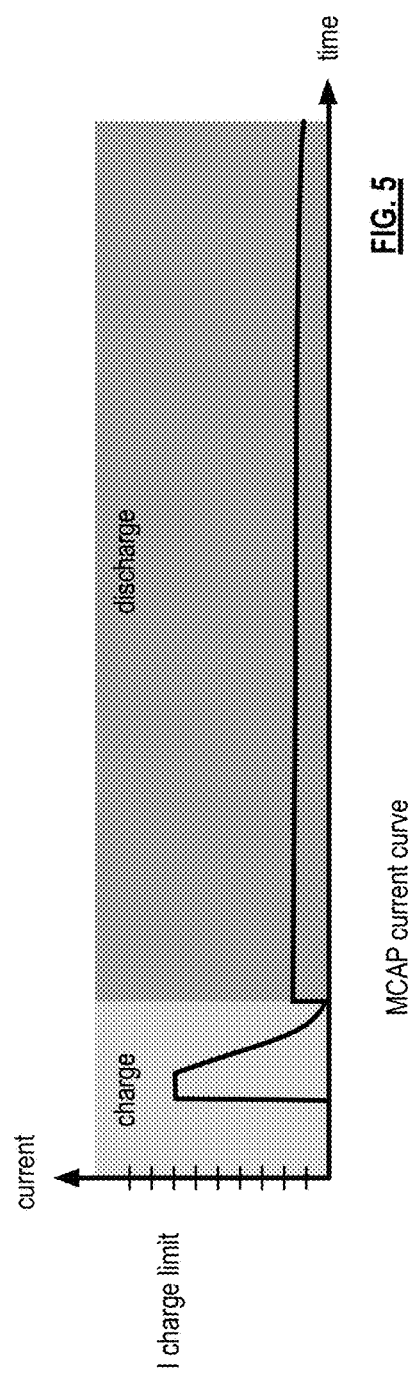
FIG. 5 is a diagram of an example current curve that represents charging and discharging of an energy module in accordance with the present invention.

FIG. 5 is a diagram of an example current curve that represents charging and discharging of an energy module. In this example, the curve represents a graphical illustration of the charging and discharging currents of an MCAP of the energy module. When the energy module 10 is coupled to the charger 14 and charging is enabled, the charger 14 provides a current to the energy module 10 to charge it. The charger 14 may include a current limiting circuit such that the charging current is limited to a particular value (i.e., the current charge limit). As the MCAP is charging, the current decreases until it reaches near zero, which occurs when the MCAP is fully charged. When the energy module 10 is coupled to the device 12 and providing a supply voltage is enabled, the energy module 10 provides current to the device 12. The level of current varies based on the load of the device 12.

Figure 6:
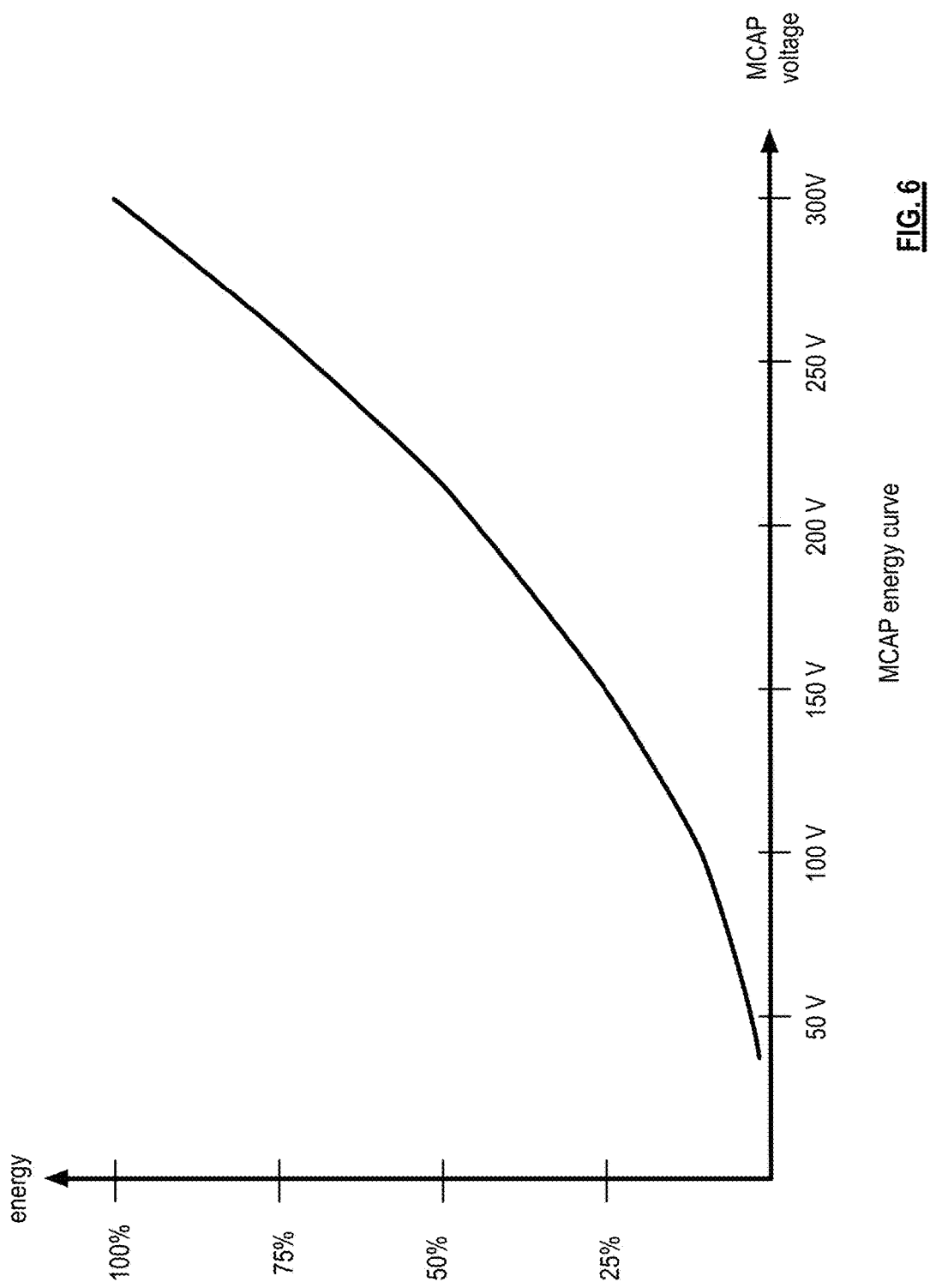
FIG. 6 is a diagram of an example energy curve that represents charging and discharging of an energy module in accordance with the present invention.

FIG. 6 is a diagram of an example energy curve that represents charging and discharging of an energy module. As is known, the energy of a capacitor is a function of the capacitance and its voltage ($E=C*V^2/2$). Since the MCAP functions, with respect to energy storage, as a capacitor, its energy is based on the same curve. In this example curve, the MCAP is fully charged to a voltage of 300 Volts. If the MCAP has a capacitance of 0.1 Farad and is fully charged to 300 Volts, it has an energy level of 5 Watt-Hours. As the voltage level decreases as the MCAP is being discharged, the energy decreases by the square of the voltage decrease. For instance, when the voltage of the MCAP is at 30 Volts, the energy is one percent of the fully charged energy.

Figure 7:
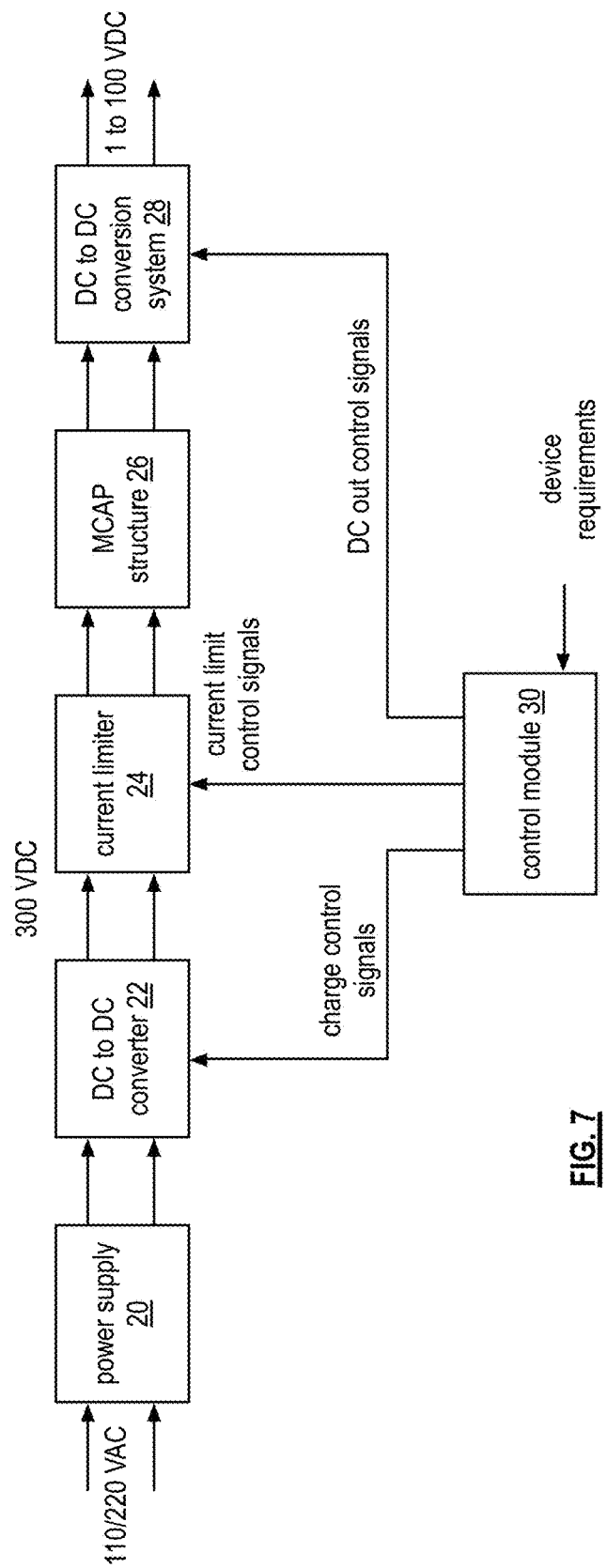
FIG. 7 is a schematic block diagram of an embodiment of an energy module and an energy module charger in accordance with the present invention.

FIG. 7 is a schematic block diagram of an embodiment of an energy module 10 and an energy module charger 14. Collectively, the energy module 10 and charger 14 include a power supply 20, a DC-to-DC converter 22, a current limiter 24, an MCAP structure 26, a DC-to-DC conversion system 28, and a control module 30 (e.g., a processing module or processing circuit). The energy module 10 and the charger 14 may be included in one physical device 12 (e.g., the energy module 10 includes the charger 14, the device 12 being powered include the energy module 10 and the charger 14, etc.) or the energy module 10 and the charger 14 may be separate devices. When the charger 14 and the energy module 10 are separate devices, the elements of the charger 14 and the energy module 10 may vary. For example, the charger 14 includes the power supply 20, the DC-to-DC converter 22, the current limiter 24, and a control module 30 and the energy module 10 includes the MCAP structure 26, the DC-to-DC conversion system 28, and a control module 30. As another example, the charger 14 includes the power supply 20 and a control module 30 and the energy module 10 includes the DC-to-DC converter 22, the current limiter 24, the MCAP structure 26, the DC-to-DC conversion system 28, and a control module 30. In yet another example, the power supply 20 and DC-to-DC converter 22 are one circuit within the charger 14.

In an example of operation, the power supply 20 converts a 110 or 220 VAC input (or other AC input voltage) into a DC output voltage (e.g., 100 Volts). The DC-to-DC converter 22 converts the DC output voltage of the power supply 20 into an energy module 10 charge voltage, which may vary from a 100 VDC to 300 VDC, or higher. The inclusion of the DC-to-DC converter 22 allows for different types of MCAPs, which have different charging voltages, to be used in the energy module. If MCAPs used in the energy module 10 will have a particular charging voltage or have a narrow range of charging voltages, then the DC-to-DC converter 22 may be omitted and the power supply 20 generates the desired charging voltage or the narrow range of charging voltages (e.g., varies by twenty percent or less).

The control module 30 generates control signals to set the desired charging voltage and current limiting control signals based on various input data. The input data includes characteristics desired charging voltage of the energy module, charging current limits of the energy module, energy storage capabilities of the energy module, etc. The control module 30 provides the charging control signal to the DC-to-DC converter 22 (or to the power supply 20 when the DC-to-DC converter 22 is integrated into the power supply 20) to establish the charging voltage.

When the MCAP structure 26 is being charged, the current limiter 24 limits the charge current provided by the DC-to-DC converter 22 to the MCAP structure 26 in accordance with the current limit control signals. The current limit control signals will be based on requirements of the MCAP structure 26 and the construct of the MCAP structure 26. For example, if the MCAP structure 26 includes a plurality of MCAPs coupled in parallel for charging, then the current limit will be a multiple of a desired charging current for an individual MCAP.

As the MCAP structure 26 is being charged, the DC-to-DC conversion system 28 may or may not be activated. For example, the DC-to-DC conversion system 28 will not be activated if a device 12 is not coupled to the energy module; if the device 12 is coupled to the energy module, but is not turned on; if the design of the energy module 10 prohibits producing a DC output for a device 12 when the MCAP structure 26 is being charged. As another example, the DC-to-DC conversion system 28 will be activated if a device 12 is coupled to the energy module, the device 12 is not turned on, and the design of the energy module 10 allows producing a DC output for the device 12 when the MCAP structure 26 is being charged.

When the DC-to-DC conversion system 28 is activated, the control module 30 generates DC output control signals based on the device requirements e.g., how many DC voltages it needs, at what level, power requirements, current limiting requirements, etc.). In response to the DC output control signals, the DC-to-DC conversion system 28 generates one or more DC output voltages to power the device 12. In addition, the DC-to-DC conversion system 28 establishes current limits for each of the DC outputs it generates based on the DC output control signals. Depending on the device 12, the DC-to-DC conversion system 28 generates one or more DC output voltages in the range of one volt, or less, to 100 volts, or more. For instance, if the device 12 is a battery-powered device 12, the DC-to-DC conversion system 28 generates a 1.5 VDC output, a 3.3 VDC output, a 4 VDC output, a 12 VDC output, etc.

Figure 8:
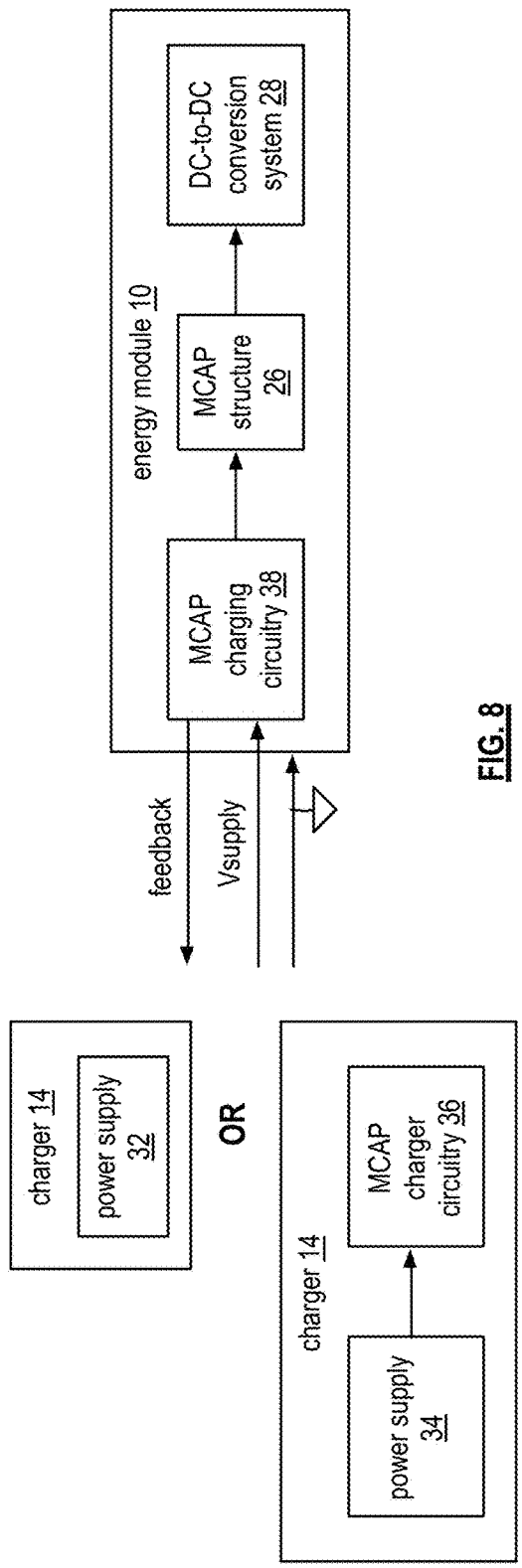
FIG. 8 is a schematic block diagram of another embodiment of an energy module and an energy module charger in accordance with the present invention.

FIG. 8 is a schematic block diagram of another embodiment of an energy module 10 and an energy module charger 14. In this embodiment, the energy module 10 includes the MCAP charging circuitry 38, the MCAP structure 26, and the DC-to-DC conversion system 28 and the charger 14 includes the power supply 32 (with an integrated DC-to-DC converter 22) and may further include an MCAP charger circuitry. The MCAP charging circuitry 38 includes a current limiter 24 specifically designed for the MCAP structure 26 and may include other protection circuitry (e.g., overvoltage detection and protection, short-circuit detection and protection, etc.). The MCAP charger circuitry, when included in the charger 14, includes a current limiter 24 generic for a variety of MCAP structures 26 and may include other protection circuitry.

The energy module 10 may provide feedback to the charger 14. The feedback includes current being drawn during the charging, rate of charging, charging voltage applied to MCAP structure 26, desired charging voltage, desired current limit, and/or enable/disable charging signals. The charger 14 uses the feedback, when provided, to establish the charging voltage, current limit settings, and/or surge protection settings.

Figure 9:
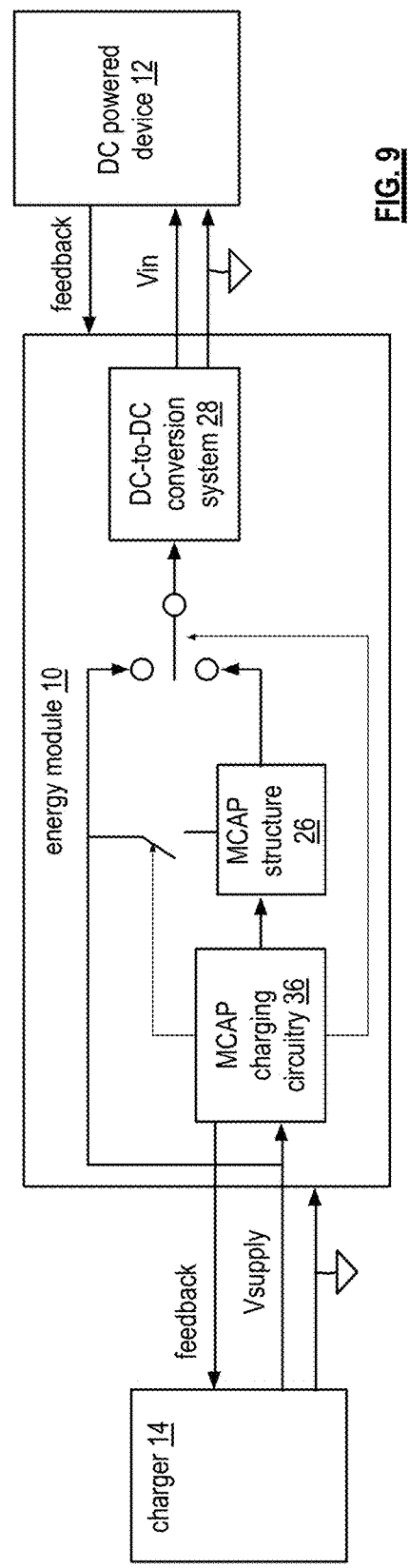
FIG. 9 is a schematic block diagram of an embodiment of an energy module, an energy module charger, and a DC powered device in accordance with the present invention.

FIG. 9 is a schematic block diagram of an embodiment of an energy module, an energy module charger 14, and a DC powered device 12. In this embodiment, the energy module 10 includes by-pass circuitry that allows the charging voltage from the charger 14 to be used to power the DC-to-DC conversion system 28 when the energy module 10 is coupled to both the charger 14 and the device 12. In this manner, the charging voltage is used to charge the MCAP structure 26 without loading the MCAP structure 26 to power the device 12.

When the charger 14 is disconnected, the by-pass circuitry couples the MCAP structure 26 to the DC-to-DC conversion system 28. The by-pass circuitry may also couple the MCAP structure 26 to the DC-to-DC conversion system 28 when the charger 14 is connected if the MCAP charging circuitry 38 and/or control module 30 of the energy module 10 determines that the MCAP structure 26 will be sufficiently charged while it is being charged and supplying energy to the DC-to-DC conversion system 28.

Figure 10:
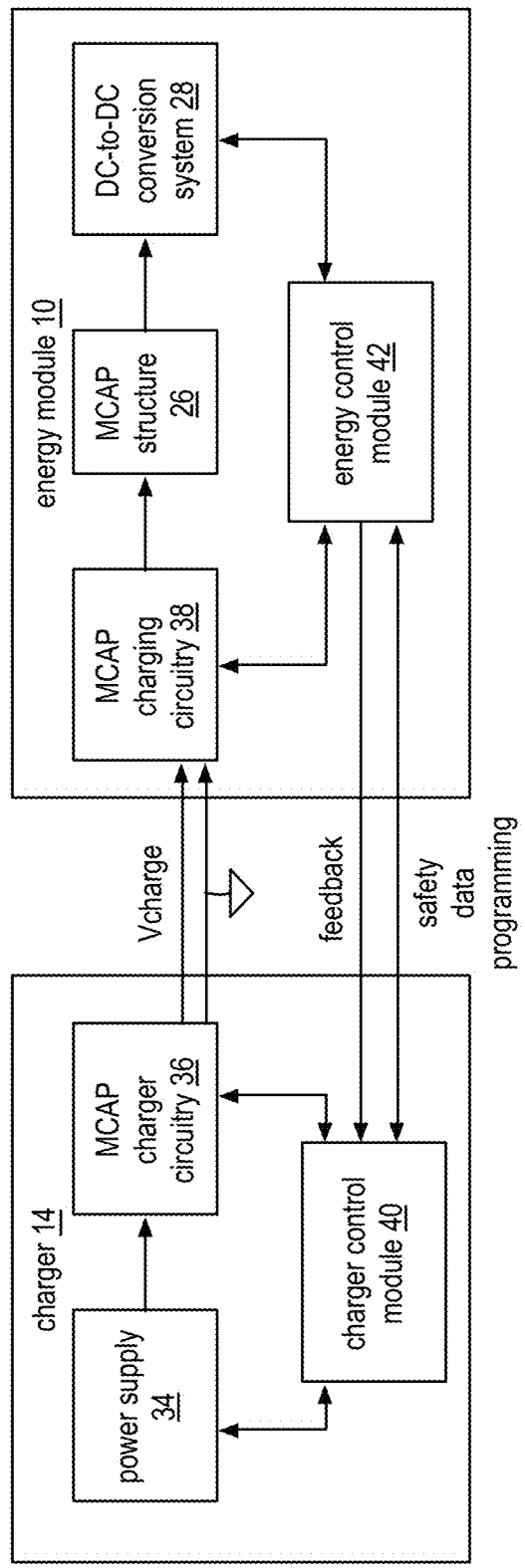
FIG. 10 is a schematic block diagram of another embodiment of an energy module and an energy module charger in accordance with the present invention.

FIG. 10 is a schematic block diagram of another embodiment of an energy module 10 and an energy module charger 14. The charger 14 includes the power supply 34 (with integrated DC-to-DC converter 22), the MCAP charger circuitry, and a charger control module 40. The energy module 10 includes the MCAP charging circuitry 38, a capacitance-based power source structure (e.g., the MCAP structure 26, a plurality of magnetic capacitor cells, a plurality of battery cells, a plurality of capacitor cells, a plurality of solar cells, a plurality of hydrogen cells, and/or other device 12 or combination of devices that holds an electrical charge which can be discarded as a power source and then recharged), the DC-to-DC conversion system 28, and an energy control module 42. Note that throughout this specification, the capacitance based power source structure will be referred to as an MCAP structure 26, which produces a high voltage output (e.g., 100 volts or more) and can be discharged to one-third or less of its fully charged voltage.

In this embodiment, the control modules source, receive, and/or exchange, data, safety information, and/or programming information. The data may include information regarding use the energy module, what devices it has been coupled to, information regarding the devices, charging information, and/or charging history, etc. The safety information may include short circuit protocols, overvoltage protocols, high voltage sensing data, leakage voltage, leakage current, and/or other information that effects the safety of charging the energy module, of using the energy module, and/or human handling of the energy module. The programming information may include what charging program the energy module 10 is affiliated with (e.g., charging rate, charging costs, authorized uses who can charge, etc.), what devices the energy module 10 can operate with, what chargers the energy module 10 can be charged by, etc.

Figure 11:
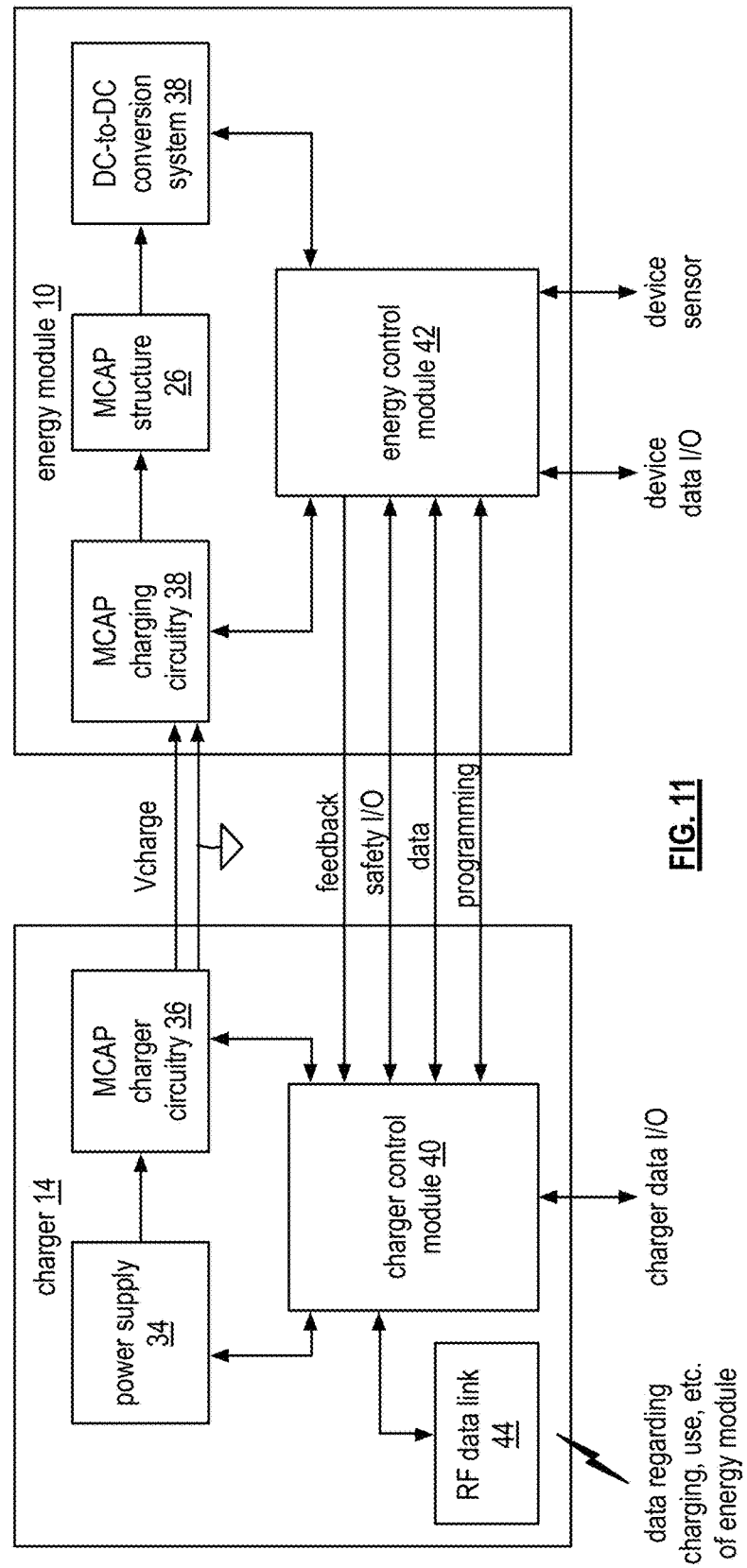
FIG. 11 is a schematic block diagram of another embodiment of an energy module and an energy module charger in accordance with the present invention.

FIG. 11 is a schematic block diagram of another embodiment of an energy module 10 and an energy module charger 14. The energy module 10 includes the MCAP charging circuitry 38, the MCAP structure 26, the DC-to-DC conversion system 28, and the energy control module 42. The charger 14 includes the MCAP charger circuitry, the power supply 34, the charger control module 40, and a radio frequency (RF) data link. The MCAP charging circuitry 38, the MCAP structure 26, the DC-to-DC conversion system 28, the MCAP charger circuitry, and the power supply 34 function as previously and/or subsequently discussed.

In an example of operation and when the energy module 10 is coupled to a device 12, the energy control module 42 communicates device data and device sensor data with the device 12. The device data includes a wide variety of data regarding the use of the device 12 (e.g., how often, what applications, etc.), particular information regarding the device 12 (type, serial number, etc.), and/or the operational characteristics of the device 12 (e.g., power consumption, average current draw, peak current draw, etc.). The device sensor data includes overvoltage conditions within the device 12, overload conditions within the device 12, short circuits within the device 12, user contact with the device 12, environmental conditions (e.g., device dropped in water), etc.

When the energy module 10 is connected to the charger 14, it shares the device data and the device sensor data with the charger 14. The energy module 10 and the charger 14 also communicate feedback, safety information, and programming information as previously described. As an example of communicating device data, the energy module 10 collects device data that includes data regarding power consumption, recharging frequency, average current draw, peak current draw, etc., from the device 12. When the energy module 10 is connected to the charger 14, the energy module 10 provides the device data to the charger 14, which conveys the device data to a charging server via the RF data link 44. The charging server may use this device data to determine how effective the energy module 10 is powering the device 12. For example, does the energy module 10 have too much energy storage for the device 12; does the energy module 10 have too little energy storage for the device 12; etc.

As another example, the charger control module 40 collects information regarding the charging of the energy module 10 and provides that information to the charging server may use the charging data of the energy module 10 to generate billing data for charging the energy module. The charging server may also use the charging data of the energy module 10 to monitor warranty compliance, exhaustion, etc.

Figure 12:
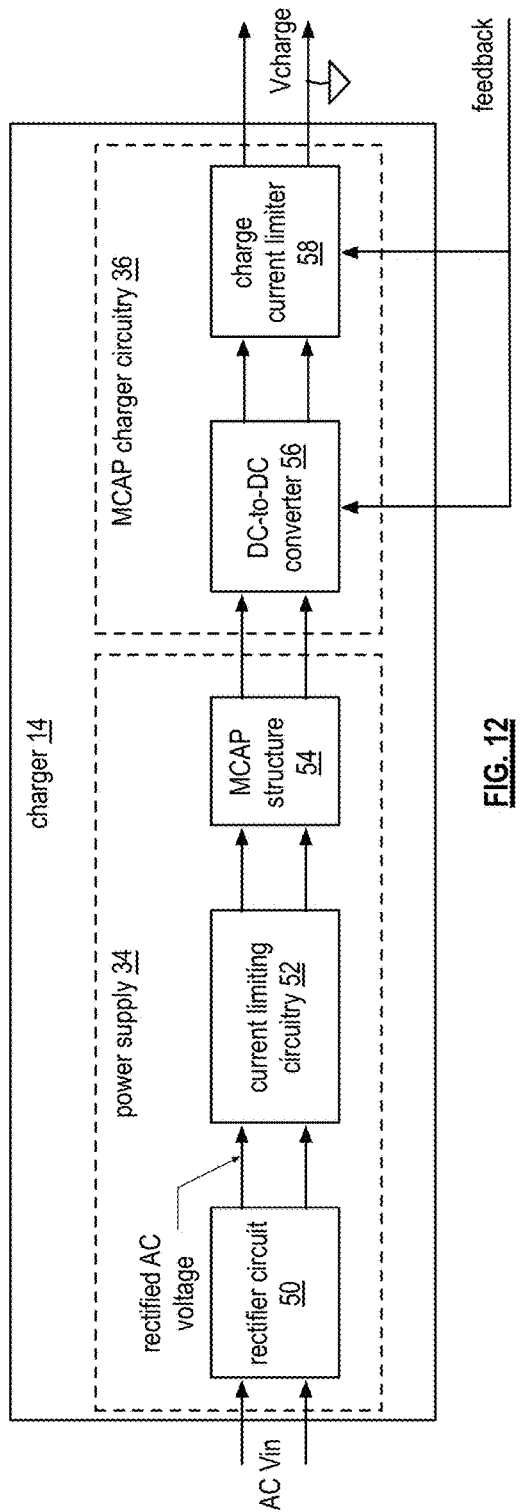
FIG. 12 is a schematic block diagram of an embodiment of an energy module charger in accordance with the present invention.

FIG. 12 is a schematic block diagram of an embodiment of an energy module charger 14 that includes the power supply 34 and the MCAP charger circuitry. The power supply 34 includes a rectifier circuit 50, a current limiting circuitry 52, and a capacitance structure (e.g., an MCAP structure 54 and/or a capacitor bank). The MCAP charger circuitry includes a DC-to-DC converter 22 and a charge current limiter 24.

In an example of operation and when the charger 14 is coupled to an AC voltage source, the rectifier circuit 50 rectifies an AC input voltage into a rectified AC voltage. The currently limiting circuitry (which may include an inductor, a transistor, a surge protector, an impedance, and/or other type of current limiting circuit) limits the current provided to the capacitor structure, which is of sufficient capacitor to provide a DC voltage with an acceptable ripple voltage for powering the DC-to-DC converter 22.

The DC-to-DC converter 22 converts the CAP structure voltage into a charger voltage based on feedback received from an energy module 10 or as a default charger voltage. For instance, the charger voltage may range from 24 volts to 300 volts or more. In addition, the DC-to-DC converter 22 may produce different charger voltages during different phases of charging the energy module. For example, if the energy module 10 is nearly depleted (e.g., has a voltage of about 20 volts), the DC-to-DC converter 22 produces an initial charger voltage of approximately 100 VDC to limit the potential in rush current with charging the MCAP structure 26. When the energy module 10 is further along in charging process, the DC-to-DC converter 22 generates a higher charger voltage and continues to increase the charger voltage until it reaches the desired maximum charger voltage.

The charge current limiter 24 functions to limit the in rush current when the MCAP structure 26 of the energy module 10 is being charged. Note that the charger current limiter 24 may be omitted if the energy module 10 includes a sufficient in rush current limiting circuit. One or more embodiments of the charge current limiter 24 will be discussed with reference to one or more subsequent figures.

Figure 13:
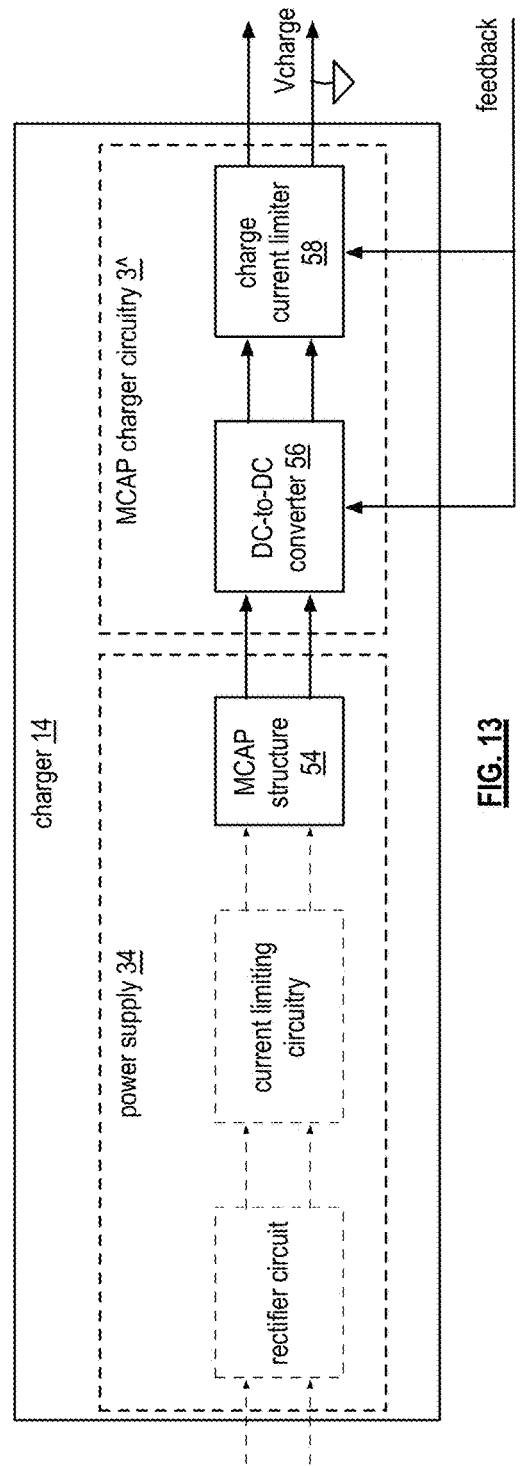
FIG. 13 is a schematic block diagram of another embodiment of an energy module charger in accordance with the present invention.

FIG. 13 is a schematic block diagram of another embodiment of the energy module charger 14 of FIG. 12 when it is not connected to an AC voltage source. In this instance, the energy stored in the CAP structure is used to power the DC-to-DC converter 22 such that the charger 14 can charge an energy module 10 even when the charger 14 is not plugged in.

Figure 14:
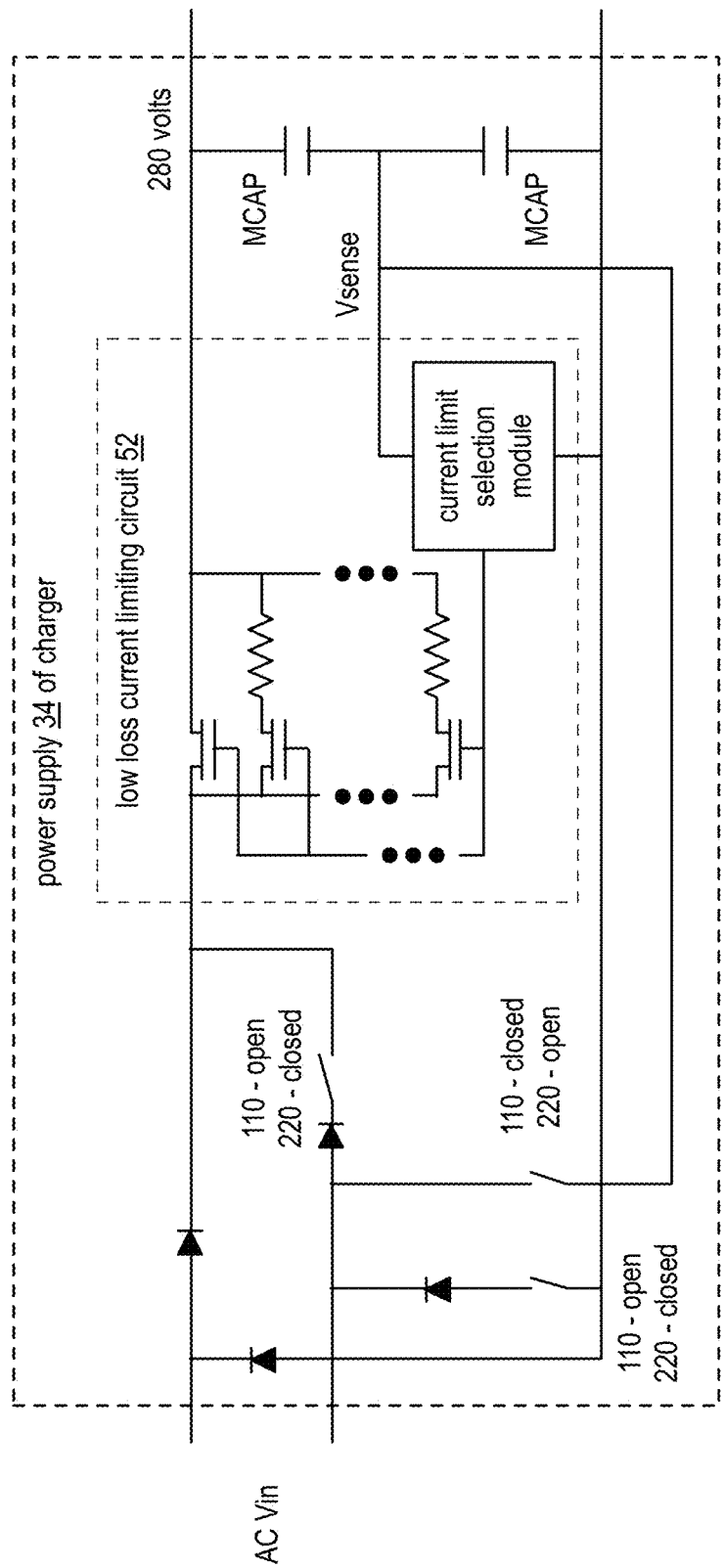
FIG. 14 is a schematic block diagram of an embodiment of a power supply of an energy module charger in accordance with the present invention.

FIG. 14 is a schematic block diagram of an embodiment of a power supply 34 of an energy module charger 14. The power supply 34 includes diodes, switches, a low loss current limiting circuit, and MCAP structure 26. The low loss current limiting circuit includes a plurality of transistors, a plurality of impedances (e.g., resistors, inductors, and/or varactors), and a current limit selection module.

In an example of operation, the power supply 34 may receive an AC input voltage of 110 VAC or a 220 VAC (or other comparable voltages). When the AC input voltage is 110 VAC, two of the switches are open and one of the switches is closed. With this switch configuration, the AC input voltage is applied across the top MCAP structure 26 of the series connected MCAP structure 26 when it is in the positive phase of its cycle and applied across the bottom MCAP structure 26 when it is in the negative phase if its cycle. In this manner, each MCAP structure 26 is charged to a peak voltage of about 140 volts. When the AC input voltage is 220 VAC, two of the switches are closed and one of the switches is open. With this switch configuration, the AC input voltage is applied across the series connected MCAP structure 26. In this manner, the series connected MCAP structure 26 is charged to a peak voltage of about 280 volts. In most embodiments of the power supply 34, the MCAPs will have substantially similar capacitances such that they will have substantially the same voltages and supply substantially the same amount of energy. However, in an embodiment, it may be desired to have the MCAP structure 26 of different capacitance values.

The low loss current limiting circuit limits the current to the MCAP structure 26. When the AC input voltage is first applied to the power supply 34 and the MCAP structure 26 are substantially discharged, the current limit selection module sensing a low voltage across the bottom MCAP structure 26, which, in most embodiments, is representative of the voltage across both MCAP structures 26. When the voltage across the MCAP structure 26 is low, the current limit selection module enables the transistor coupled in series with the highest impedance to provide the highest current limiting. As the MCAP structures 26 are charging, the current limit selection module enables another transistor coupled in series with lower impedance to provide lower current limiting. When the MCAP structures 26 are fully charged, the current limit selection module enables the transistor coupled in series with the lowest impedance to provide the lowest current limiting. Note that, when no AC input voltage is applied, the low loss current limiting circuit is configured such that the transistors are open.

The current limit selection module may generate the control signals to open and close the switches based on the voltage across the MCAP structure 26. For example, when the AC voltage source is first coupled to the power supply 34, the current limit selection module places the switches in the 220 VAC mode. If, after a certain time period (e.g., a few milliseconds to a few seconds), the voltage across the MCAP structure 26 is about half of the desired voltage, then the current limit selection circuit changes the switch configuration to the 110 VAC mode.

Figure 15:
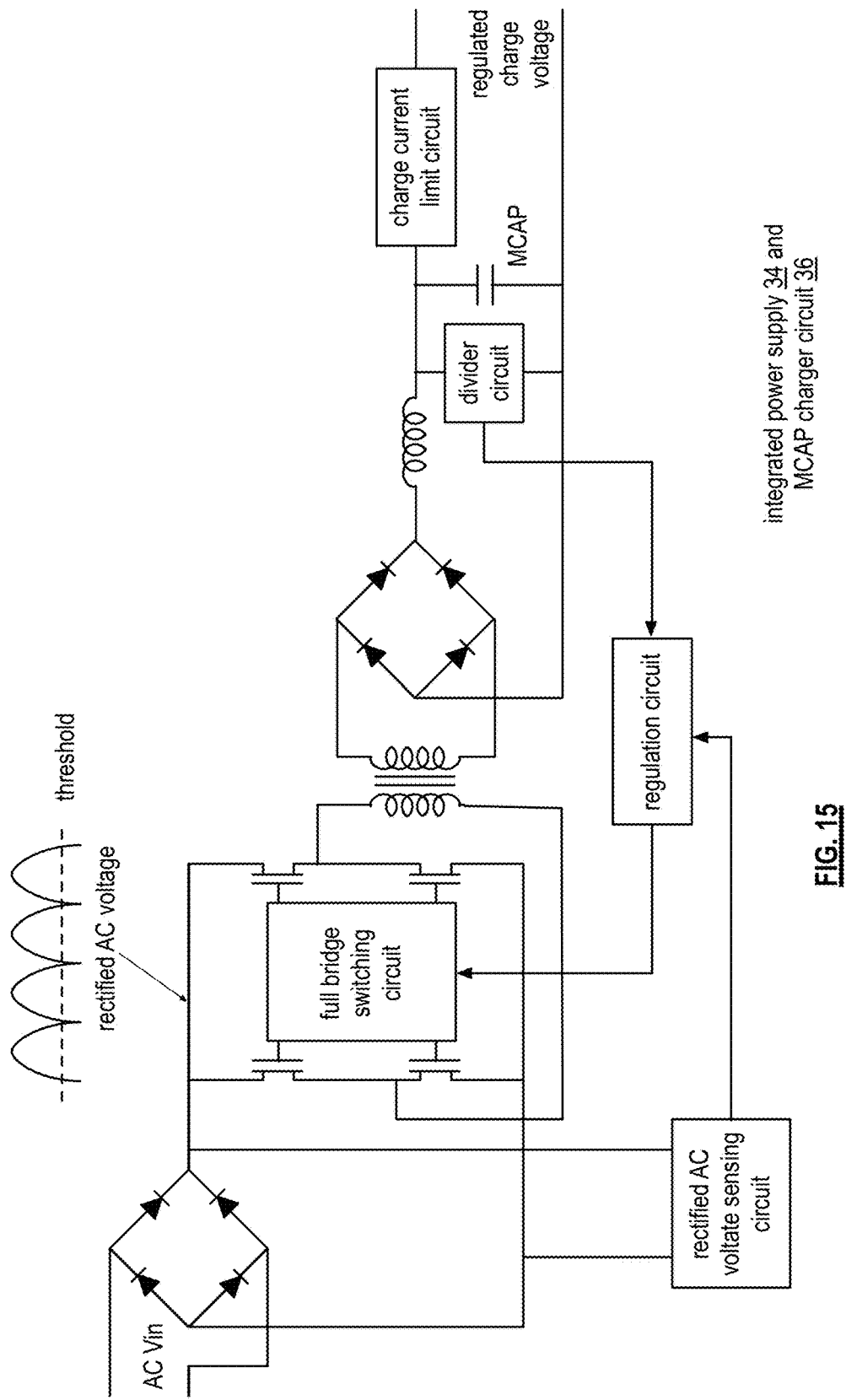
FIG. 15 is a schematic block diagram of another embodiment of an energy module charger in accordance with the present invention.

FIG. 15 is a schematic block diagram of another embodiment of an energy module charger 14 that includes an integrated power supply 34 and MCAP charger circuitry. The charger 14 includes an input rectifier circuit, a full bridge switching circuit, switching transistors, a transformer, an output rectifier circuit, an inductor, a divider circuit, a capacitor structure, the charge current limit circuit, a regulation circuit, and a rectified AC voltage sensing circuit.

In an example of operation, the input rectifier circuit converts the AC input voltage into a rectified AC voltage. The AC input voltage may be 110 VAC or 220 VAC and the input rectifier circuit may further include the 110/200 switches of FIG. 14. With either AC input voltage, the input rectifier circuit produces a full wave rectified signal having a peak voltage of approximately 140 volts.

The switching transistors are coupled to the rectified AC voltage and, based regulation signals provided by the regulation circuit to the full bridge switching circuit, provide a high frequency AC input voltage to the transformer. For example, the rectified AC voltage may have a frequency of 100 to 120 Hz and the switching frequency of the full bridge switching circuit may be 100 KHz or more. Note that another switch mode power supply 34 topology may be used (e.g., a half bridge converter).

The transformer steps up or down its primary voltage based on the turns ratio of the transformer. For instance, the transformer may have a turns ratio of 1:3 such that the secondary voltage is three times the primary voltage. The output rectifier circuit rectifies the secondary voltage of the transformer that is filtered by the inductor and the capacitor structure (e.g., an MCAP structure 26 and/or a conventional capacitor). The charge current limit circuit functions as previously and/or subsequently described.

To regulate the charge voltage to a desired value (e.g., from 24 volts to 300 volts or more), the divider circuit (e.g., a capacitor divider and/or a resistive divider) provides a feedback voltage to the regulation circuit. The regulation circuit compares the feedback circuit with a reference voltage to generate the regulation signals it provides to the full bridge switching circuit. For example, when the comparison indicates that the regulated charge voltage is low, the regulation circuit generates the regulation signals to increase the duty cycle and thus increase the effective secondary voltage (e.g., increase the pulse width and/or increase the switching frequency).

If the rectified AC voltage is substantially unfiltered by a capacitor or other filtering circuit, the rectified AC voltage sensing circuit senses when the rectified AC voltage is above a threshold and provides this information to the regulation circuit. When the rectified AC voltage is above the threshold (e.g., 30 volts or any other desired voltage), the regulation circuit generates the regulation signals based on the divider feedback. When the rectified AC voltage is at or below the threshold, the regulation circuit does not generate the regulation signal such that the switching transistors remain off while the rectified AC voltage is below the threshold.

Figure 16:
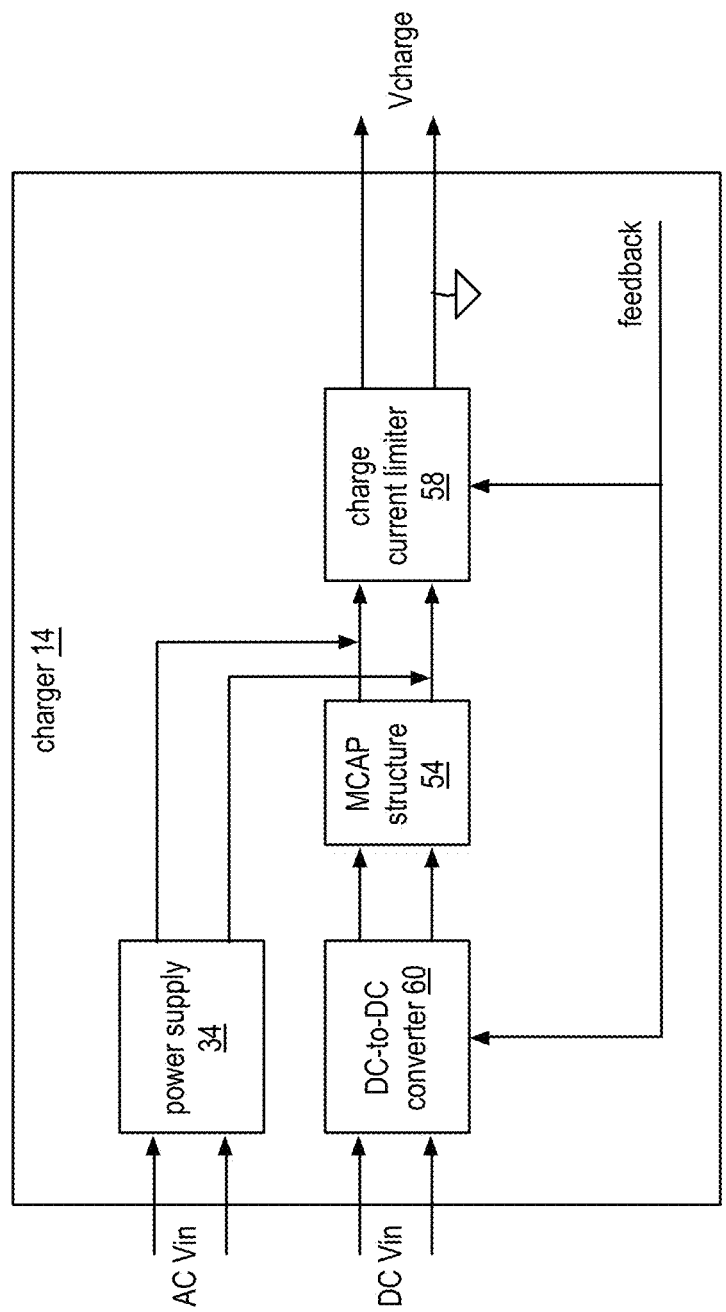
FIG. 16 is a schematic block diagram of another embodiment of an energy module charger in accordance with the present invention.

FIG. 16 is a schematic block diagram of another embodiment of an energy module charger 14 that includes the power supply 34, a DC-to-DC converter 60, the CAP structure 54, and the charge current limiter 58. With the addition of the DC-to-DC converter 60, the charger 14 can be sourced by an AC voltage via the power supply 34 or by a DC voltage via the DC-to-DC converter 60.

Figure 17:
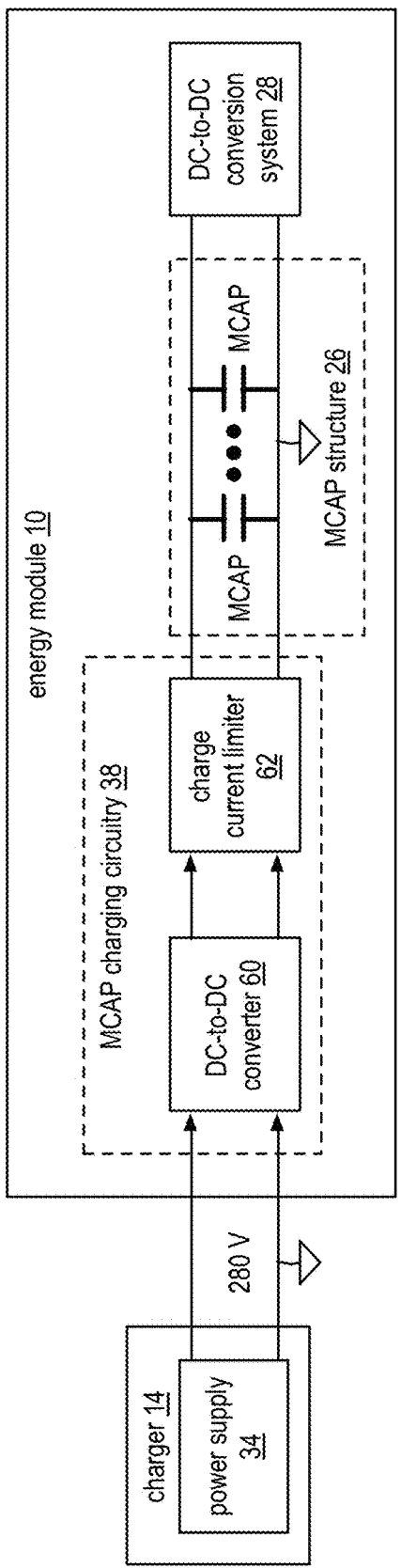
FIG. 17 is a schematic block diagram of another embodiment of an energy module and an energy module charger in accordance with the present invention.

FIG. 17 is a schematic block diagram of another embodiment of an energy module 10 and an energy module charger 14. In this embodiment, the charger 14 includes a power supply 34 and the energy module 10 includes the MCAP charging circuitry 38, the MCAP structure 26, and the DC-to-DC conversion system 28.

In an example of operation, the power supply 34 within the charger 14 generates an output voltage, which may be the rectified voltage, a 280-volt DC voltage, or other voltage. The DC-to-DC converter 60 converts the power supplies output voltage into the desired charging voltage (e.g., 24 volts to 300 volts or more) that is provided to the MCAP structure 26 via the charge current limiter 62. The MCAP structure 26 includes a plurality of MCAPs coupled in parallel. The DC-to-DC conversion system 28 converts the MCAP voltage into one or more DC output voltages.

Figure 18:
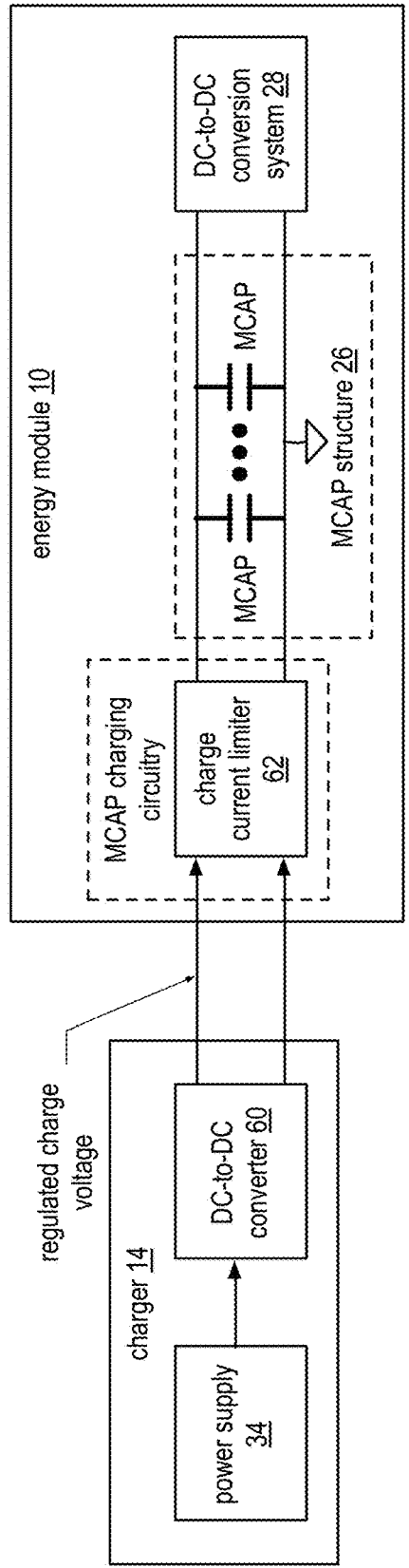
FIG. 18 is a schematic block diagram of another embodiment of an energy module and an energy module charger in accordance with the present invention.

FIG. 18 is a schematic block diagram of another embodiment of an energy module 10 and an energy module charger 14. This embodiment is similar to that of FIG. 17 with the exception that the DC-to-DC converter 60 is within the charger 14. As such, the charger 14 outputs, via the DC-to-DC converter 60, a regulated charging voltage.

Figure 19:
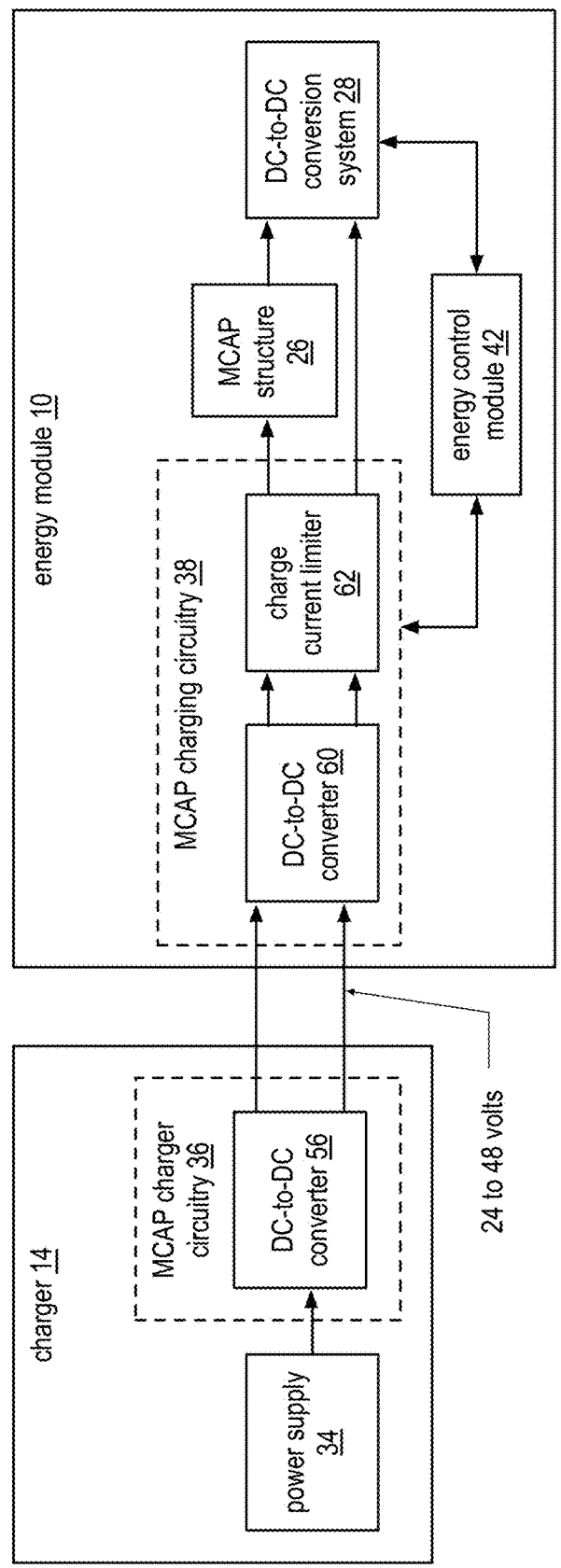
FIG. 19 is a schematic block diagram of another embodiment of an energy module and an energy module charger in accordance with the present invention.

FIG. 19 is a schematic block diagram of another embodiment of an energy module 10 and an energy module charger 14. The charger 14 includes the power supply 34 and a DC-to-DC converter 56 that generates an output voltage of 48 DC volts or less, which, per the International Electrochemical Commission, is a relatively safe voltage for human contact. As such, the charger 14 can be implemented with safety features for a 48 VDC output as opposed to a higher output voltage of 300 VDC or more.

The DC-to-DC converter 60 of the MCAP charging circuitry 38 converts the relatively low voltage input into the desired charging voltage based on signals received from the energy control module 42. The energy control module 42 determines the desired charging voltage and provides corresponding control signals to the DC-to-DC converter 22. The energy control module 42 also determines the charging current limits and provides corresponding control signals to the charge current limiter 24.

Figure 20:
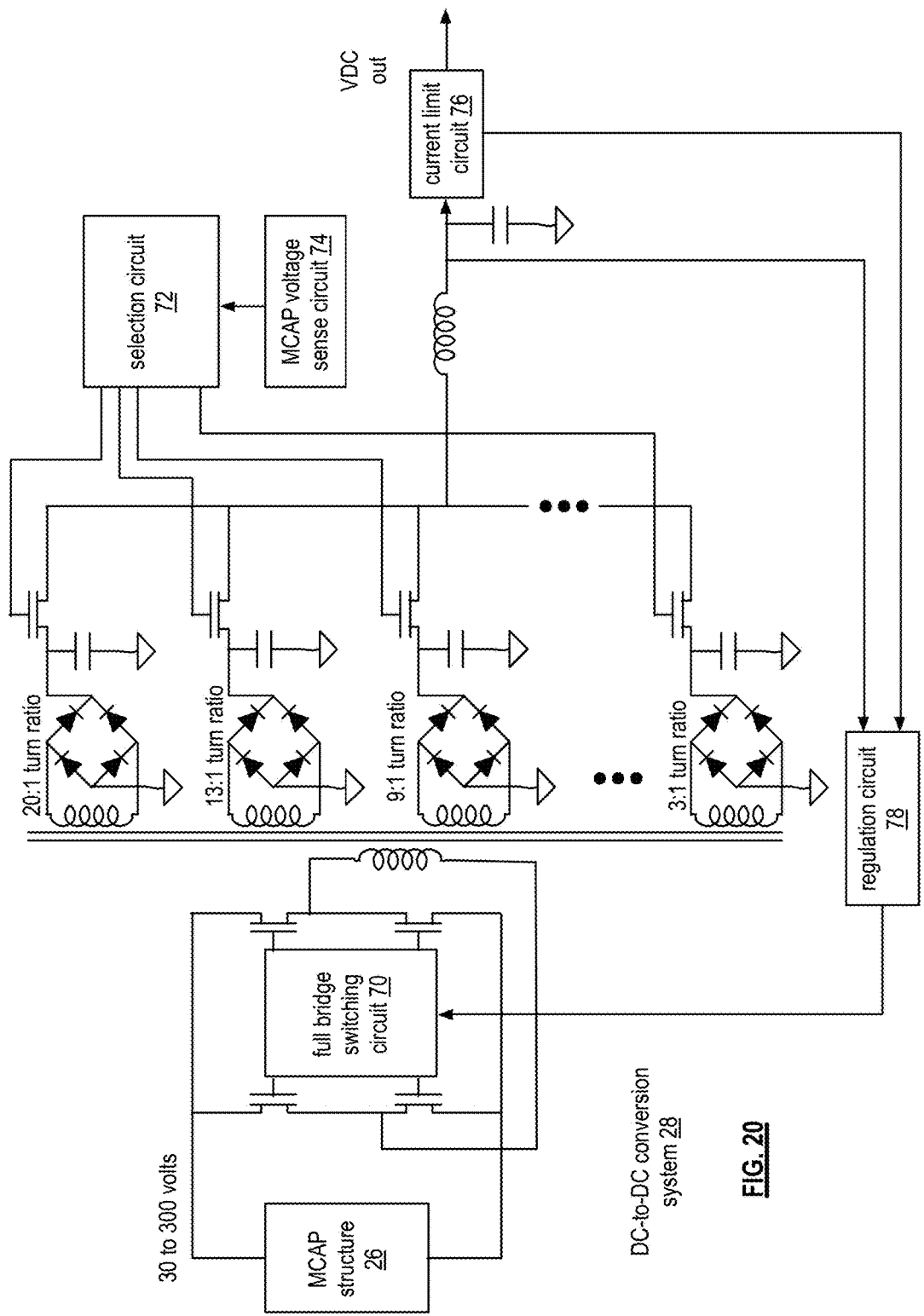
FIG. 20 is a schematic block diagram of an embodiment of a DC-to-DC conversion system 28 of an energy module in accordance with the present invention.

FIG. 20 is a schematic block diagram of an embodiment of a DC-to-DC conversion system 28 of an energy module. The DC-to-DC conversion system 28 is coupled to the MCAP structure 26 that has a voltage varying from a fully charged voltage of 300 VDC, or more, to a near depleted voltage of less than 30 VDC. The DC-to-DC conversion system 28 must account for such a dramatic input voltage range while still providing a constant and reliable output voltage.

The DC-to-DC conversion system 28 includes a full bridge switching circuit 70, switching transistors, a transformer assembly, a plurality of rectifier circuits, a plurality of capacitors, a plurality of selection transistors, a selection circuit 72, an MCAP voltage sense circuit 74, an output filtering circuit, a current limit circuit 76, and a regulation circuit 78. The transformer assembly includes a single primary & multiple secondary transformer, a plurality of single primary & single secondary transformers, or a combination thereof. The rectifying circuits include full wave rectifiers (e.g., four diodes) and/or half wave rectifiers (e.g., two diodes).

In an example of operation, the MCAP structure 26 provides a voltage in the range of 30 VDC to 300 VDC, or more, to the switching transistors. The switching transistors are turned on and off based on signaling from the full bridge switching circuit to produce an AC primary voltage. The full bridge switching circuit includes drive circuits that are dependent on the transistor type of switching transistors. For example, if the switching transistors are field effect transistors (FETs), then the drive circuits are voltage drive circuits that each includes a voltage isolation circuit (e.g., transformer, optocoupler, etc.).

The AC primary voltage is applied to the primary of the transformer assembly. When the transformer assembly includes a single primary and multiple secondary transformer, the transformer generates secondary AC voltages via the secondary windings. The MCAP voltage sense circuit determines the current MCAP voltage level (which varies greatly) and provides an indication thereof to the selection circuit. The selection circuit provides a control signal to one of the selection transistors, which couples one of the secondary AC voltages to the output filtering circuit (e.g., inductor and capacitor).

Figure 21:
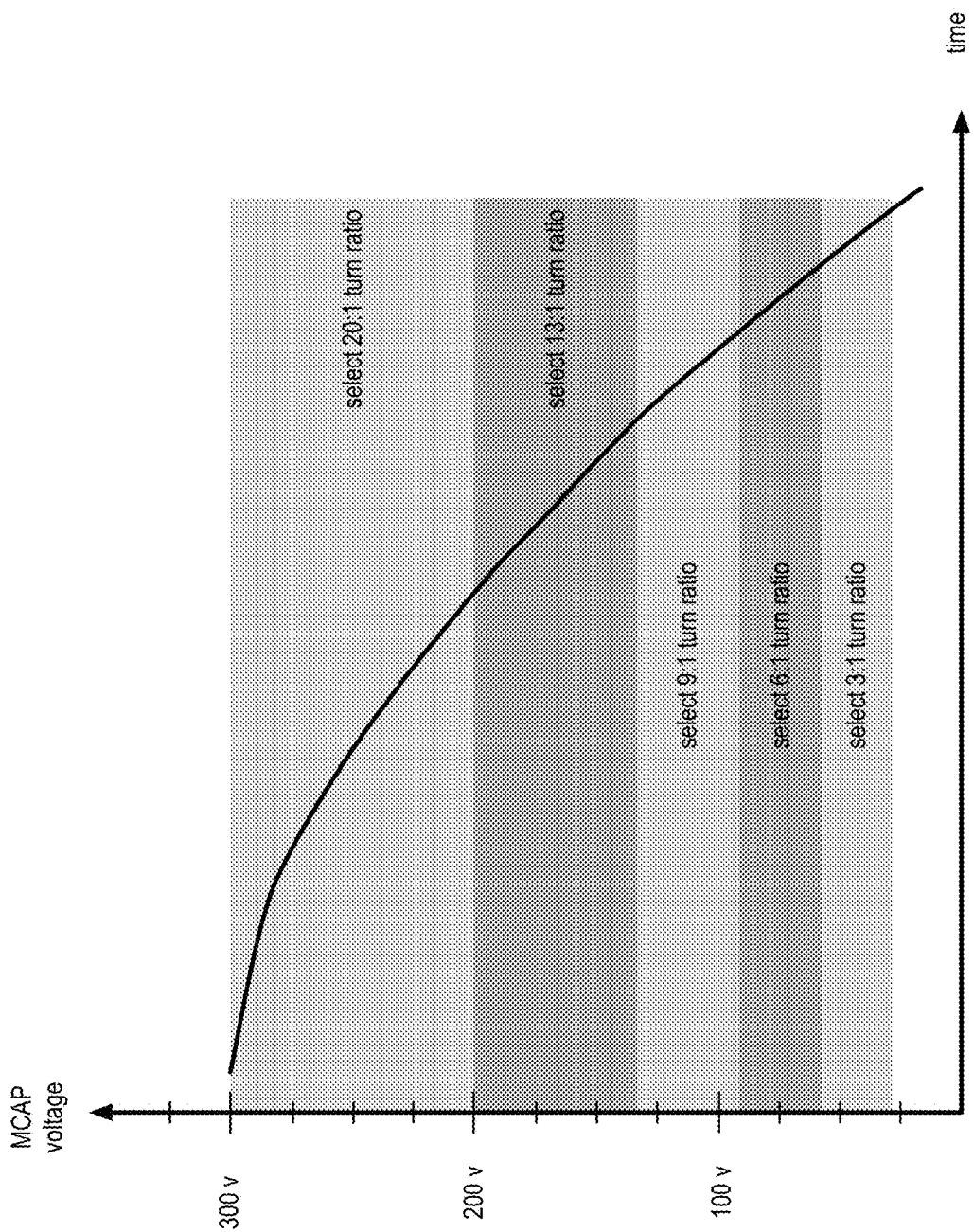
FIG. 21 is a diagram of an example of adjusting turns ratio of a DC-to-DC conversion system 28 of an energy module in accordance with the present invention.

As an example and with reference to FIG. 21, when the MCAP voltage is in the range of 200 volts to 300 volts and the DC output voltage (or voltages) of the DC-to-DC conversion system 28 is in the range of 1-12 VDC, the selection circuit selects the secondary winding that has a 15:1 turns ratio with respect to the primary winding. In this situation, the transformer is stepping down the primary AC voltage of 200-300 volts (peak to peak) to 13.33-20 volts (peak to peak). The respective rectifying circuit rectifies the selected secondary voltage, which is provided to the output filtering circuit. The output filtering circuit filters the rectified selected secondary voltage to produce the DC output voltage in the range of 1 to 12 volts.

Continuing with the example and with reference to FIG. 21, when the MCAP voltage is in the range of 130-200 volts, the selection circuit selects the secondary winding having the 10:1 turns ratio with respect to the primary winding. In this situation, the transformer is stepping down the primary AC voltage of 130-200 volts (peak to peak) to 13-20 volts (peak to peak). When the MCAP voltage is in the range of 87-130 volts, the selection circuit selects the secondary winding having the 6.5:1 turns ratio with respect to the primary winding. In this situation, the transformer is stepping down the primary AC voltage of 87-130 volts (peak to peak) to 13.33-20 volts (peak to peak). When the MCAP voltage is in the range of 58-87 volts, the selection circuit selects the secondary winding having the 4.3:1 turns ratio with respect to the primary winding. In this situation, the transformer is stepping down the primary AC voltage of 58-87 volts (peak to peak) to 13.5-20.2 volts (peak to peak). When the MCAP voltage is in the range of 30-58 volts, the selection circuit selects the secondary winding having the 2.3:1 turns ratio with respect to the primary winding. In this situation, the transformer is stepping down the primary AC voltage of 30-58 volts (peak to peak) to 13-25 volts (peak to peak).

Returning to the discussion of FIG. 20, the regulation circuit monitors the DC output voltage, compares it to a reference voltage, and generates regulation signals based on the comparison. The regulation circuit provides the regulation signals to the full bridge switching circuit, which generates the signaling to drive the switching transistors on and off. The pulse width and/or frequency of the regulation signals adjust the duty cycle of the AC primary voltage to regulate the DC output voltage to a desired level.

The current limit circuit senses the output current supplied by the DC-to-DC conversion system 28. When the output current exceeds a threshold, the current limit circuit provides a signal to the regulation circuit. The regulation circuit scales back on the regulation signals to disabling the regulation signals in proportion with the level at which the output current exceeds the threshold. In one embodiment, the current limit circuit includes a resistor in series with the output and the voltage drop across the resistor is used to represent the output current. In another embodiment, the voltage drop across the selected transistor is used to represent the current.

For the secondary windings not selected, the capacitor coupled to the corresponding rectifying circuit limits the voltage swing. The size of the capacitors depends on the acceptable voltage swing, output power of the DC-to-DC conversion system 28, and switching frequency of the DC-to-DC conversion system 28. With respect to selecting, the MCAP voltage sensing circuit may sense the MCAP voltage directly or sense the rectified voltage of one of the secondary windings.

When the DC output voltage of the DC-to-DC conversion system 28 is greater than 12 volts (e.g., 15 volts to 100 volts), a differing number of secondary windings may be used with different turns ratios. For instance, when the desired DC output voltage is 100 volts and the MCAP voltage is in the range of 30-60 volts, the secondary winding would have a set up turns ratio with respect to the primary winding.

While the DC-to-DC conversion system 28 of this figure only shows one DC output, it may readily be modified to have multiple DC outputs. For example, the DC-to-DC conversion system 28 includes one or more additional output filtering circuits that can be coupled to one of the secondary windings. In this example, two or more secondary winding may be selected and coupled to separate output filtering circuits to produce multiple DC outputs. As another example, the DC-to-DC conversion system 28 includes one or more linear regulators to produce additional DC outputs.

Figure 22:
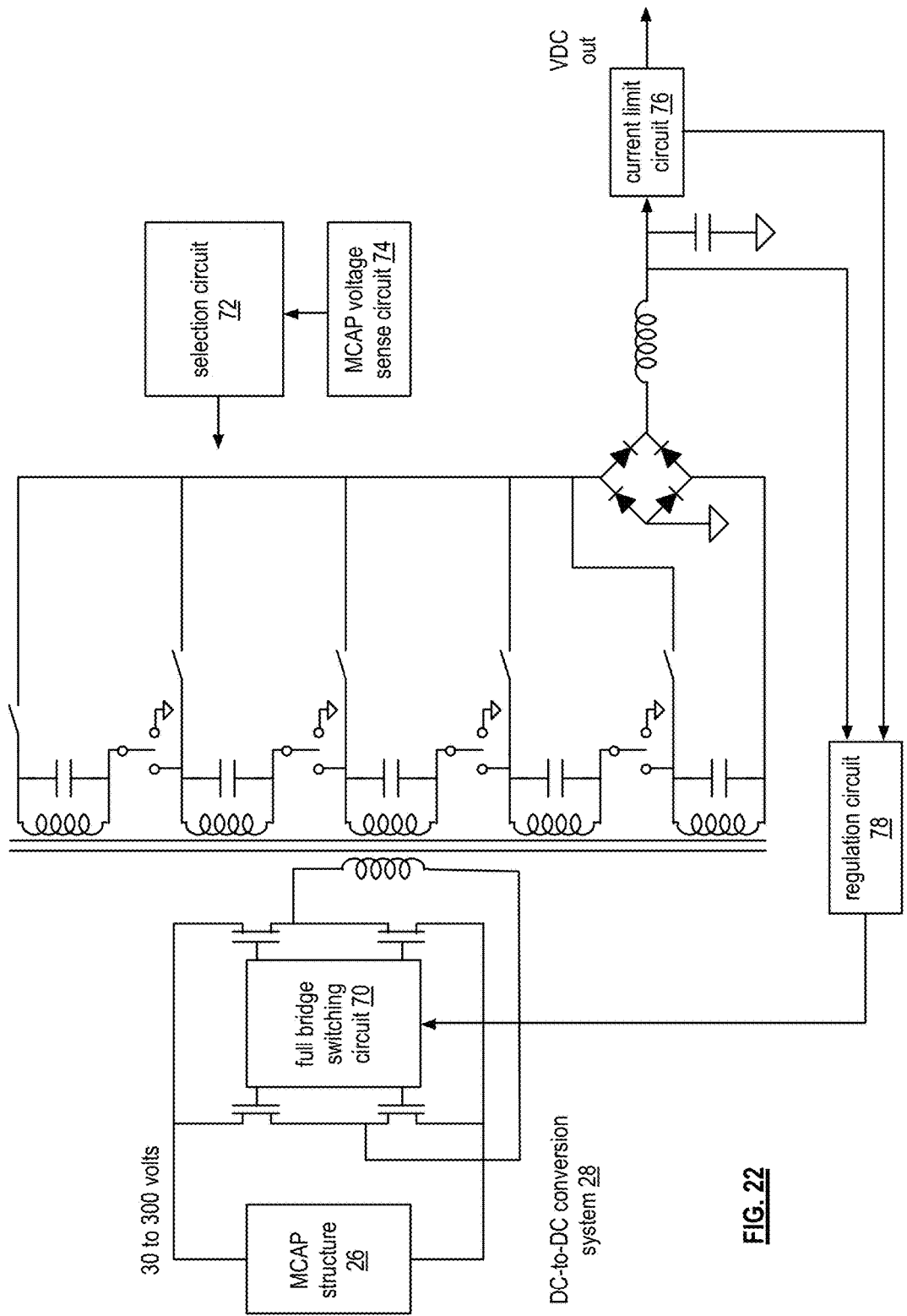
FIG. 22 is a schematic block diagram of another embodiment of a DC-to-DC conversion system 28 of an energy module in accordance with the present invention.

FIG. 22 is a schematic block diagram of another embodiment of a DC-to-DC conversion system 28 of an energy module. The DC-to-DC conversion system 28 includes a full bridge switching circuit 70, switching transistors, a transformer assembly, a rectifier circuit, a plurality of capacitors, a plurality of selection transistors, a selection circuit 72, an MCAP voltage sense circuit 74, an output filtering circuit, a current limit circuit 76, and a regulation circuit 78. The transformer assembly includes a single primary & multiple secondary transformers, a plurality of single primary & single secondary transformers, or a combination thereof. The rectifying circuit includes a full wave rectifier (e.g., four diodes as shown) or a half wave rectifier (e.g., two diodes).

This DC-to-DC conversion system 28 operates similarly to the DC-to-DC conversion system 28 of FIG. 20, with the exception of how the secondary windings are selected and the number of rectifying circuits. In the DC-to-DC conversion system 28 of FIG. 20, each secondary winding is associated with a rectifying circuit and is individually selected for a DC output voltage. In the DC-to-DC conversion system 28 of FIG. 22, there is one rectifying circuit per DC output voltage, a desired turns ratio is selected based on the MCAP voltage, and the secondary windings are selectively coupled in series to provide the desired turns ratio.

As an example, assume the desired output voltage is in the range of 1-12 VDC and the MCAP voltage will vary from 30 VDC to 300 VDC. As with the example of FIG. 20, the selection circuit will make selection changes for MCAP voltages 200-300 V, 130-200 V, 87-130 V, 58-87 V, and 30-58 V. To achieve a rectified secondary voltage in the range of about 13 volts to 20 volts (peak to peak), the turns ratio of 15:1 is selected when the MCAP voltage is in the range of 200-300 V; the turns ratio of 10:1 is selected when the MCAP voltage is in the range of 130-200 V; the turns ratio of 6.5:1 is selected when the MCAP voltage is in the range of 87-130 V; the turns ratio of 4.3:1 is selected when the MCAP voltage is in the range of 58-87 V; and the turns ratio of 2.3:1 is selected when the MCAP voltage is in the range of 30-58 V.

As an example, if the primary winding has 210 turns, then a first secondary winding would have 14 turns to provide a 15:1 turns ratio. A second secondary winding would have 7 turns such that, when coupled in series with the first secondary winding, yields 21 turns on the secondary to provide a 10:1 turns ratio. A third secondary winding would have 11 turns such that, when coupled in series with the first and second secondary windings, yields 32 turns on the secondary to provide a 6.5:1 turns ratio. A fourth secondary winding would have 17 turns such that, when coupled in series with the first, second, and third secondary windings, yields 49 turns on the secondary to provide a 4.3:1 turns ratio. A fifth secondary winding would have 42 turns such that, when coupled in series with the first, second, third, and fourth secondary windings, yields 91 turns on the secondary to provide a 2.3:1 turns ratio.

Figure 23:
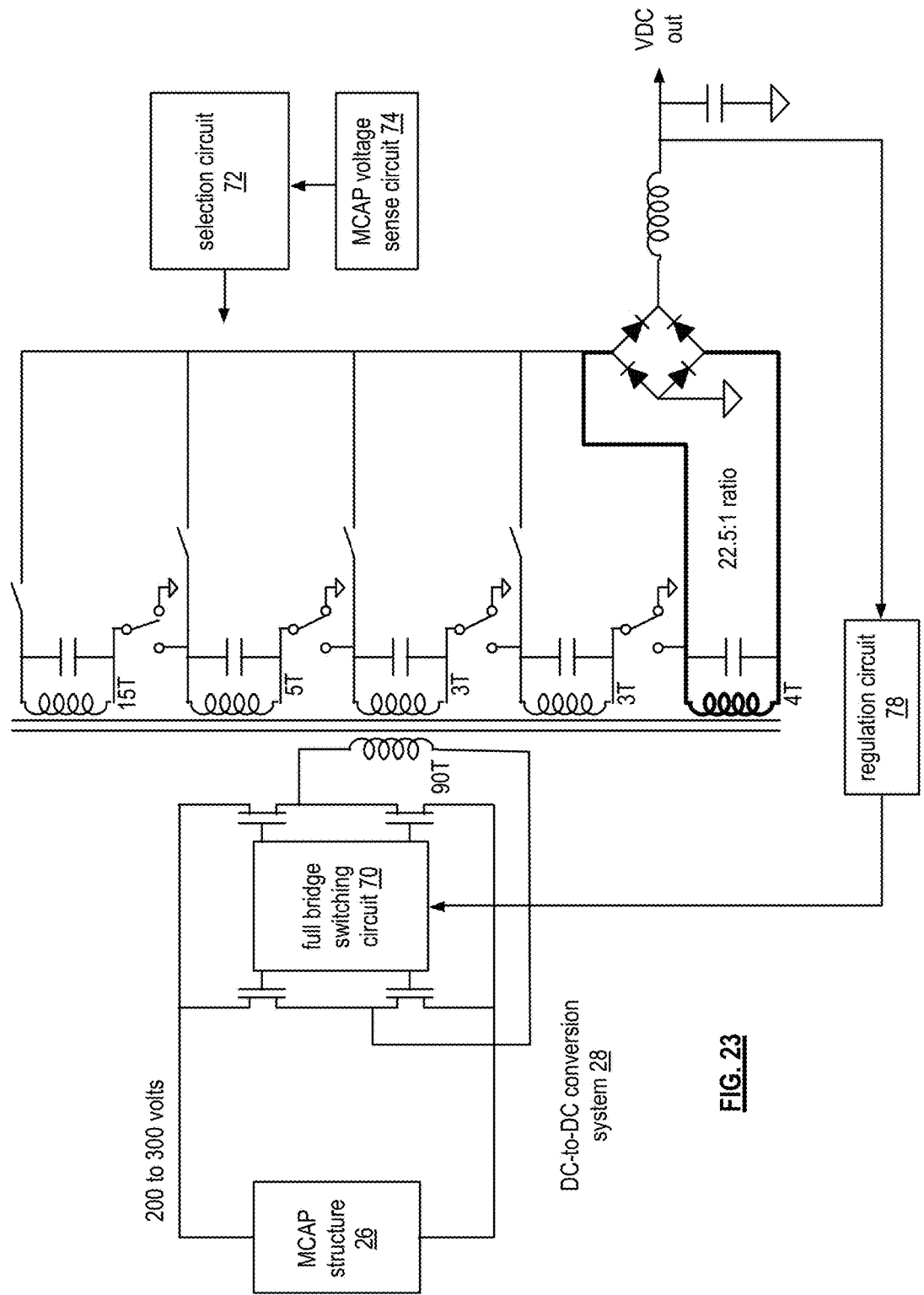
FIG. 23 is a schematic block diagram of an example of operation of a DC-to-DC conversion system 28 of an energy module in accordance with the present invention.

FIG. 23 is a schematic block diagram of an example of operation of the DC-to-DC conversion system 28 of FIG. 22. In this example, the MCAP voltage is in the range of 200 to 300 volts and the DC output voltage (or voltages) of the DC-to-DC conversion system 28 is in the range of 1-12 VDC. The selection circuit selects the first secondary winding having 14 turns to provide a 15:1 turns ratio with respect to the primary winding of 210 turns. In this situation, the transformer is stepping down the primary AC voltage of 200-300 volts (peak to peak) to 13.33-20 volts (peak to peak). The rectifying circuit rectifies the secondary voltage, which is provided to the output filtering circuit. The output filtering circuit filters the rectified selected secondary voltage to produce the DC output voltage in the range of 1 to 12 volts.

Figure 24:
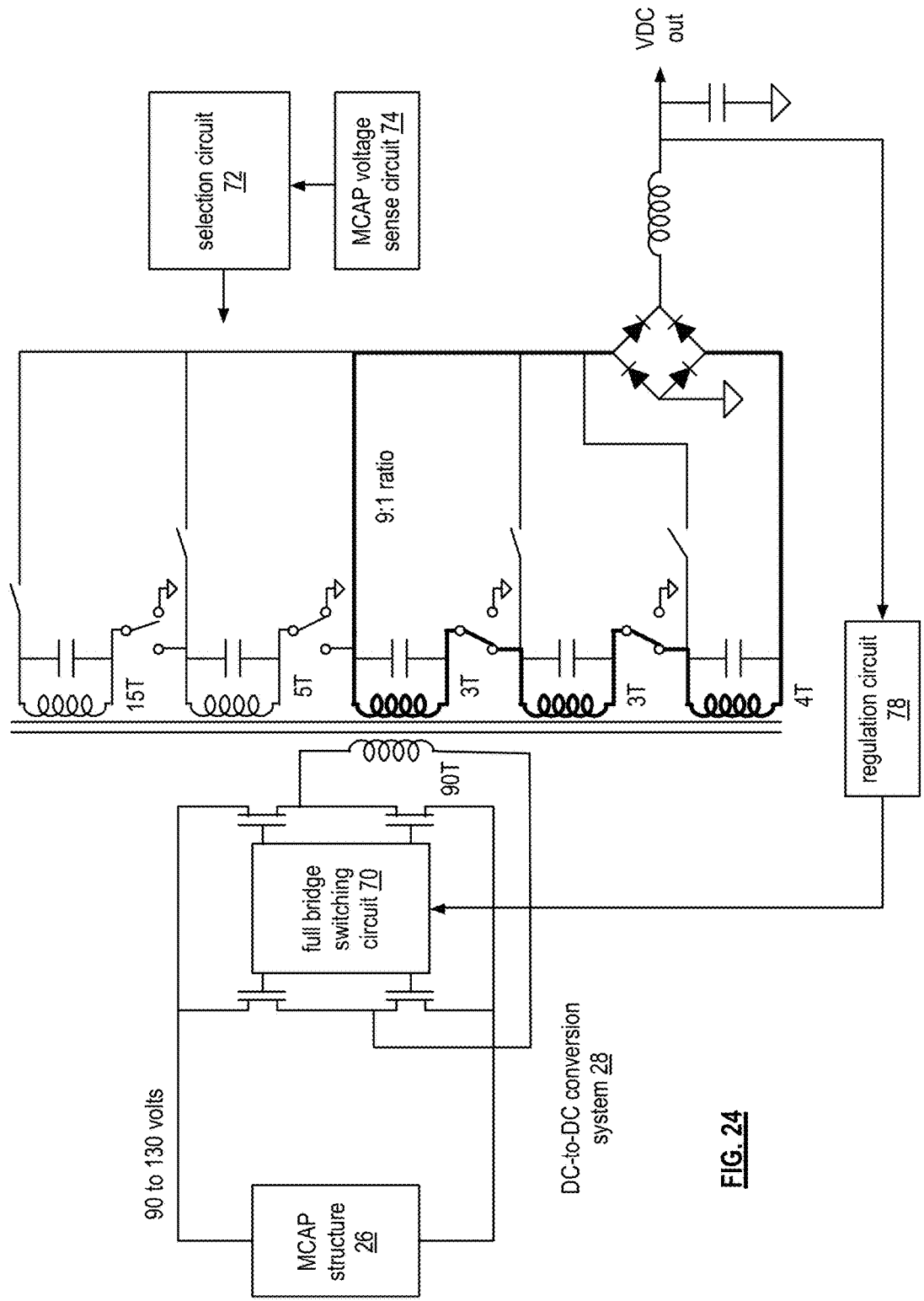
FIG. 24 is a schematic block diagram of another example of operation of a DC-to-DC conversion system 28 of an energy module in accordance with the present invention.

FIG. 24 is a schematic block diagram of another example of operation of the DC-to-DC conversion system 28 of FIG. 22. In this example, the MCAP voltage is in the range of 87 volts to 130 volts and the DC output voltage (or voltages) of the DC-to-DC conversion system 28 is in the range of 1-12 VDC. The selection circuit couples the first, second, and third secondary windings having 14, 7, and 11 turns respectively in series yielding 32 turns on the secondary to provide a 6.5:1 turns ratio with respect to the primary winding of 210 turns. In this situation, the transformer is stepping down the primary AC voltage of 87-130 volts (peak to peak) to 13.33-20 volts (peak to peak). The rectifying circuit rectifies the selected secondary voltage, which is provided to the output filtering circuit. The output filtering circuit filters the rectified secondary voltage to produce the DC output voltage in the range of 1 to 12 volts.

Figure 25:
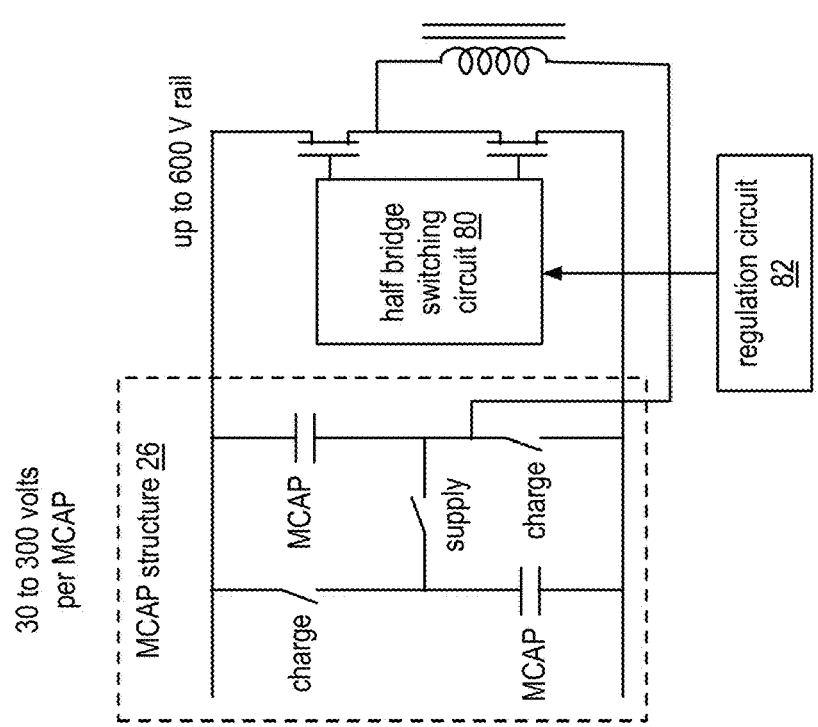
FIG. 25 is a schematic block diagram of another embodiment of a DC-to-DC conversion system 28 of an energy module in accordance with the present invention.

FIG. 25 is a schematic block diagram of another embodiment of a DC-to-DC conversion system 28 of an energy module. The DC-to-DC conversion system 28 includes a half bridge switching circuit 80, selection transistors T1 and T2, a transformer assembly (only the primary winding shown), and a regulation circuit 82. The secondary arrangement of the DC-to-DC conversion system 28 (not shown) operates as previously described with reference to FIGS. 20-24. The DC-to-DC conversion system 28 is coupled to an MCAP structure 26 that includes MCAPs 1-2, switches S1-S3, and a control module. MCAPs 1-2 have the same capacitance and are able to charge up to the same voltage (e.g., up to 300 volts each). The half bridge switching circuit creates a center tap between MCAPs 1-2. Based on switch signals sent to the MCAP structure 26 from the control module, switches S1-S3 can be closed to couple the MCAPs with the half bridge switching circuit in series or in parallel. When the MCAPSs are coupled in series with the half bridge switching circuit, the MCAPs supply energy to the transformer. When the MCAPs are coupled in parallel with the half bridge switching circuit, the MCAPs are disconnected from the DC-to-DC conversion system 28 are go into a charge mode.

In an example of operation, MCAP1 and MCAP2 are each capable of charging up to a desired voltage (e.g., 300 volts), which creates a rail voltage of up to twice the desired voltage (e.g., 600 volts). The half bridge switching circuit creates a common point between MCAP1 and MCAP2 and a half rail voltage of up to the desired voltage (e.g., 300 volts). When the control module determines that the MCAPs should be in supply mode, the control module sends switch signals to the MCAP structure 26 to couple MCAP1 and MCAP2 in series with the half bridge switching circuit by closing switch S3. When in supply mode and when T1 is on, energy is being drawn from MCAP1. When in supply mode and when T2 is on, energy is being drawn from MCAP2. Therefore, for a first half cycle, T1 is on, MCAP1 is providing energy, and the voltage with respect to the transformer is up to the desired voltage (e.g., +300 volts). For the next half cycle, T2 is on, MCAP2 is providing energy, and the voltage with respect to the transformer is up to the desired voltage (e.g., −300 volts).

When the control module determines that the MCAPs should be in a charge mode, the control module sends switch signals to the MCAP structure 26 to couple MCAP1 and MCAP2 in parallel with the half bridge switching circuit by closing switches S1 and S2. With the MCAPs in parallel with the half bridge switching circuit, T1 and T2 are disconnected from MCAP1 and MCAP2 so that MCAP1 and MCAP2 can charge from an external source (e.g., a 300 volt source).

Figure 26:
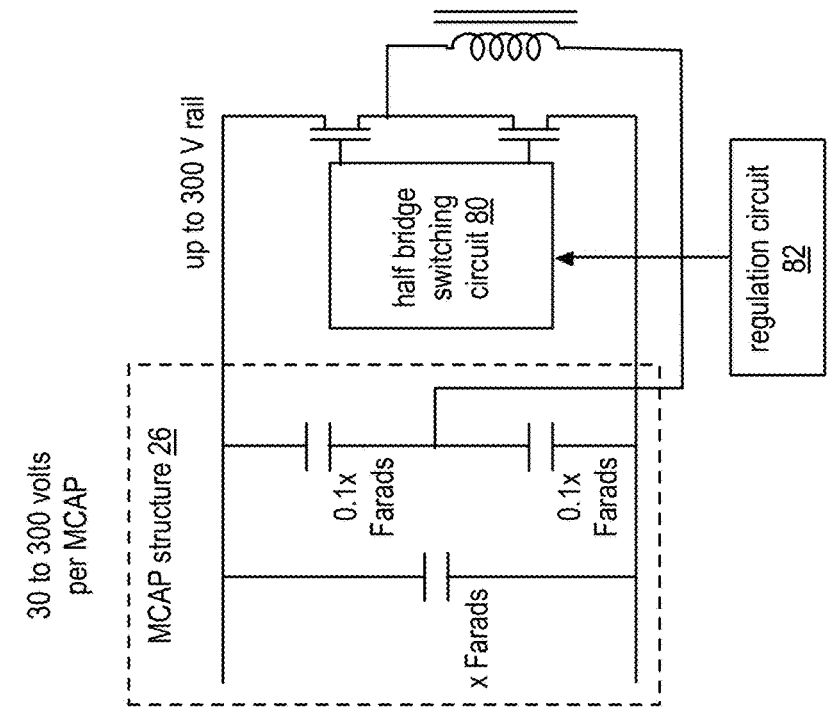
FIG. 26 is a schematic block diagram of another embodiment of a DC-to-DC conversion system 28 of an energy module in accordance with the present invention.

FIG. 26 is a schematic block diagram of another embodiment of a DC-to-DC conversion system 28 of an energy module. The DC-to-DC conversion system 28 includes a half bridge switching circuit, selection transistors T1-T3, a transformer assembly (only the primary winding shown), and a regulation circuit. The secondary arrangement of the DC-to-DC conversion system 28 (not shown) operates as previously described with reference to FIGS. 20-24. The DC-to-DC conversion system 28 is coupled to an MCAP structure 26. Selection transistor T3 may be located in the DC-to-DC conversion system 28 or in the MCAP structure 26. The MCAP structure 26 includes MCAPS 1-3. MCAP1 is a large MCAP with a capacitance of x Farads. MCAPs 2-3 are smaller MCAPs in comparison to MCAP1 (e.g., each having a capacitance of 0.1× Farads). The half bridge switching circuit connects MCAP2 and MCAP3 creating a center tap so that energy may be supplied to the transformer from both MCAP2 and MCAP3.

Figure 26A:
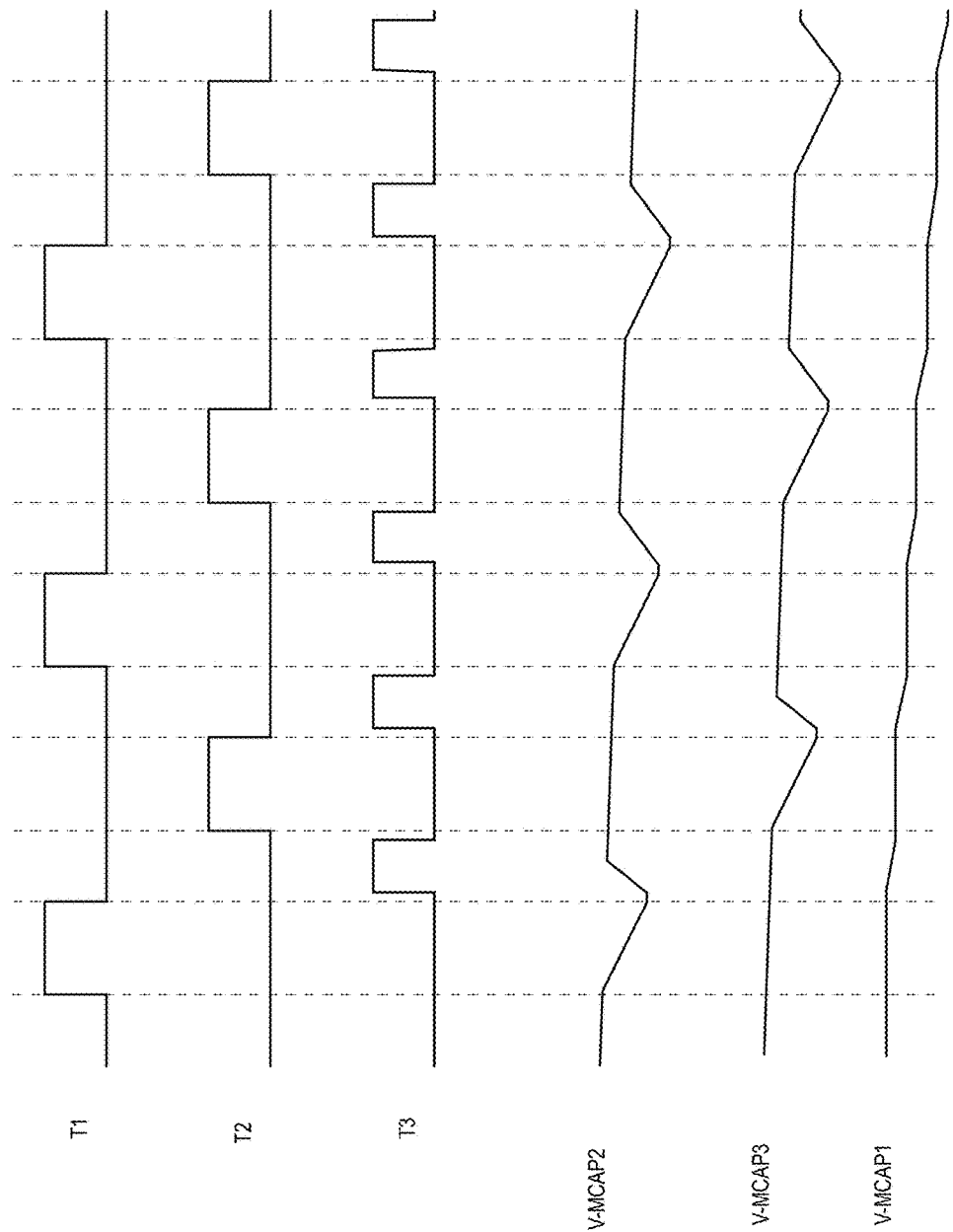
FIG. 26A is a schematic block diagram of another embodiment of a DC-to-DC conversion system 28 of an energy module in accordance with the present invention.

In an example of operation, MCAP1 is capable of charging up to a desired voltage (e.g., 300 volts), which creates a rail voltage of the desired voltage. The half bridge switching circuit creates a common point between MCAP2 and MCAP3 so that MCAP2 and MCAP3 may each be charged up to a half rail voltage (e.g., 150 volts). With reference to FIG. 26A, the voltage across MCAP1 over time is shown as V-MCAP1, the voltage across MCAP2 over time is shown as V-MCAP2, and the voltage across MCAP3 over time is shown as V-MCAP3. When T1 is on, MCAP2 is supplying energy to the transformer. As shown in FIG. 26A, as MCAP2 supplies energy to the transformer, V-MCAP2 drops (e.g., from 150 volts to 144.5 volts). When T3 is on, MCAP1 and MCAP3 transfer energy to MCAP2 such that the center tap of MCAP 2 and MCAP 3=½V-MCAP1 (e.g., 150 volts). For example, if ½V-MCAP1=150 volts and V-MCAP2 drops to 144.5 volts while supplying energy to the transformer, V-MCAP1 drops and V-MCAP2 drops to restore V-MCAP2 to the center tap of ½V-MCAP1. Because V-MCAP1 drops while T3 is on, the center tap voltage will also drop. When T2 is on, MCAP3 is supplying energy to the transformer. As shown in FIG. 26A, as MCAP3 is supplying energy to the transformer, V-MCAP3 drops. When T3 is back on, MCAP1 and MCAP2 transfer energy to MCAP3 such that the center tap of MCAP2 and MCAP3=½V-MCAP1. As shown in FIG. 26A, every time T3 is on, V-MCAP1 drops slightly, which causes the curves of V-MCAP2 and V-MCAP3 to have a slight downward slope.

Figure 27:
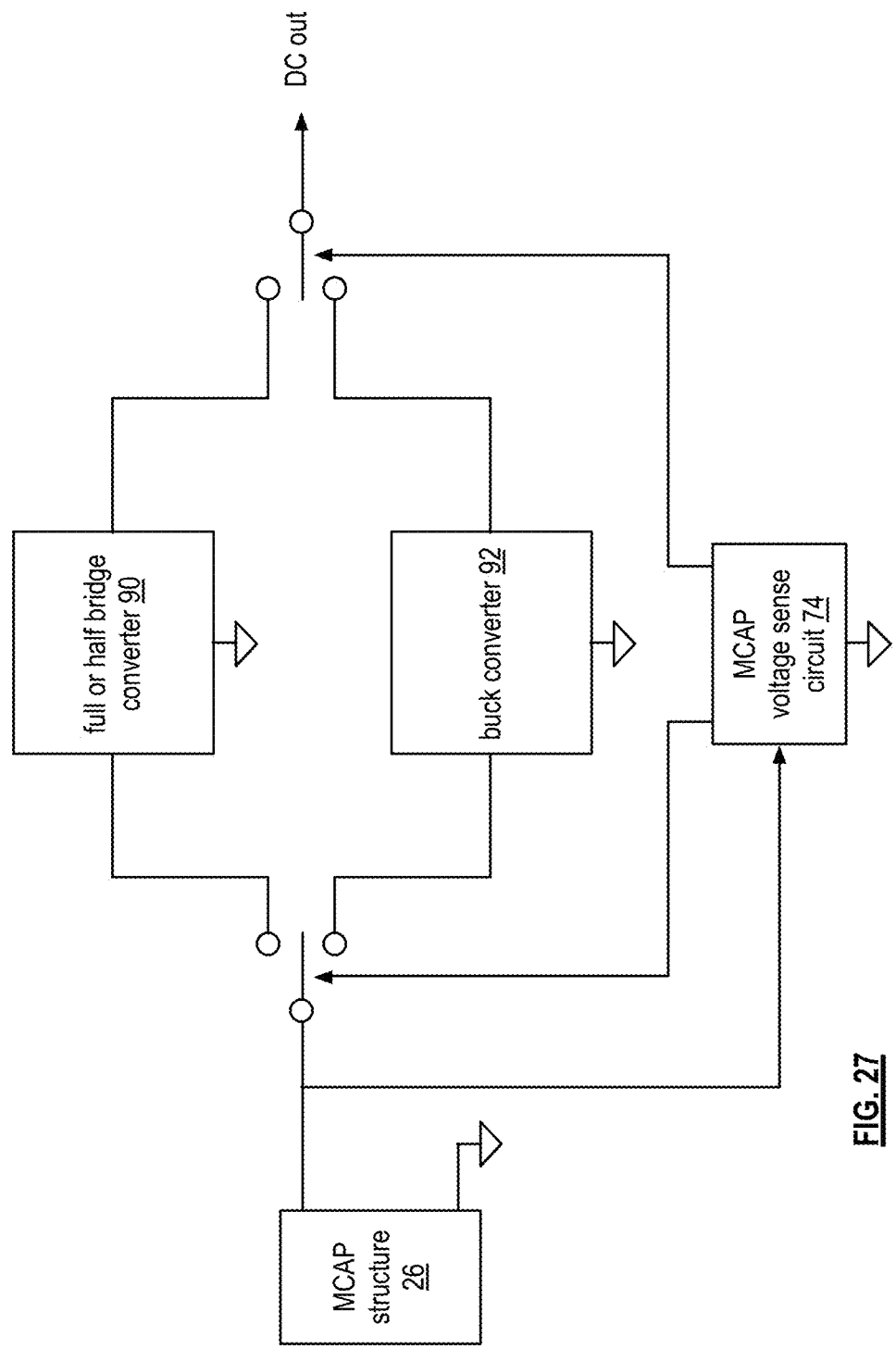
FIG. 27 is a schematic block diagram of another embodiment of a DC-to-DC conversion system 28 of an energy module in accordance with the present invention.

FIG. 27 is a schematic block diagram of another embodiment of a DC-to-DC conversion system 28 of an energy module. The DC-to-DC conversion system 28 includes, a full or half bridge converter 90, a buck converter 92, switches, an MCAP voltage sense circuit 74, and is coupled to an MCAP structure 26. The full or half bridge converter may operate as previously described with reference to FIGS. 20-26. As the MCAP voltage changes, the MCAP voltage sensor circuit selects different convertor topologies (e.g., full, half, or buck converter topologies) for better energy efficiency.

In an example, when the MCAP voltage is above a threshold (e.g., 50-100 volts), the MCAP voltage sensor selects a full or half bridge convertor topology. When the MCAP voltage is below a threshold (e.g., 50-100 volts), the MCAP voltage sensor selects a buck convertor topology. The buck convertor topology is selected at lower voltage to get additional energy out of the MCAP before recharging.

Figure 28:
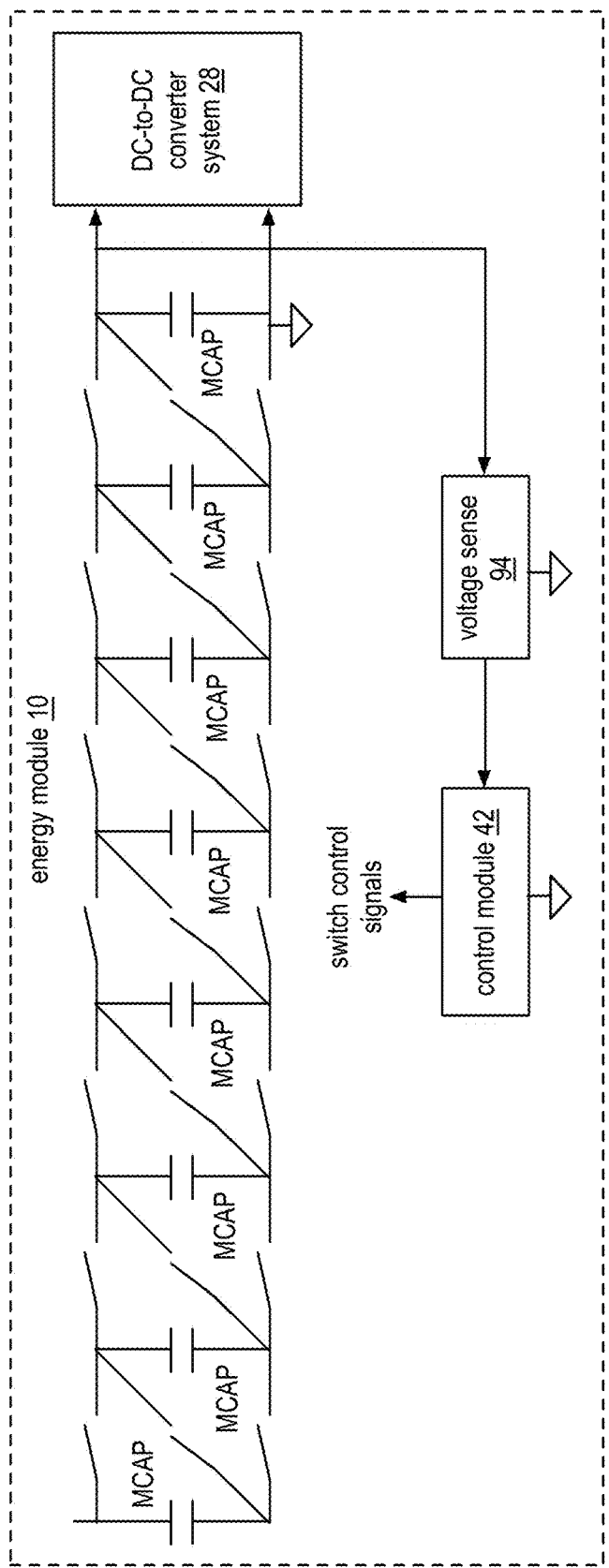
FIG. 28 is a schematic block diagram of another embodiment of an energy module in accordance with the present invention.

FIG. 28 is a schematic block diagram of another embodiment of an energy module. The energy module 10 includes a variable MCAP configuration, a DC-to-DC converter system 28, a control module 42, and a voltage sense unit 94. With a variable MCAP configuration, a desired voltage range (e.g., 150-300 volts) can be maintained in the MCAP structure 26 by configuring the MCAPs in different ways. Maintaining the voltage in the MCAP structure 26 eliminates the need for the DC-to-DC conversion system 28 to select or couple secondary windings of a transformer assembly to achieve a desired secondary voltage. Thus, a variable MCAP configuration simplifies the DC-to-DC conversion system 28 design.

In an example of operation, the voltage sense unit senses when the voltage drops in the MCAP structure 26 and alerts the control module. The control module sends switch control signals to the MCAP structure 26 to adjust the variable MCAP configuration in order to maintain the desired voltage (e.g., between 150-300 volts).

Figure 29:
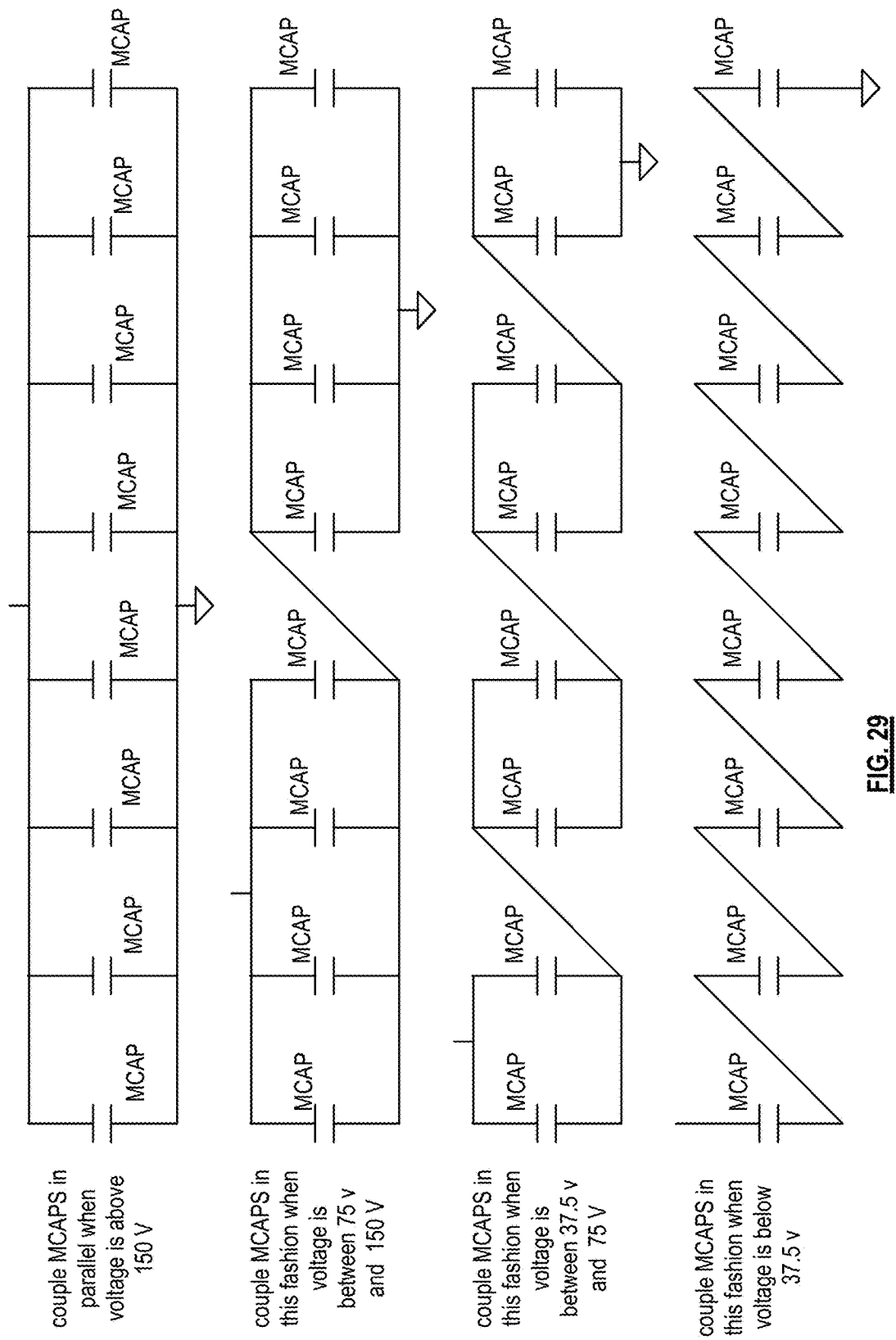
FIG. 29 is a diagram of examples of configuring an energy module in accordance with the present invention.

FIG. 29 is a diagram of examples of configuring the variable MCAP configuration of an energy module 10 to maintain a desired voltage range. In an example, the variable MCAP configuration includes eight MCAPs that can be configured in different ways to maintain a desired voltage range of 150-300 volts. When the voltage sense unit senses that the MCAP voltage is above 150 volts, the control module sends switch control signals to the variable MCAP configuration to couple the MCAPs in parallel to maintain the desired voltage of 150-300 volts. When the voltage sense unit senses that the MCAP voltage is between 75 and 150 volts, the control module sends switch control signals to the variable MCAP configuration to couple the first, second, third, and fourth MCAPs in parallel, the fourth and fifth MCAPs in series, and the fifth, sixth, seventh, and eighth MCAPs in parallel to maintain the desired voltage of 150-300 volts. When the voltage sense unit senses that the MCAP voltage is between 37.5 volts and 75 volts, the control module sends switch control signals to the variable MCAP configuration to couple the first and second MCAPs in parallel, the second and third MCAPs in series, the third and fourth MCAPs in parallel, the fourth and fifth MCAPs in series, the fifth and sixth MCAPs in parallel, the sixth and seventh MCAPs in series, and the seventh and eighth MCAPs in parallel to maintain the desired voltage of 150-300 volts. When the voltage sense unit senses that the MCAP voltage is below 37.5 volts, the control module sends switch control signals to the variable MCAP configuration to couple the MCAPs in series to maintain the desired voltage of 150-300 volts.

Figure 30:
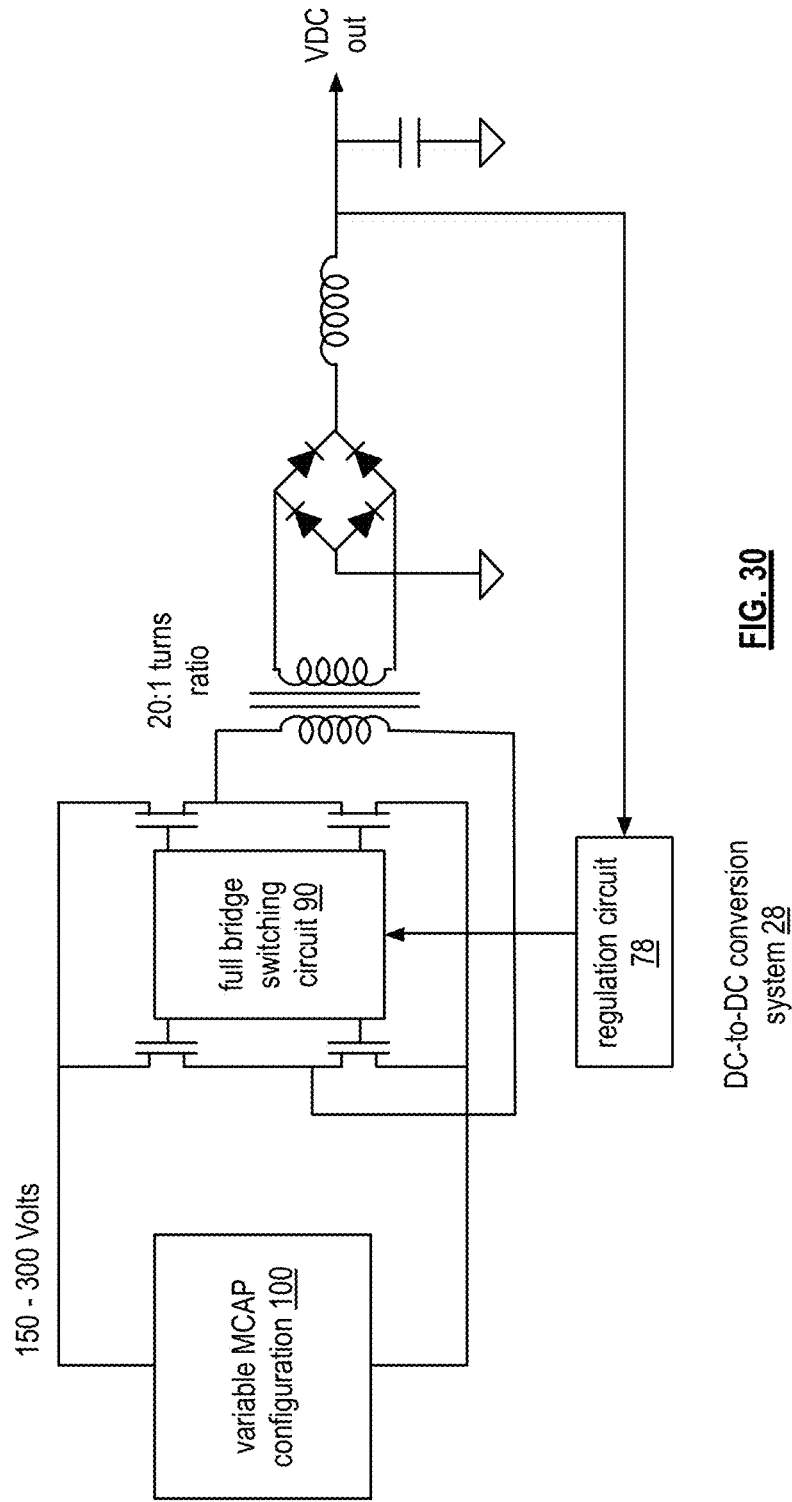
FIG. 30 is a schematic block diagram of another embodiment of an energy module in accordance with the present invention.

FIG. 30 is a schematic block diagram of another embodiment of an energy module. The energy module 10 includes a variable MCAP configuration 100, and a DC-to DC conversion system 28. The DC-to-DC conversion system 28 includes a full or half bridge switching circuit 90, switching transistors, a 20:1 turns ratio transformer, a rectifying circuit, a regulation circuit 78, and an output filtering circuit. Compared to the DC-to-DC conversion system 28 of FIGS. 20-27, the DC-to-DC conversion system 28 of FIG. 30 is simplified in that it requires only one secondary winding and does not require a selection circuit.

In an example of operation, the variable MCAP configuration maintains a desired voltage (e.g., 150-300 volts) by reconfiguring the variable MCAP configuration as described in FIGS. 28 and 29. For instance, when the desired voltage range is 150-300 volts and the voltage sense unit senses that the MCAP voltage is below 37.5 volts, the control module sends switch control signals to the variable MCAP configuration to couple the MCAPs in series to maintain the desired voltage of 150-300 volts. As such, the variable MCAP configuration provides the desired voltage range to the DC-to-DC conversion system 28 even as the MCAP voltage drops. The switching transistors of the DC-to-DC conversion system 28 are turned on and off based on signaling from the full or half bridge switching circuit to produce an AC primary voltage. The AC primary voltage is applied to the primary of the 20:1 turns ratio transformer. The transformer steps down the desired voltage (e.g., 150-300 volts peak to peak) to a desired secondary voltage (e.g., 7.5-15 volts peak to peak). The rectifying circuit rectifies the secondary voltage, which is provided to the output filtering circuit. The output filtering circuit filters the rectified secondary voltage to produce the desired DC output voltage. For example, when the desired DC output voltage is 5 volts or less, the variable MCAP structure 26 is configured to maintain 150-300 volts (peak to peak) such that the 20:1 transformer steps down the voltage to 7.5-15 volts (peak to peak).

Figure 31:
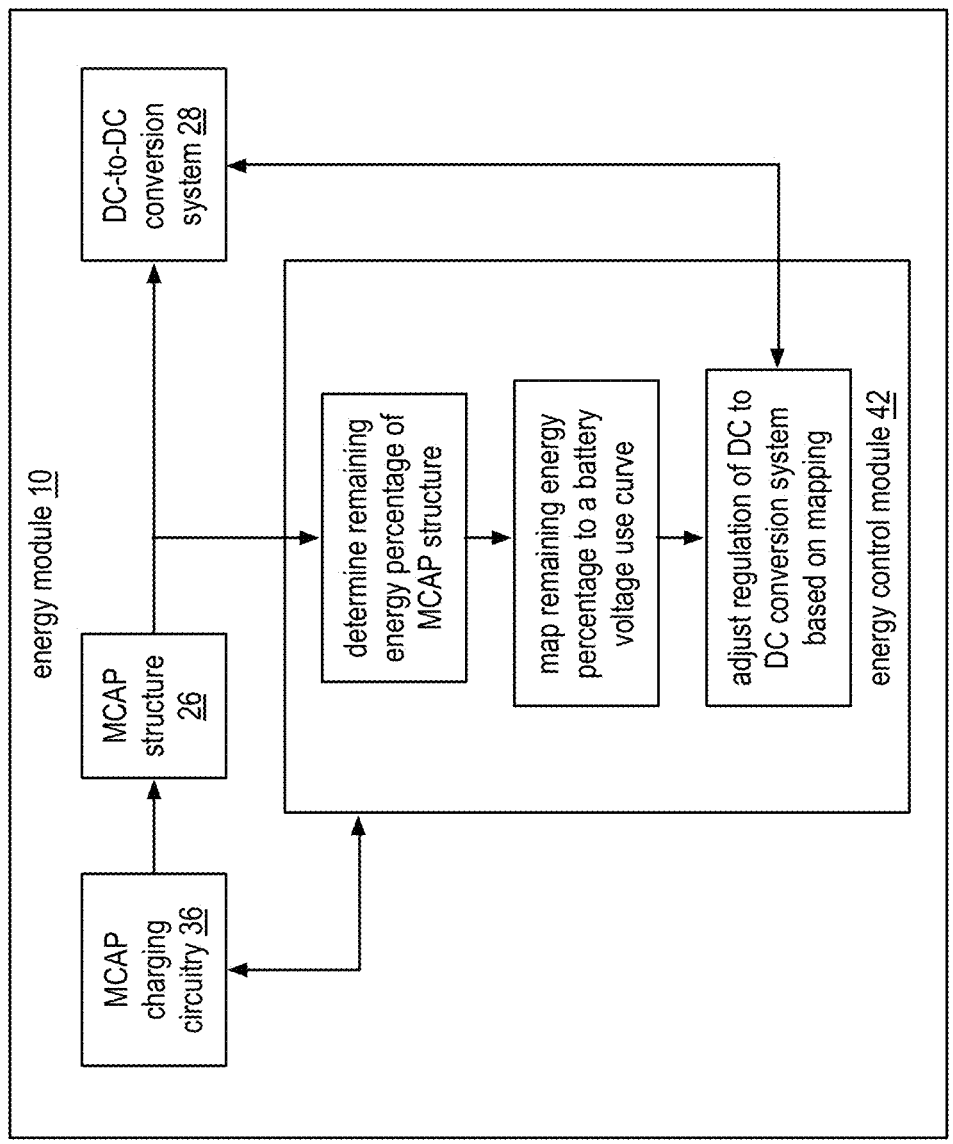
FIG. 31 is a schematic block diagram of an example of operating an energy module in accordance with the present invention.

FIG. 31 is a schematic block diagram of an example of operating an energy module. The energy module 10 includes MCAP charging circuitry 38, an MCAP structure 26, a DC-to-DC conversion system 28, and an energy control module 42. The energy control module 42 determines what type of device 12 is using the energy module 10 and whether the device 12 includes battery drop off compensation circuitry (e.g., circuitry to monitor battery decay due to use). When the energy control module 42 determines that a device 12 with battery drop off compensation circuitry is using the energy module, the energy control module 42 maps the remaining energy percentage of the MCAP to the device's battery voltage use curve so that the device's battery drop off compensation circuitry will operate properly.

Figure 32:
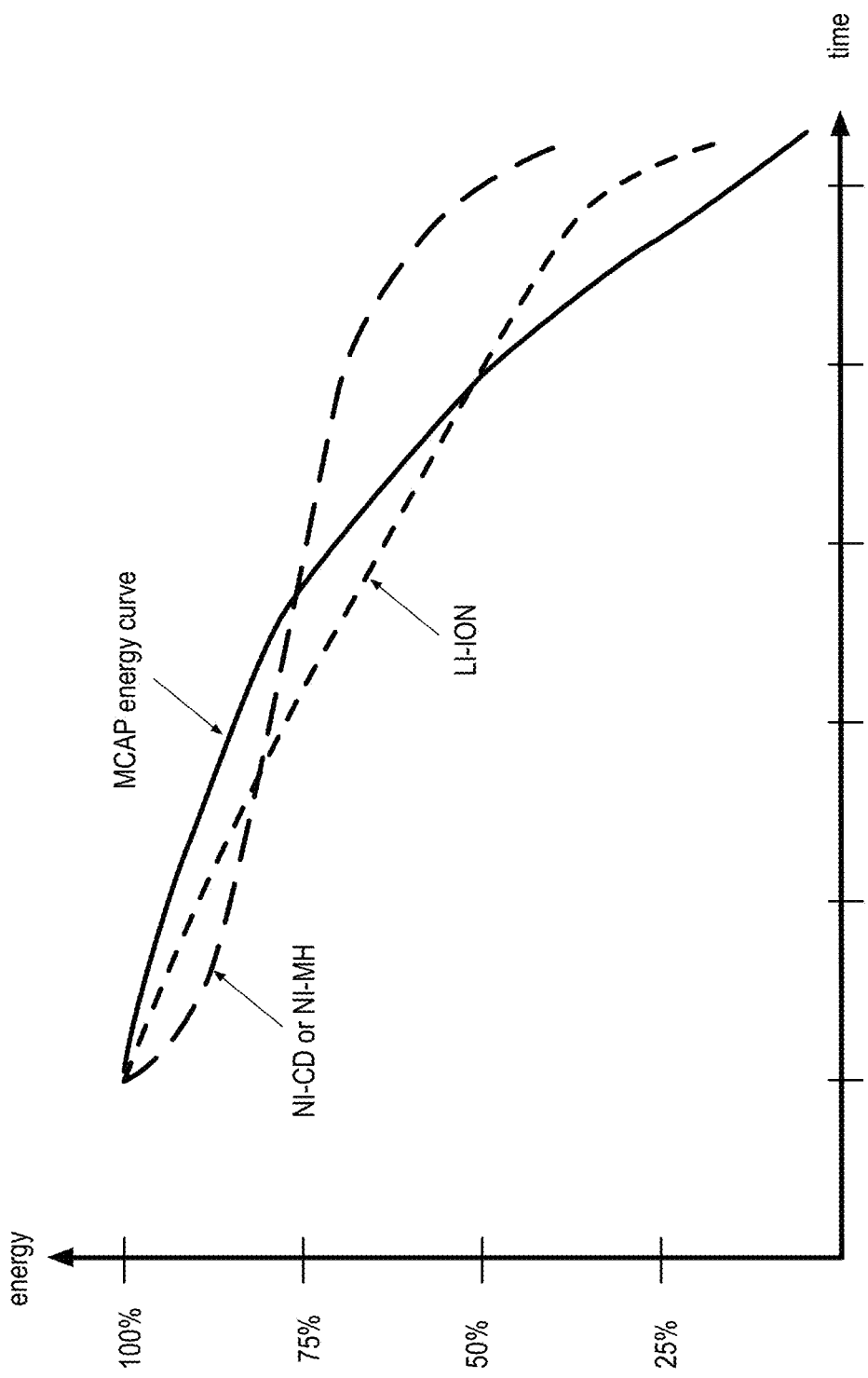
FIG. 32 is a diagram of an example of operating an energy module in accordance with the present invention.

As an example and with reference to FIG. 32, the energy control module 42 may determine that a device 12 with a NI-CD or NI-MH battery and the corresponding battery drop off compensation circuitry is using the energy module. The energy control module 42 determines the remaining energy percentage of the MCAP structure 26 and maps the remaining energy percentage to the battery voltage curve of a NI-CD or NI-MH battery (as shown in FIG. 32). The energy control module 42 adjusts the regulation of the DC-to-DC conversion system 28 based on the mapping. As the device 12 uses the energy module, the energy control module 42 continues to adjust the DC output by mapping the MCAP curve to the battery curve so that the device's battery drop off compensation circuitry operates properly throughout use. For example, if the energy control module 42 determines the remaining energy percentage of the MCAP structure 26 is %80, the energy control module 42 maps the point at %80 on the MCAP curve to the corresponding point on the NI-CD or NI-MH battery voltage use curve. At %80 remaining energy, the MCAP has a higher voltage than the NI-CD or NI-MH battery. Therefore, the energy control module 42 adjusts the regulation of the DC-to-DC conversion system 28 based on the mapping so that the DC output drops accordingly.

As another example and with further reference to FIG. 32, the energy control module 42 may determine that a device 12 with a LI-ION battery and the corresponding battery drop off compensation circuitry is using the energy module. The energy control module 42 determines the remaining energy percentage of the MCAP structure 26 and maps the remaining energy percentage to the battery voltage curve of a LI-ION battery (as shown in FIG. 32). The energy control module 42 adjusts the regulation of the DC-to-DC conversion system 28 based on the mapping. As the device 12 uses the energy module, the energy control module 42 continues to adjust the DC output by mapping the MCAP curve to the battery curve so that the device's battery drop off compensation circuitry operates properly throughout use. For example, if the energy control module 42 determines that the MCAP structure 26 is at %45 remaining energy, the energy control module 42 maps the %45 point of the MCAP curve to the corresponding point on the LI-ION battery voltage use curve. At %45 remaining energy, the MCAP voltage has a lower voltage than the LI-ION battery. Therefore, the energy control module 42 adjusts the regulation of the DC-to-DC conversion system 28 based on the mapping so that the DC output rises accordingly.

Figure 33:
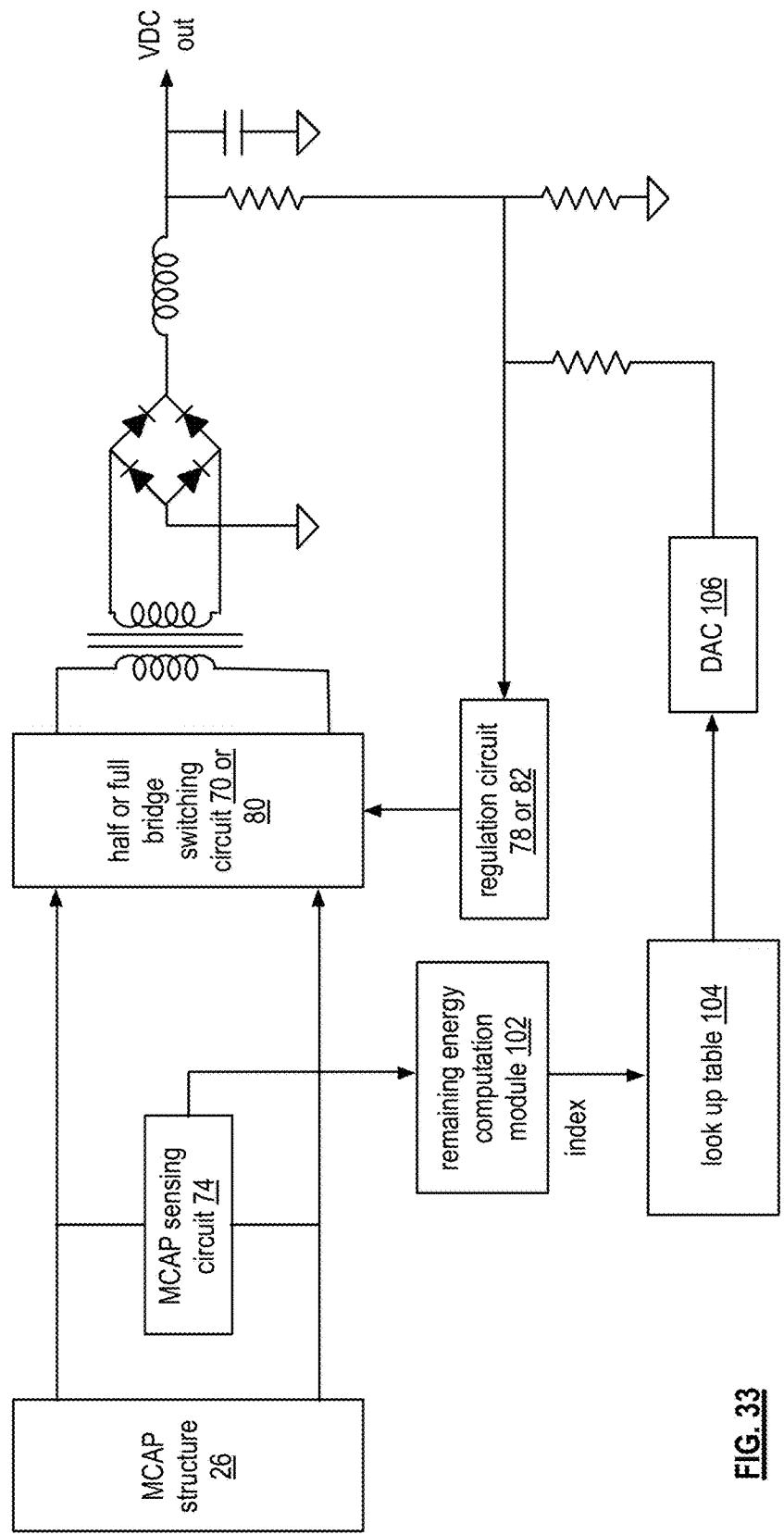
FIG. 33 is a schematic block diagram of another embodiment of an energy module in accordance with the present invention.

FIG. 33 is a schematic block diagram of another embodiment of an energy module. The energy module 10 includes an MCAP structure 26, an MCAP sensing circuit, a DC-to-DC conversion system 28, a remaining energy computation module 102, a look up table 104, and a digital to analog converter (DAC) 106. The DC-to-DC conversion system 28 includes a half or full bridge switching circuit 70 or 80, a transformer, a rectifying circuit, a regulation circuit 78 or 82, and an output filtering circuit. The DC-to-DC conversion system 28 may, however, be in any configuration as previously described with reference to FIGS. 20-30.

When a battery powered device 12 is using the energy module, the energy module 10 can effectively mimic the voltage decay of the device's battery. Instead of mapping the MCAP's remaining energy to a point in the device's battery voltage use curve and adjusting the DC output to a certain value (e.g., 5 volts) as in FIG. 31, here, the device's battery voltage use curve is mimicked using the remaining energy computation module, the look up table, and the DAC. In an example, the MCAP sensing circuit senses a voltage change in the MCAP structure 26 and communicates the change to the remaining energy computation module. The remaining energy computation module computes the remaining energy of the MCAP structure 26 and maps the value to the device's battery voltage use curve. The mapped values are indexed in a look up table. The DAC converts the values to a curve resembling that of the device's battery voltage use curve. The regulation circuit uses the mimicked battery voltage use curve to adjust the DC output to resemble the voltage decay of the battery.

Figure 34:
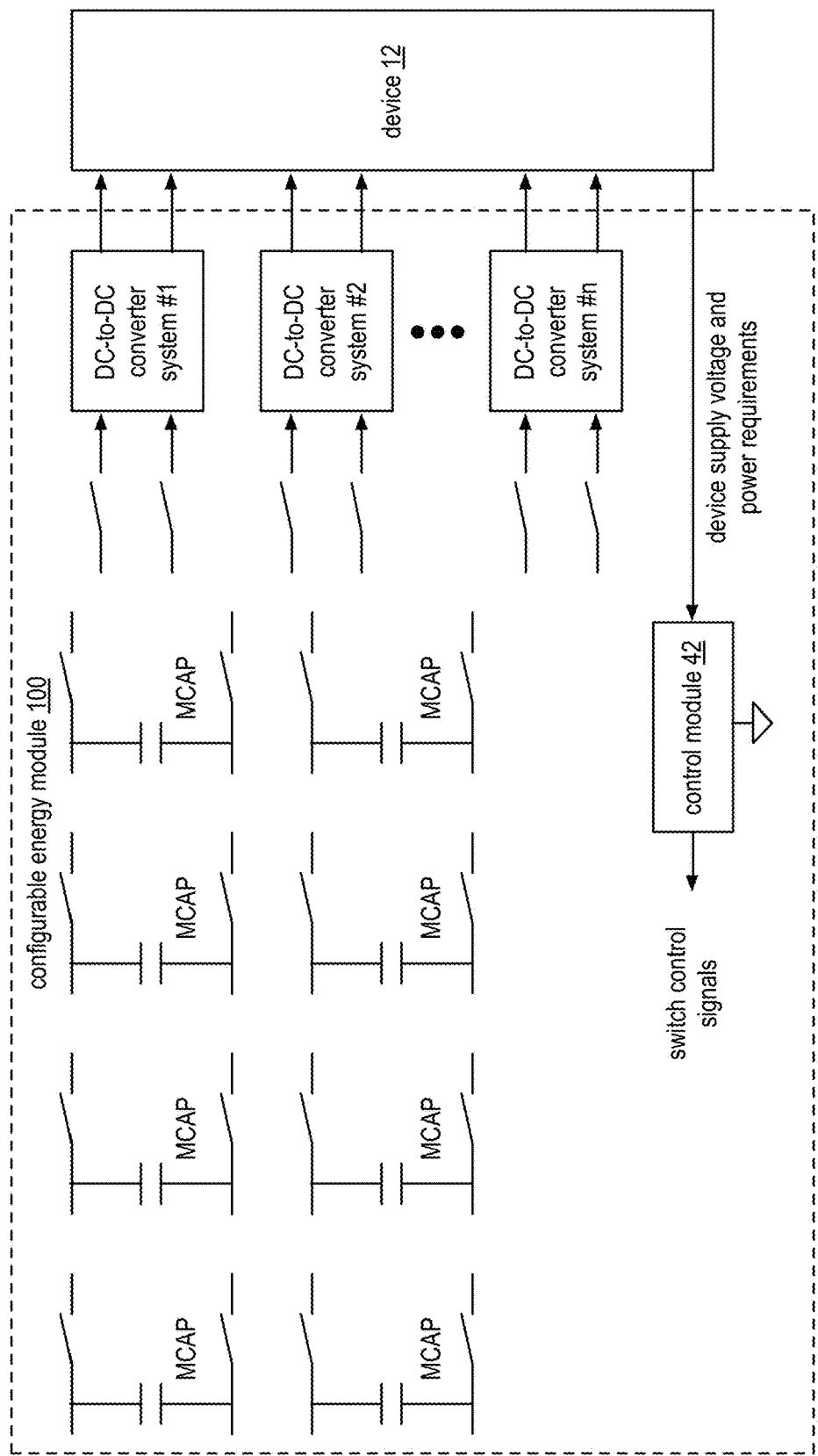
FIG. 34 is a schematic block diagram of another embodiment of an energy module in accordance with the present invention.

FIG. 34 is a schematic block diagram of another embodiment of an energy module 10. The energy module 10 includes a variable MCAP structure 26, multiple DC-to-DC converter systems, a plurality of switches, and a control module 42. When coupled to a device 12, the energy module 10 is configured based on the device's supply and power needs. The control module determines the device's supply voltage and power requirements and sends switch control signals to the variable MCAP structure 26 and DC-to-DC converter system to configure the energy module 10 to meet the device's requirements. In device circuitries where there is higher output (e.g., audio or video) and greater power consumption, more than one DC-to-DC converter system is used to improve efficiency.

In an example, assume that the device 12 requires two supply voltages at different power levels (e.g., 1.5 V at 0.5 W and 3.3 V at 2 W). Further assume that the variable MCAP structure 26 includes 25 MCAPs. The control module would allocate three DC-to-DC conversion systems 28 to supply to the desired voltages. With an objective of having the energy of the 25 MCAPs being relatively evenly consumed, the control module would allocate 5 MCAPs for the 1.5 V DC-to-DC conversion system 28 and 20 MCAPs for the 3.3 V DC-to-DC conversion system 28 (since it is four times the power of the 1.5 V output.

With the allocations determined, the control module enables a set of switches to couple five of the MCAPs to a first DC-to-DC conversion system 28 for the 1.5 V at 0.5 W output and enables another set of switches to couple 20 MCAPs in parallel and to a second DC to DC conversion system for the 3.3 V at 2 W output. Each of the DC-to-DC conversion systems 28 may be of the type that has been previously discussed and/or will be subsequently discussed.

Figure 35:
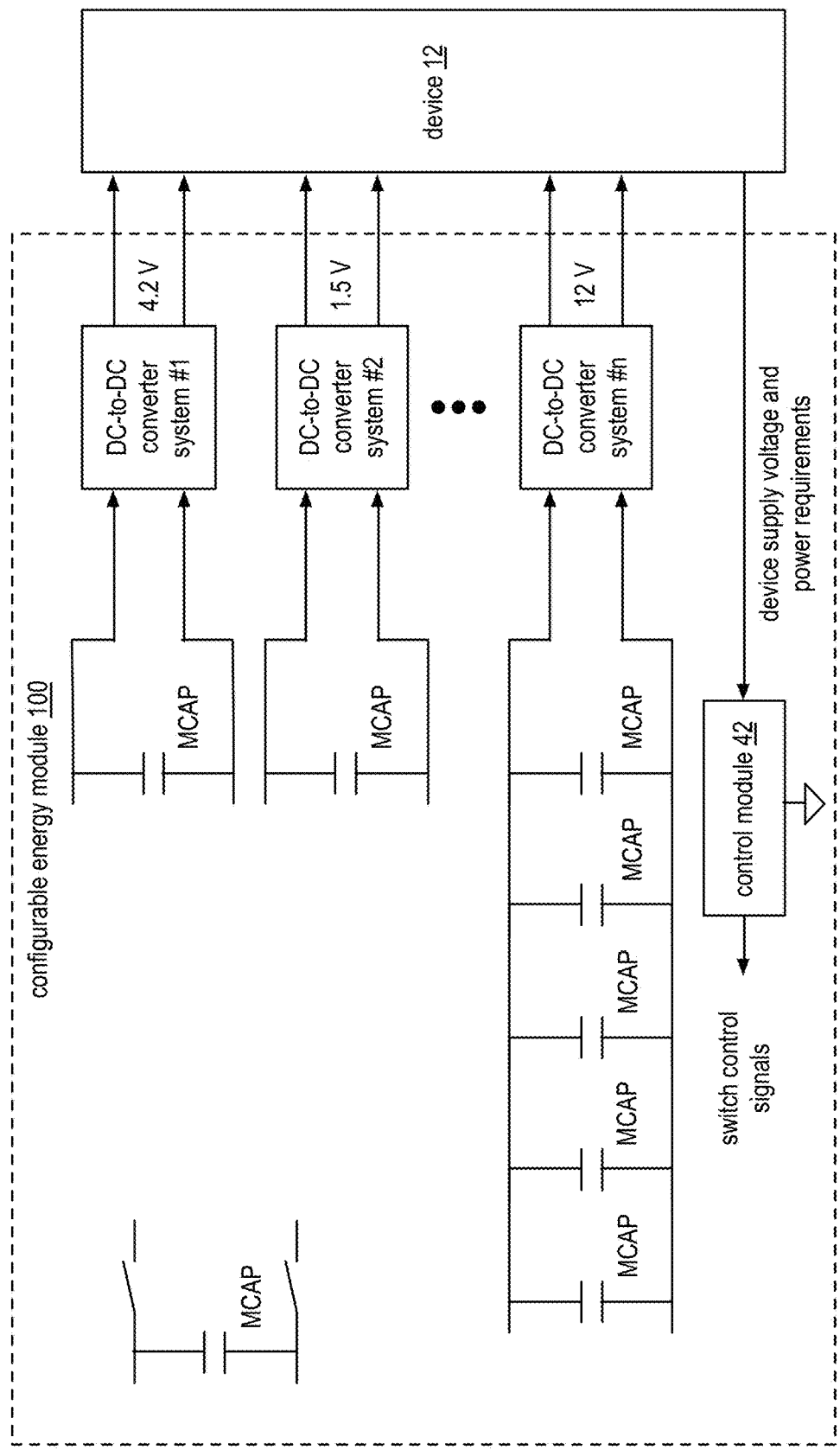
FIG. 35 is a diagram of an example of configuring an energy module in accordance with the present invention.

FIG. 35 is a diagram of a specific example of configuring an energy module 10 of FIG. 34. In this example, the control module 42 receives information from the device 12, which indicates that the device 12 requires three supply voltages at different power levels. The three supply voltages are 4.2 V at 0.05 Watt-hours, 1.5 V at 0.1 Watt-hours, and 12 V at 0.5 Watt-hours. Based on this information, the control module determines how to allocate its eight MCAPs.

For instance, the control module determines a power ratio with respect to one of the supply voltages and the others. In this example, the 1.5 V output has a 2-to-1 power ratio with respect to the 4.2 V output and the 12 V output has a 10-to-1 power ratio with respect to the 4.2 V output. Thus, for the MCAPs to be consumed in an evenly manner, it is desirable to allocate the MCAPs to the supply voltages based on the power ratios. An exact allocation of MCAPs to the supply voltages is not possible since the energy module 10 includes only eight MCAPs. For an exact MCAP allocation based on power ratios, the energy module 10 would need at least 13 MCAPs, or multiples thereof.

When the exact allocation cannot be achieved, a next best approach is to determine whether an exact allocation of the MCAPs can be made for at least some of the supply voltages (e.g., the ones having the higher power requirements). In this example, the 12 V output has a 5-to-1 power ratio with respect to the 1.5 V output. As such, an exact allocation of MCAPs can be achieved by allocating five times as many MCAPs to the 12 V output as to the 1.5 V output. In this example, with eight MCAPs, five of them can be allocated to the 12 V output and 1 can be allocated to the 1.5 V output, leaving, for the moment, two unallocated MCAPs.

With the remaining 2 MCAPs, the control module determines to allocate one of them to the 4.2 V output and to keep the other in reserve. As the device 12 is used, the control module monitors the power consumption of each of the output voltages and the corresponding energy consumption of the allocated MCAPs. If the monitored energy consumption closely correlates to the requested power consumption when the initial MCAP allocations were made, the control module may decide how to use the reserved MCAP and/or to adjust MCAP allocation. For instance, the control module flip-flops the allocation of the MCAPs to the 4.2 V output and the 1.5 V output such that the MCAP that was sourcing the 4.2 V output is now sourcing the 1.5 V output and vice versa. Alternatively or in addition to, the control module may allocate the reserved MCAP to one of the supply voltages.

If the monitored energy consumption does not closely correlate to the requested power consumption when the initial MCAP allocations were made, the control module may completely, or partially, reallocate the MCAPs among the output voltages. For instance, if the 12 V output is consuming only 0.2 Watt-hours, the control module reallocates the MCAPs such that one is allocated to the 4.2 V output, two are allocated to the 1.5 V output, and four are allocated to the 12 V output.

The control module may keep more than one MCAP in reserve depending on a number of factors. For example, the device 12 may send a control signal to the control module indicating that two or more MCAPs are to be held in reserve. As another example, the control module determines that the best allocation of the MCAPs to the output voltages includes having two or more MCAPs held in reserve. As yet another example, the control module may receive information from a server, where the information indicates that, for this type of device 12, it is advisable to keep two or more MCAPs in reserve.

Figure 36:
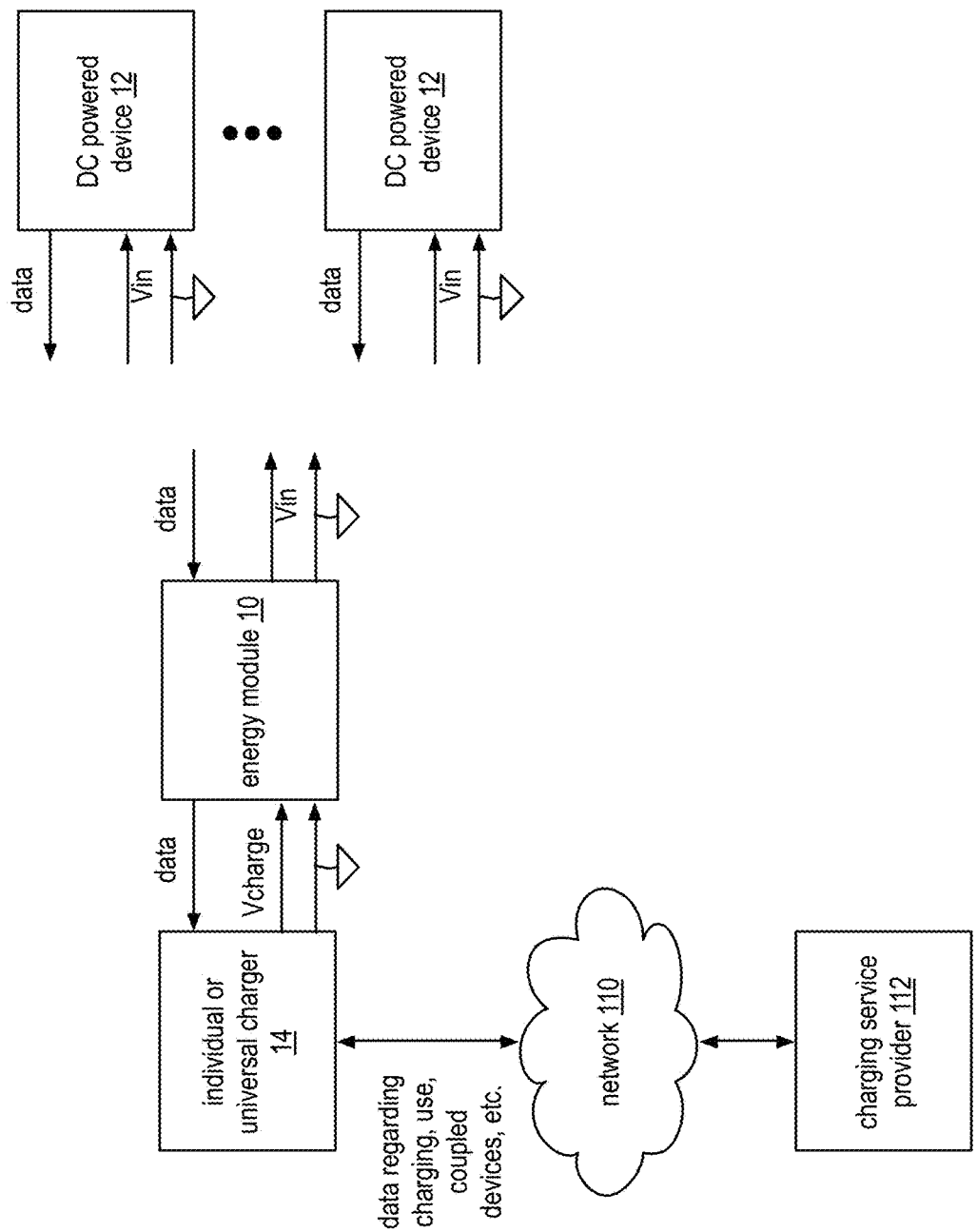
FIG. 36 is a schematic block diagram of an embodiment of a communication system that includes an energy module in accordance with the present invention.

FIG. 36 is a schematic block diagram of an embodiment of a communication system that includes an energy module 10 coupled to a charger 14. The charger 14 may be an individual charger 14 or a universal charger 14. An individual charger 14 may include charging circuitry designed to charge a specific type of energy module. For instance, the individual charger 14 is typically for private use and is typically sold with the energy module. A universal charger 14 includes charging circuitry designed to charge a variety of types of energy modules. For example, a universal charger 14 is publicly used at charging stations. As another example, a universal charge is privately used for charging a variety of energy modules.

Regardless of whether the charger 14 is the individual charger 14 or universal charger 14, it includes circuitry to receive data from an energy module. The charger 14 also includes circuitry to exchange data with a charging service provider via network. When connected to an energy module, the charger 14 collects data from the energy module. The data includes user information, device information, and utilization information. The user information includes identity of the user, account information, registration information, and/or any other data relevant regarding a user. The device information includes data regarding devices to which the energy module 10 has been coupled. For example, the data regarding devices includes a device identifier, a device serial number, a device type, and/or any other relevant information regarding the device 12.

The utilization information includes a variety data points regarding use of the energy module. For example, the utilization information includes the number of times the energy module 10 has been charged, historical data of charging the energy module, intervals between charging, identity of chargers that have charged the energy module, the number of charges remaining, charging subscription information, operating temperatures of the energy module, and/or any other relevant information regarding the charging of the energy module. The utilization information may also include information regarding usage of the device 12. For example, the utilization information includes power consumption, time of use, time of day, identity of user applications, and/or any other relevant information regarding use of the device 12.

The charger 14 sends the data it collects regarding an energy module 10 to the charging service provider 112 via the network 110. The charging service provider utilizes the energy module 10 data in a variety of ways. For example, the charging service provider utilizes the energy module 10 data for billing with respect to charging the energy module. In this example, charging of an energy module 10 is done on a subscription basis. In particular, an energy module 10 is associated with a subscription account that is debited each time the energy module 10 discharged. As another example, the charging service provider interprets the charging history of the energy module 10 to determine if the energy module 10 is being charged and an optimal manner. If not, the charging service provider provides instructions to a charger 14 regarding optimal charging of this particular energy module. The charger 14 may pass this information along to energy module 10 such that the energy module 10 stores the information for future charge.

As yet another example, the charging service provider interprets the device use information to determine a pattern of use. From the pattern of use, the charging service provider generates targeted information for the particular device 12, which is passed to the device 12 via the charger 14 and energy module. The targeted information includes recommended applications, power saving suggestions, and/or any information that may be relevant to a user of the device 12.

Figure 37:
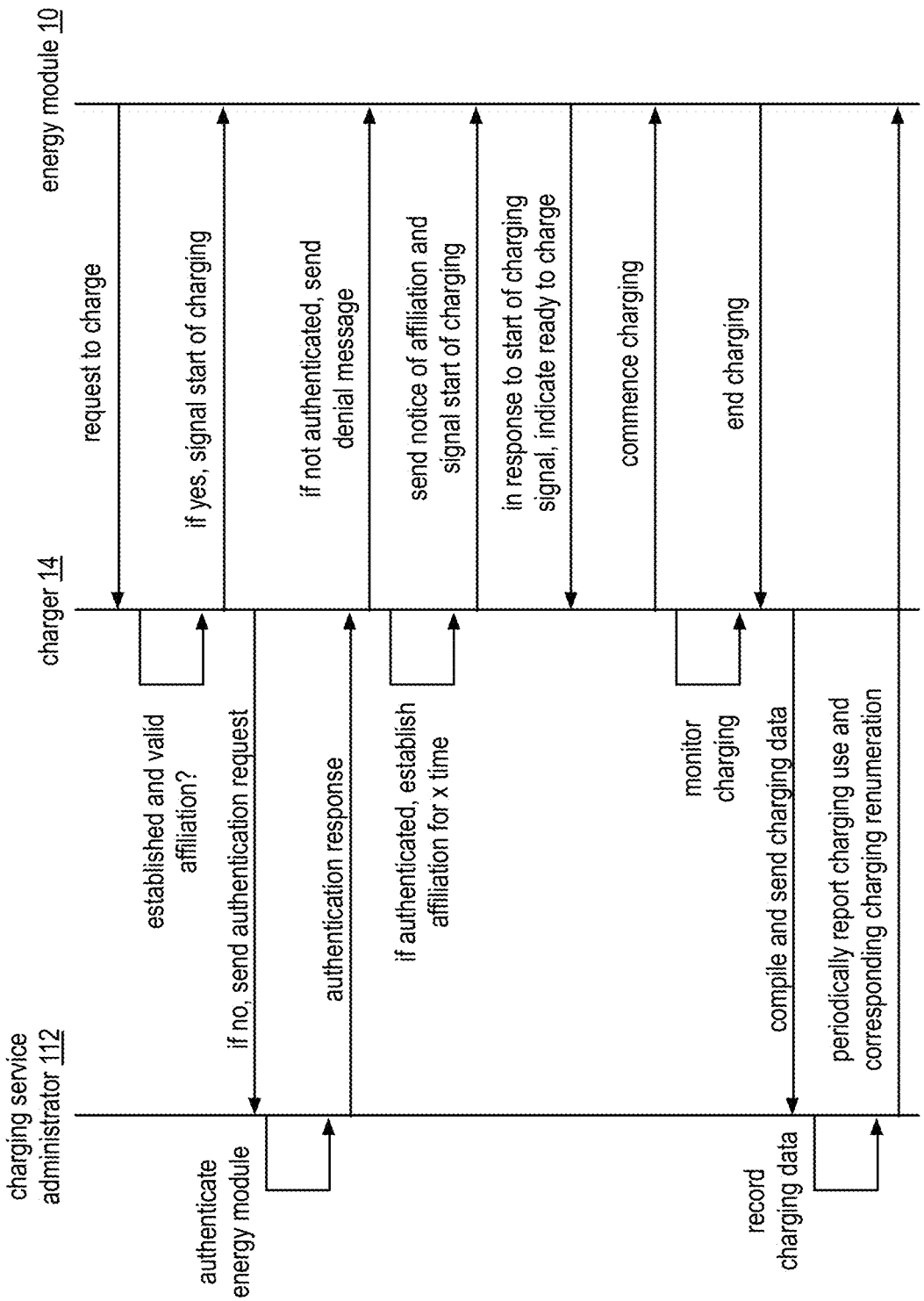
FIG. 37 is a diagram of an example of communication with an energy module in accordance with the present invention.

FIG. 37 is a diagram of an example of communication with an energy module 10 that begins with the energy module 10 sending a request for charging to a charger 14. The request includes information regarding the identity of the energy module, identity of the device 12 to which it is coupled, charging requirements, and/or any other information relevant to charging the energy module. Upon receiving the request, the charger 14 determines whether an account is established and valid for the energy module. For example, the charger 14 determines whether the energy module 10 is associated with a charging subscription, is registered with a known charging service provider, has previously registered with the charger 14, and/or any other mechanism for establishing validity and authenticity of the energy module. If the request is valid, the charger 14 signals the energy module 10 of the validity of the request and commences charging.

If, however, the request was not validated (e.g., an account is not established, the account has expired, the energy module 10 is not authenticated, a subscription has expired, etc.), the charger 14 sends an authentication request to an administrator of a charging service provider. In addition, the charger 14 sends a denial message to the energy module. Under these conditions, the charging service administrator, the charger 14, and the energy module 10 coordinate to authenticate and register the energy module. For instance, the charging service administrator determines whether the energy module 10 is affiliated with a particular user, a particular account, a particular subscription, etc., and determines that such an affiliation is valid. Upon authenticating the energy module, the charging service administrator provides an authentication response to the charger 14. The charger 14 registers the energy module 10 and notifies the energy module 10 of the registration.

Upon receiving verification of registration, the energy module 10 sends a signal to the charger 14 indicating that it is ready for charging. At this point, the charger 14 commences charging of energy module 10 and monitors the charging until it is complete. Upon completion of the charging, the charger 14 compiles charging data and any other data and forwards it to the charging service provider. Periodically, the charging service provider provides a charging report and other relevant information to the energy module. The report may include invoicing information, subscription information, remaining charges, etc. The energy module 10 may provide the charging report to the device 12 such that relevant information may be displayed to a user of the device 12.

Figure 38:
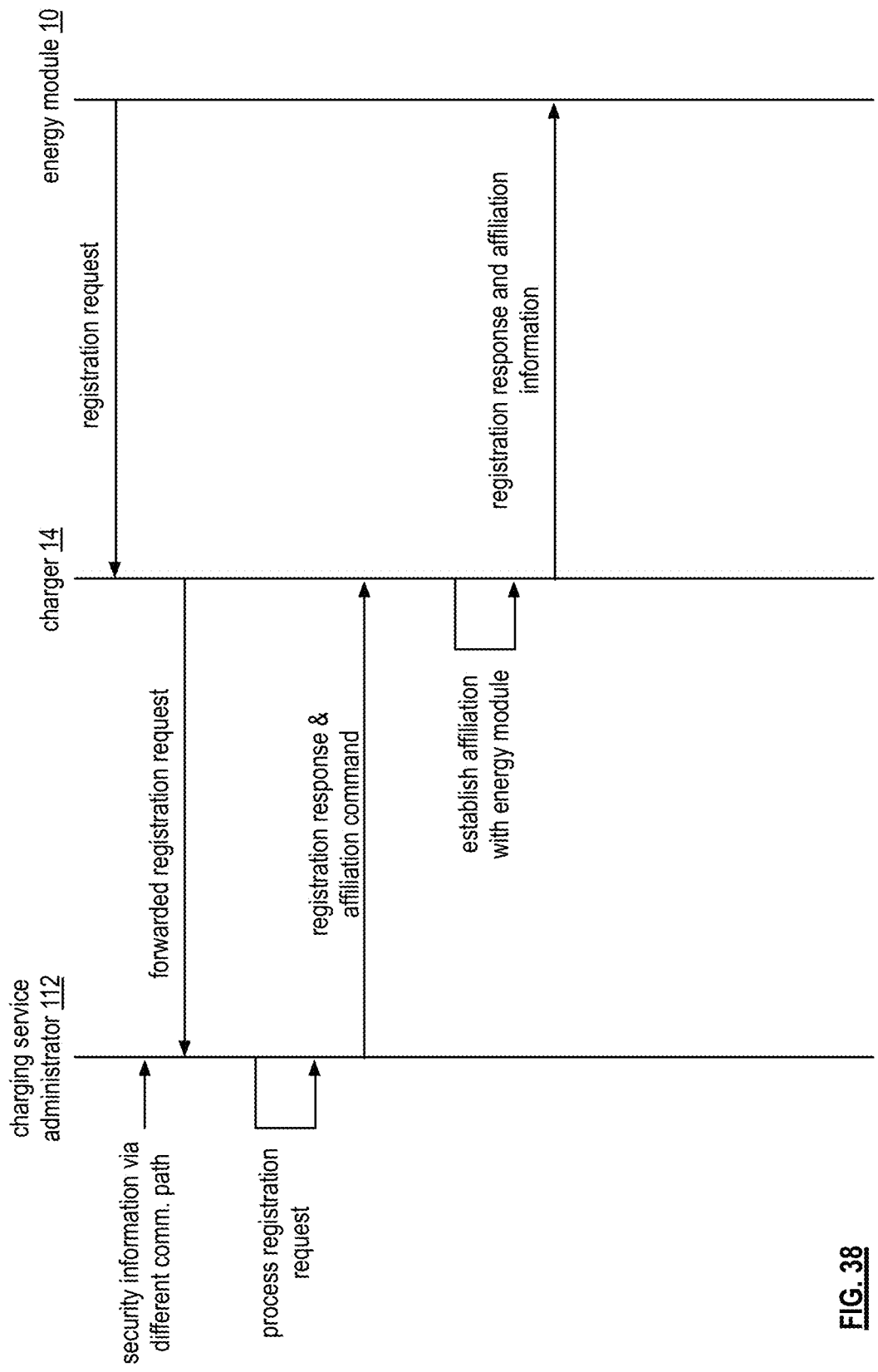
FIG. 38 is a diagram of another example of communication with an energy module in accordance with the present invention.

FIG. 38 is a diagram of another example of communication with an energy module 10 for secure registration of the energy module 10 through a charger 14. To begin a registration process, the energy module 10 sends a registration request to the charger 14. The registration request includes information regarding the energy module, such as, the type of energy module, whether it is a fixed energy module 10 (e.g., embedded in a device 12) or a universal energy module 10 (e.g., is detachable from a device 12), serial number, etc. Alternatively, if the energy module 10 includes a communication link, it may send the registration request to the charging service administrator.

The charger 14 forwards the registration request (which may also include information regarding the charger 14) to the charging service administrator, which obtains security information regarding the energy module 10 via a different communication means (e.g., different communication link, from a manufacturer of the energy module, from an on-line registration form submitted by a user of the energy module, etc.). The security information includes a user identifier, account identifier, a security code, and/or any other desire security information. The charging service administrator processes the registration request. If the security information and the registration request correspond, the charging service administrator sends a registration confirmation to the charger 14.

The charger 14 establishes an affiliation with the energy module 10 (e.g., registers the energy module 10 for future charging) and provides a registration response and corresponding affiliation information to the energy module. The energy model records this information for future use.

Figure 39:
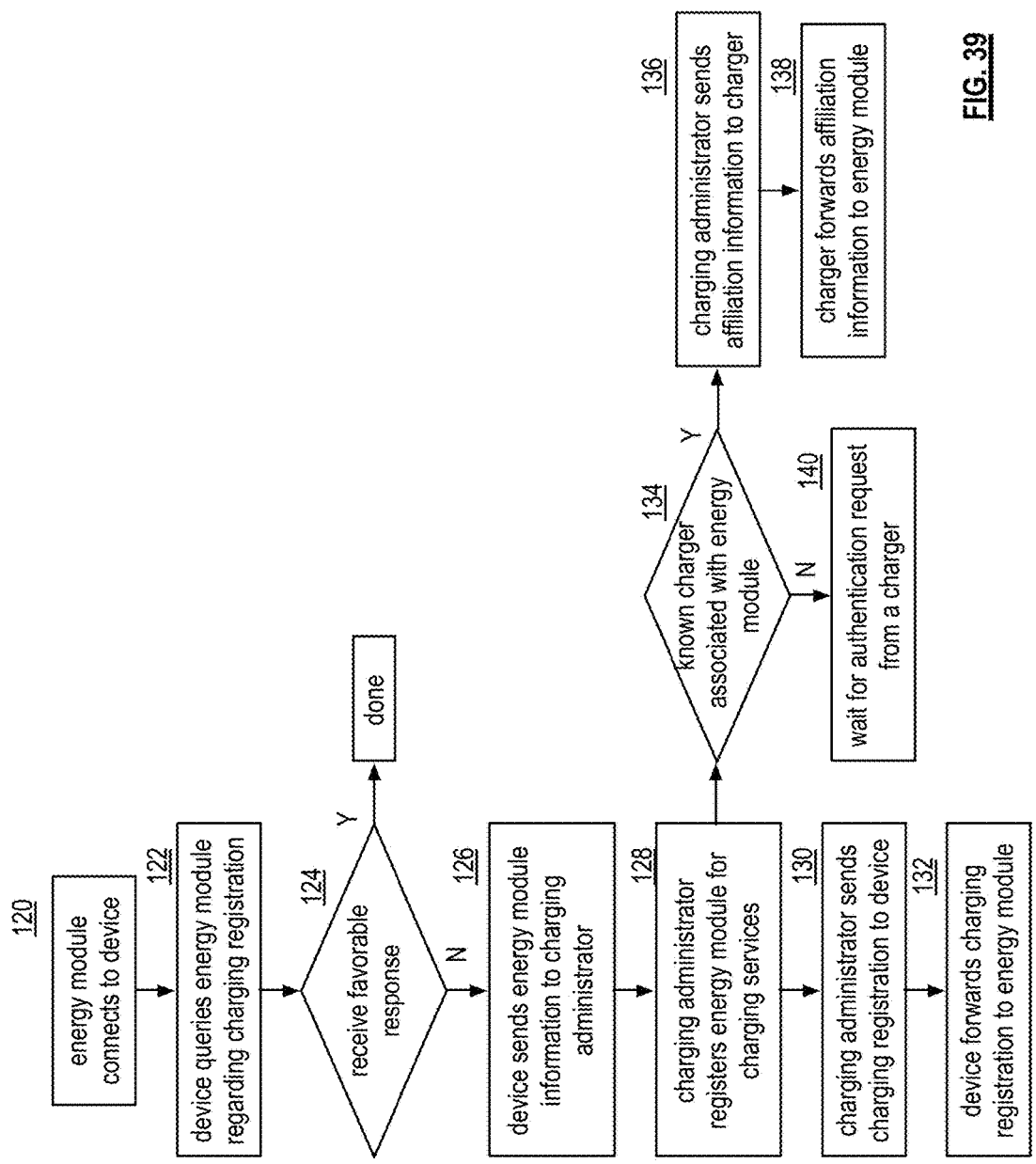
FIG. 39 is a logic diagram of an example of communication with an energy module in accordance with the present invention.

FIG. 39 is a logic diagram of an example of communication with an energy module 10 for secure registration of the energy module 10 through a device 12. The method begins at step 120 when the energy module 10 is connected to the device 12 and the device 12 becomes active. The method continues at step 122 with the device 12 querying the energy module 10 regarding charging registration. The energy module 10 provides a charging registration response, which may include an energy module type, serial number, fixed or universal energy module, and registration information, if any.

The device 12 interprets the charging registration response to determine whether it is valid at step 124. For example, the device 12 may be in communication with the charging service provider to verify that the energy module 10 is properly registered. As another example, the device 12 accesses a database regarding energy module registration. If the device 12 determines that the energy module 10 is properly registered, the method is concluded.

If, however at step 124, device 12 determines that the energy module 10 is not properly registered, the device 12 sends, at step 126, the energy module information to the administrator of the charging service provider. The method continues at step 128 with the administrator registering the energy module 10 for charging services. The method continues in two paths. In the first path, the administrator sends, at step 130, charging registration information to the device 12, which forwards it to the energy module at step 132.

In the second path, the administrator determines, at step 134, whether there is a known charger 14 affiliation with the energy module. For example, if the energy module 10 is embedded in a device 12 that was sold with the charger 14, the administrator readily determines the known affiliation. As another example, the administrator determines the affiliation of the energy module 10 with a charger 14 based on a lookup table, database, and/or other search mechanism. If there is no known affiliation, the method continues at step 140 with the administrator waiting for an authentication requests from a charger 14.

If there is a known affiliation, the method continues at step 136 with the administrator sending affiliation information to the charger 14. The method continues at step 138 with the charger 14 forwarding the affiliation information to the energy module.

Figure 40:
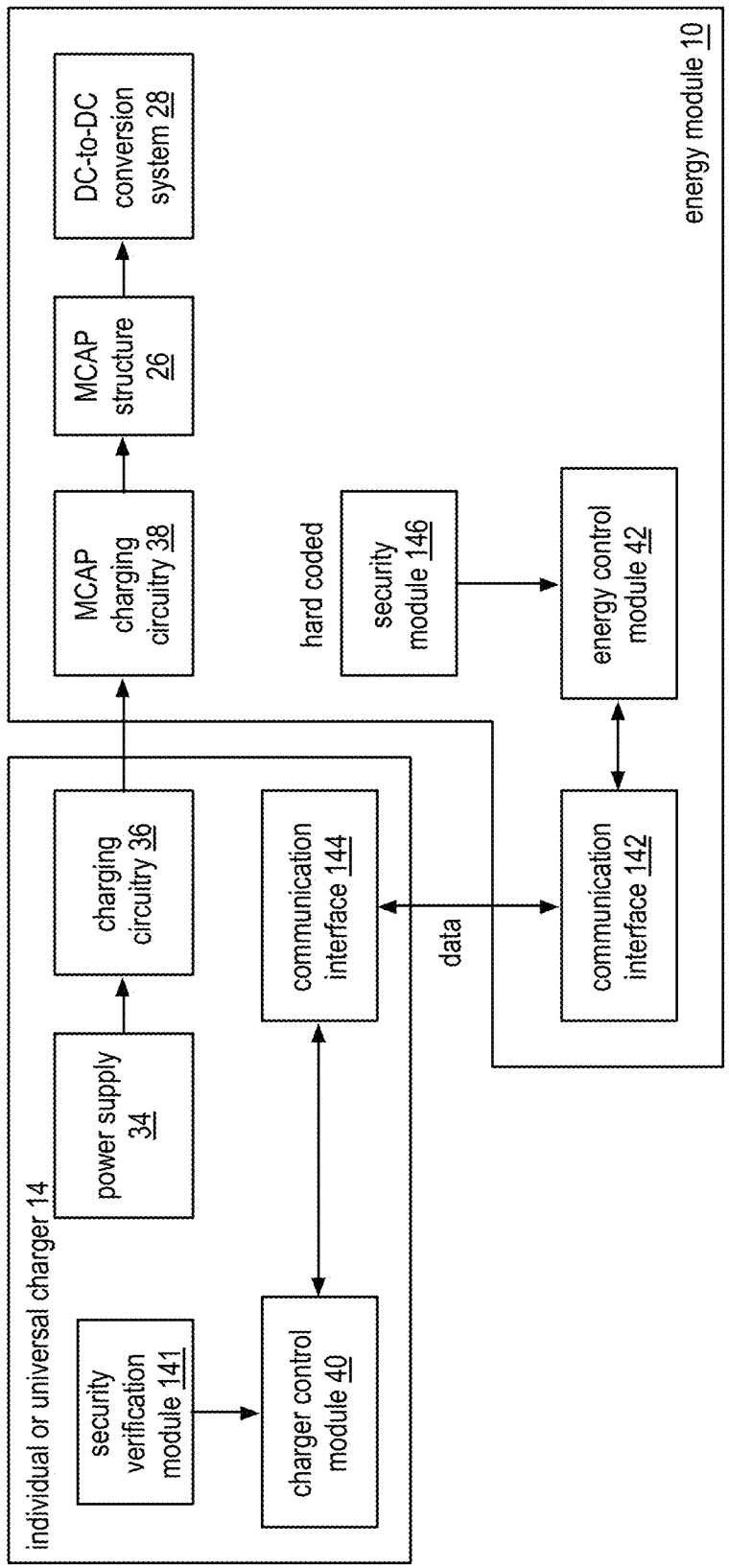
FIG. 40 is a schematic block diagram of another embodiment of an energy module and an energy module charger in accordance with the present invention.

FIG. 40 is a schematic block diagram of another embodiment of an energy module 10 and an energy module charger 14. The energy module 10 includes an MCAP charging circuit 38, an MCAP structure 26, a DC-to-DC conversion system 28, a security module 146, an energy control module 42, and a communication interface 142. The individual or universal charger 14 includes a power supply 34, charging circuitry 36, a security verification module 141, the charger control module 40, and a communication interface 144. The MCAP charging circuit, the MCAP structure 26, and the DC-to-DC conversion system 28 of the energy module 10 function as previously described and/or as will subsequently be described. The power supply 34 and the charging circuitry of the charger 14 function as previously described and/or as will subsequently be described.

The communication interfaces are of the same type to allow data to be communicated between the charger 14 and the energy module. For example, the communication interfaces may include one or more of Bluetooth interfaces, near field communication interfaces, one-wire interfaces, two wire interfaces, etc. For the wired interfaces, the communication interfaces utilize one or more wired communication protocols (e.g., fire-wire, I2C, SPDIF, RS485, USB, RS232, etc.).

The security module and energy control module 42 of the energy module 10 work in conjunction with the security verification module and the charge control module of the charger 14 to ensure authenticity of the charger 14 and of the energy module. For example, the security module is hard coded with security information (e.g., unique ID, serial number, encryption key, passcode, etc.) of the energy module. With this information hard coded, it is tamper resistant. When the energy module 10 couples to the charger 14, the energy control module 42 retrieves at least some of the security information from the security module and conveys it to the charge via the communication information. This may be done each time the energy module 10 is coupled to the charger 14 regardless of the purpose for the coupling.

The charger control module 40 verifies the security information of the energy module 10 with corresponding information stored in the security verification module. When the security information is verified, the energy module 10 and charger 14 may perform the desired function (e.g., charge the energy module, exchange data, perform software updates, etc.).

To insure that the security protocols are followed before performing a desired function, the energy control module 42, the security module, the security verification module, and the charger control module 40 include features that make them, and the security protocols, tamper proof and/or bypass proof. As an example, the security protocol requires a communication between the energy module 10 and the charge to be encrypted using a shared secret encryption key, a public-private key pair, etc. As another example, the security protocol requires each communication to include a header section that includes the hard coded security information of the energy module.

Figure 41:
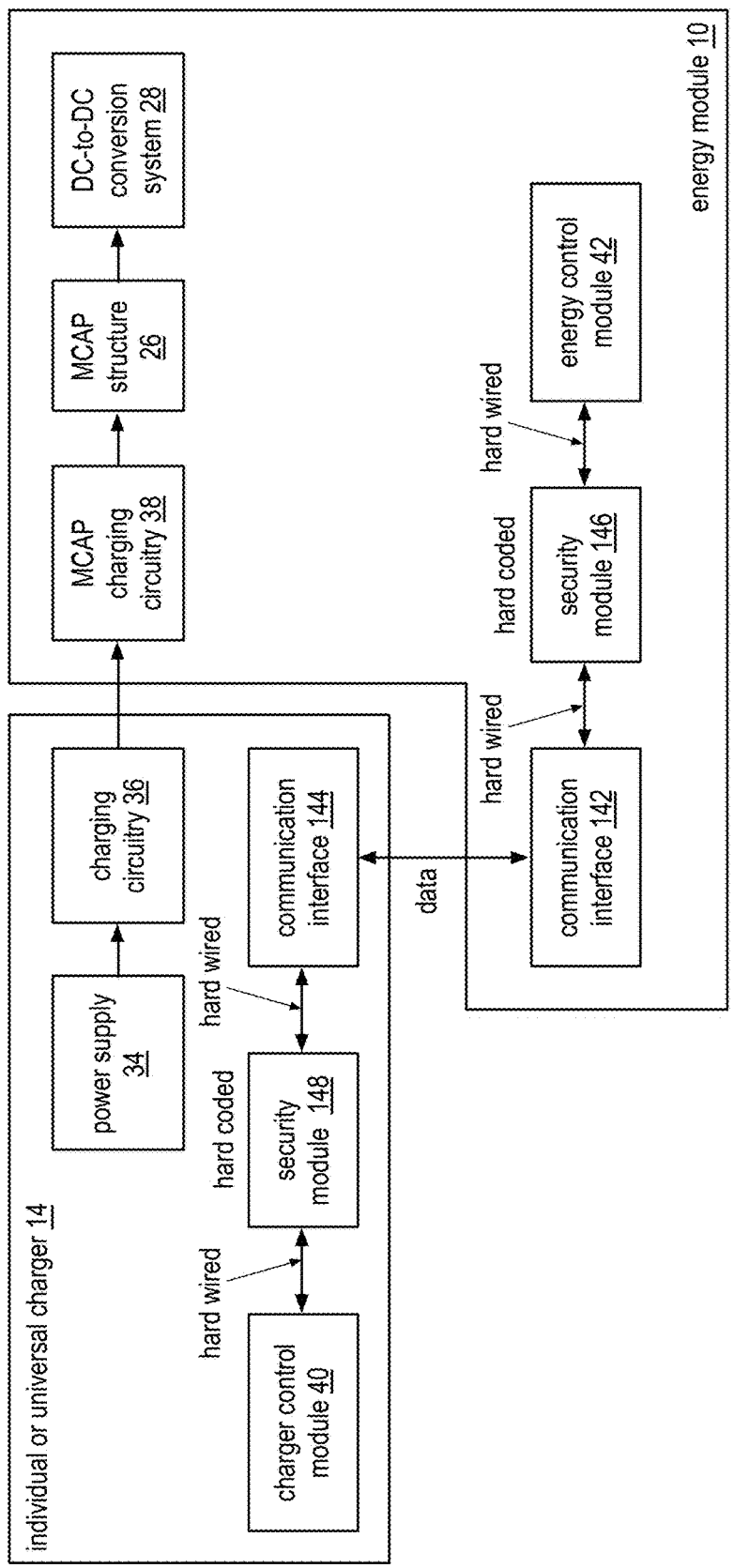
FIG. 41 is a schematic block diagram of another embodiment of an energy module and an energy module charger in accordance with the present invention.

FIG. 41 is a schematic block diagram of another embodiment of an energy module 10 and an energy module charger 14. The energy module 10 and charger 14 of this figure are similar to the corresponding energy module 10 and charger 14 of FIG. 40, with the following exceptions. Within the energy module, the security module 146 is hard wired in series between the communication interface 142 and the energy control module 42 and, within the charger 14, a security module 148 is hard wired in series between the charger control module 40 and the communication interface 144.

In an example of operation, when the energy module 10 is coupled to the charger 14, the energy module 10 sends an affiliation request for one or more functions (e.g., charging, data transmission, data reception, software update, etc.) to the charger 14. The affiliation request is initiated by the energy control module 42 and provided to the security module via a hard wire connection. The security module stores security information of the energy module 10 (e.g., module ID, serial number, encryption key, pass code, etc.) and modifies the affiliation request in accordance with a security protocol. For example, the security module may encrypt the affiliation request, add a secure header to the affiliation request, etc.

Upon receiving the secure affiliation request, the security module of the charger 14 performs the inverse security protocol to verify the affiliation request. If verified, the security module provides the affiliation request to the charger control module 40 for subsequent processing.

Figure 42:
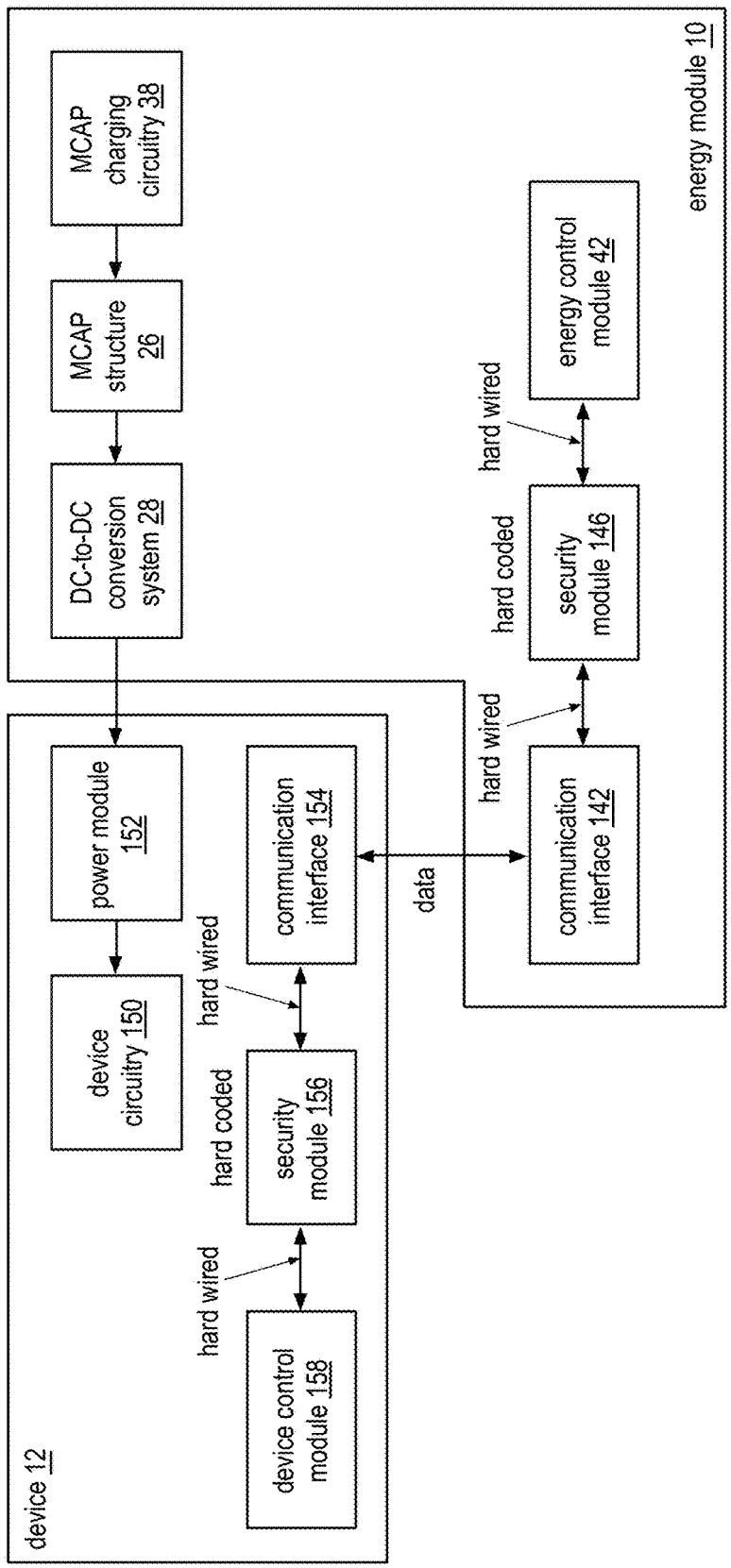
FIG. 42 is a schematic block diagram of another embodiment of an energy module and a device in accordance with the present invention.

FIG. 42 is a schematic block diagram of another embodiment of an energy module 10 and a device 12. The energy module 10 includes an MCAP charging circuit, an MCAP structure 26, a DC-to-DC conversion system 28, a security module 146, an energy control module 42, and a communication interface 142. The device 12 includes a power module 152, device circuitry 150, a security module 156, a device control module 158, and a communication interface 154. The MCAP charging circuit, the MCAP structure 26, and the DC-to-DC conversion system 28 of the energy module 10 function as previously described and/or as will subsequently be described. The power module and the device circuitry of the device 12 function as previously described and/or as will subsequently be described.

In an example of operation, when the energy module 10 is coupled to the device 12, the energy module 10 sends an affiliation request for one or more functions (e.g., sourcing energy, data transmission, data reception, software update, etc.) to the device 12. The affiliation request is initiated by the energy control module 42 and provided to the security module via a hard wire connection. The security module stores security information of the energy module 10 (e.g., module ID, serial number, encryption key, pass code, etc.) and modifies the affiliation request in accordance with a security protocol. For example, the security module may encrypt the affiliation request, add a secure header to the affiliation request, etc.

Upon receiving the secure affiliation request, the security module of the device 12 performs the inverse security protocol to verify the affiliation request. If verified, the security module provides the affiliation request to the device control module for subsequent processing.

In an example of operation, when the energy module 10 is coupled to the device 12, the device 12 sends an affiliation request for one or more functions (e.g., sourcing energy, data transmission, data reception, software update, etc.) to the energy module. The affiliation request is initiated by the device control module and provided to the security module via a hard wire connection. The security module stores security information of the device 12 (e.g., device ID, serial number, encryption key, pass code, etc.) and modifies the affiliation request in accordance with a security protocol. For example, the security module may encrypt the affiliation request, add a secure header to the affiliation request, etc.

Upon receiving the secure affiliation request, the security module of the energy module 10 performs the inverse security protocol to verify the affiliation request. If verified, the security module provides the affiliation request to the energy control module 42 for subsequent processing.

Figure 43:
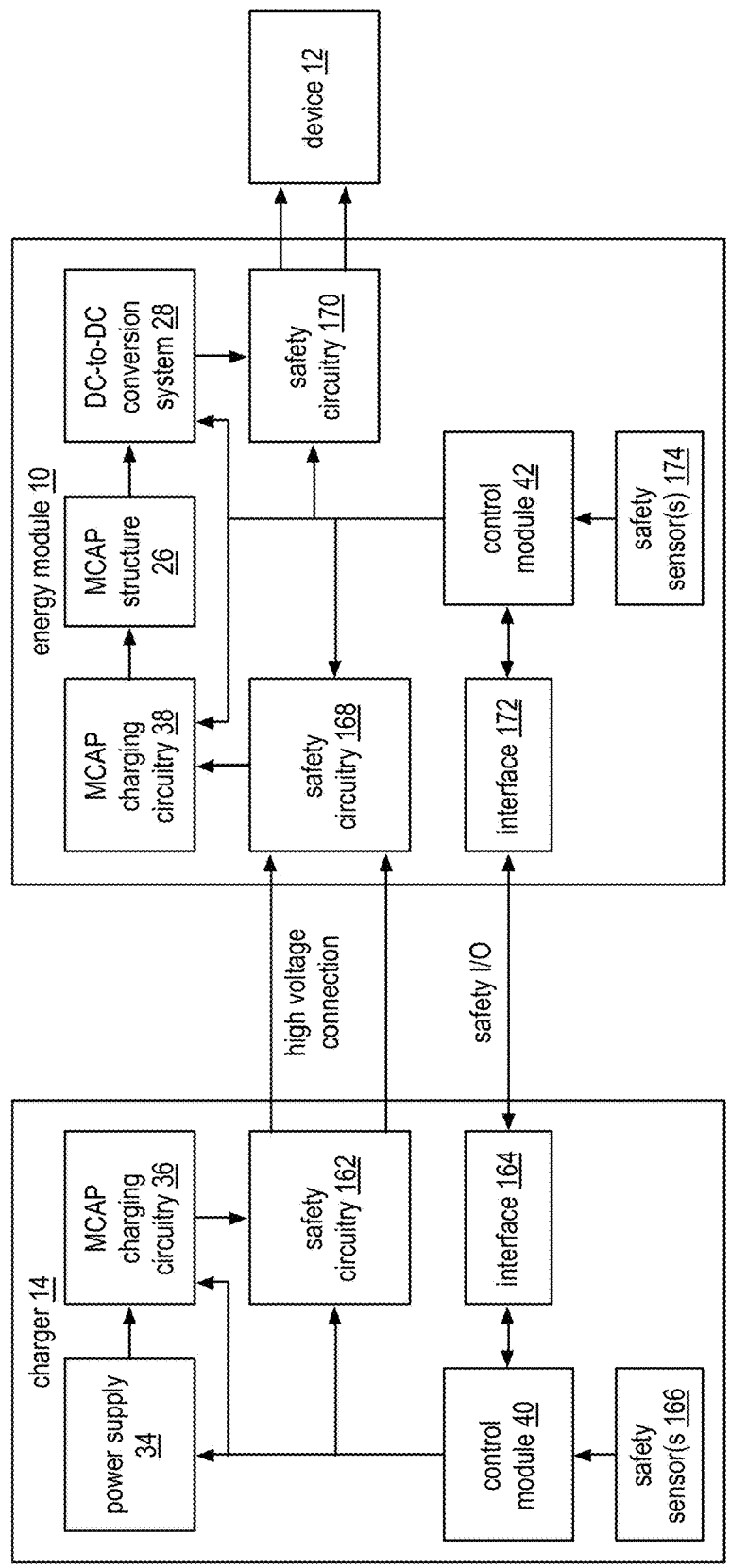
FIG. 43 is a schematic block diagram of another embodiment of an energy module and an energy module charger in accordance with the present invention.

FIG. 43 is a schematic block diagram of another embodiment of an energy module 10 and an energy module charger 14. The energy module 10 includes an MCAP charging circuit 38, an MCAP structure 26, a DC-to-DC conversion system 28, safety circuitries 168, 170, interface 172, control module 42, and one or more safety sensors 174. The charger 14 includes a power supply 34, charging circuitry 36, safety circuitry 162, a control module 40, an interface 164, and one or more safety sensors 166. The safety sensors may sense an overvoltage condition, under voltage condition, and over load condition, a particular moisture level, temperature, human contact, and/or any other potentially hazardous condition to a user.

In an example of operation, the charger 14 is coupled to the energy module 10 via the safety circuitry, which provides a high-voltage connection therebetween. As previously discussed, the charging voltage supplied by charger 14 may be 300 V or more. Accordingly, various safety measures need to be taken to ensure that human beings can safely handle the charger 14 and/or the energy module. During charging, the safety sensors of both the charger 14 and energy module 10 check for a potential safety issue. If a potential safety issue is detected, the corresponding sensor sends an alarm signal to the corresponding control module.

The control module interprets the alarm signal to determine the appropriate response. For example, the control module may determine that the appropriate response is to disable charging. As another example, the control module may determine that the appropriate response is to adjust the charging voltage and or overload protection circuitry. As yet another example, the control module of one device 12 communicates with the control module of the other device 12 and collectively they determine the appropriate response.

FIG. 44 is a schematic block diagram of an embodiment of a high voltage interface (e.g., safety circuitry) of the energy module 10 between the charger 14 and/or the user device 12. The high-voltage interface includes a male connector 180 and a female connector 182. Each connector includes a fuse 184, 194, an overvoltage sensing circuit 186, 196, an over current sensing circuit 190, 200, a clamping circuit 188, 198, and an electrical-mechanical connector 192, 202. The clamping circuit 188, 198 may be a triac and/or a silicone controlled rectifier (SCR).

In an example of operation, when the high-voltage male connector is coupled to the high-voltage female connector, the overvoltage sense circuit and the overcurrent sense circuit of each high voltage interface monitors for an over voltage condition and an over current condition, respectively. If an overvoltage or over current condition is detected, the corresponding sensing circuit enables the triac and/or SCR to clamp the voltage on the high voltage male and female connectors to safe voltage and current levels. In addition, the clamping may cause the fuse to blow, thereby creating an open circuit. As an alternative to using a fuse, the high-voltage interface may include a circuit breaker.

FIG. 45 is a schematic block diagram of an embodiment of a high voltage interface between an energy module 10 and an energy module charger 14. The charger high voltage safety circuitry includes a connector (male or female), connect/disconnect circuitry 210, and a triggering circuit. The high voltage safety circuitry of the energy modules includes a connector (female or male), connect/disconnect circuitry 2124, and a triggering circuit. The high voltage safety circuit of the charger 14 receives a 5 V output of the power supply 34.

The high-voltage safety circuits of the charger 14 and energy module 10 function to provide a make before enable high-voltage connector. As such, the high-voltage connectors will mate prior to the connect/disconnect circuitry being enabled. Once enabled, the connect/disconnect circuitry provides the charge voltage (e.g., 300 V or more) to the MCAP structure 26 of the energy module. As shown in FIG. 46, the high-voltage connectors are coupled together before the low-voltage sensory connectors are coupled together.

When the low-voltage sensory connectors are coupled together as shown in FIG. 46, the 5 V from the charger 14 is provided to the triggering circuitry of both the charger 14 and energy module. The triggering circuit places the connect/disconnect circuitry in the enable mode thereby allowing the charge voltage of the power supply 34 to be coupled to the MCAP structure 26. When the low-voltage sensory connectors are not coupled together, the 5 V from the charger 14 is not provided to the triggering circuits, thereby placing the connect/disconnect circuitry in the disable mode (i.e., the charge voltage of the power supply 34 is not coupled to the MCAP structure 26 regardless of the coupling of the high-voltage connectors).

Figure 47:
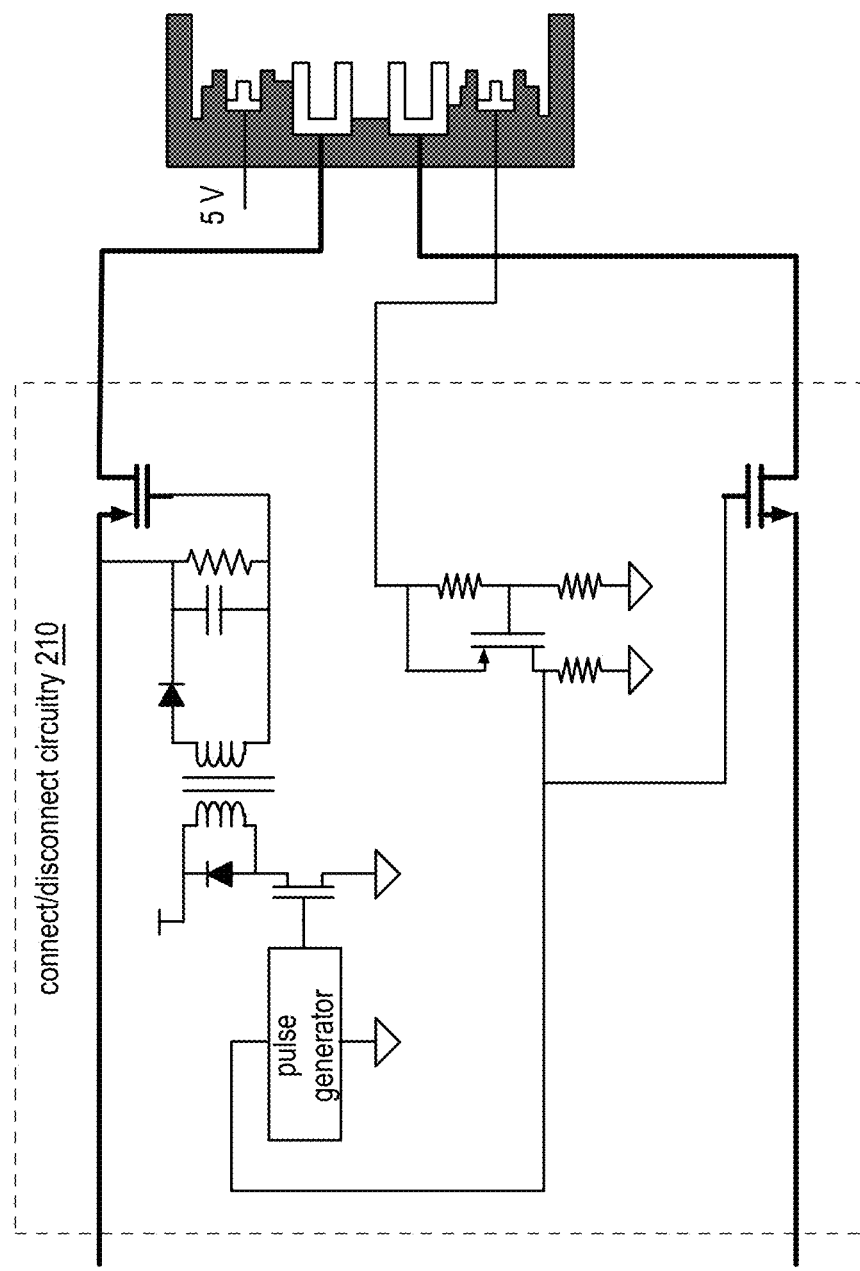
FIG. 47 is a schematic block diagram of an embodiment of a high voltage interface in accordance with the present invention.

FIG. 47 is a schematic block diagram of an embodiment of the connect/disconnect circuitry 210 of a high voltage interface of FIG. 45. The connect/disconnect circuitry includes power transistors and transistor drive circuitry. In this embodiment, the connect/disconnect circuitry further includes the trigger circuitry. As shown, a P channel power transistor is included in one path of the high-voltage connection and an N channel power transistor is included in the other path of the high-voltage connection.

The N channel power transistor is enabled when the trigger circuitry is receiving the five volts from the connector. When the trigger circuitry does not receive in the five volts, the N channel power transistor is off. The P channel transistor is enabled via the P channel drive circuitry when the 5 V is received via the connector and is disabled when the 5 V is not received via the connector. The P channel drive circuitry includes a pulse generator any fly-back transformer circuit. When the 5 V is received, the pulse generator is operable to drive the switching transistor of the flyback transformer circuit, which produces a gate source voltage sufficient enough to turn on the P channel power transistor.

Figure 48:
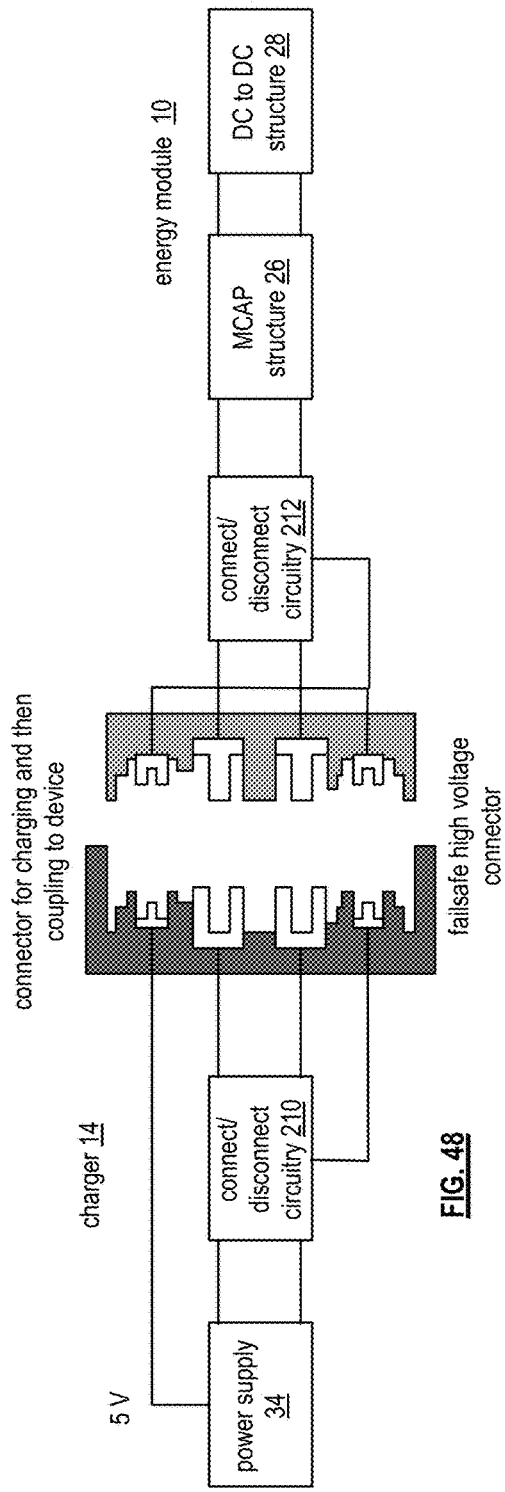
FIG. 48 is a schematic block diagram of another embodiment of a high voltage interface between an energy module and an energy module charger in accordance with the present invention.

FIG. 48 is a schematic block diagram of another embodiment of a high voltage interface between an energy module 10 and an energy module charger 14. This embodiment is similar to that of FIG. 45 with the difference being in how the connect/disconnect circuitry is enabled and disabled. In this embodiment, the connect/disconnect circuitry 210 and 212 includes internal circuitry to connect and disconnect the high voltage pins of the corresponding connectors. As with the embodiment of FIG. 45, when the charger 14 is not coupled to the energy module, there is no high voltage present on the pins of either connector.

Figure 49:
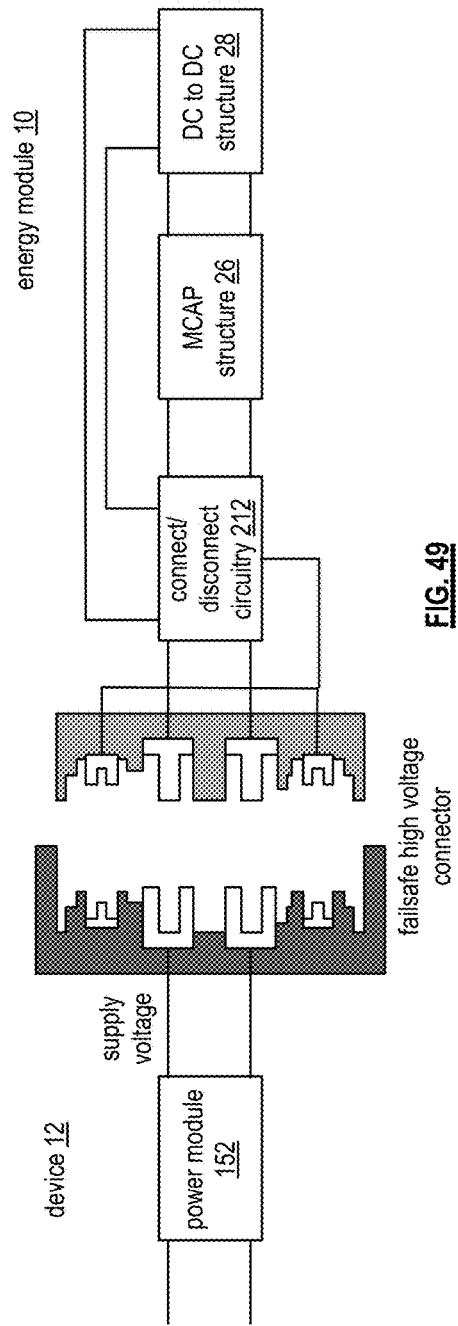
FIG. 49 is a schematic block diagram of an embodiment of a high voltage interface between an energy module and a device in accordance with the present invention.

FIG. 49 is a schematic block diagram of an embodiment of a high voltage interface between an energy module 10 and a device 12. In this embodiment, the energy module 10 is providing a supply voltage that exceeds a safe voltage level (e.g., 48 volts or higher). The energy module 10 functions as previously discussed to insure that a make before connect high voltage interface is achieved. In particular, the energy module 10 provides a signal that is passed via one low voltage pin to the device 12 and is returned by the device 12 via another low voltage pin. When this occurs, the connect/disconnect circuit is enabled to provide the supply voltage(s) of the DC-to-DC conversion system 28 to the device 12.

Figures 50, 51:
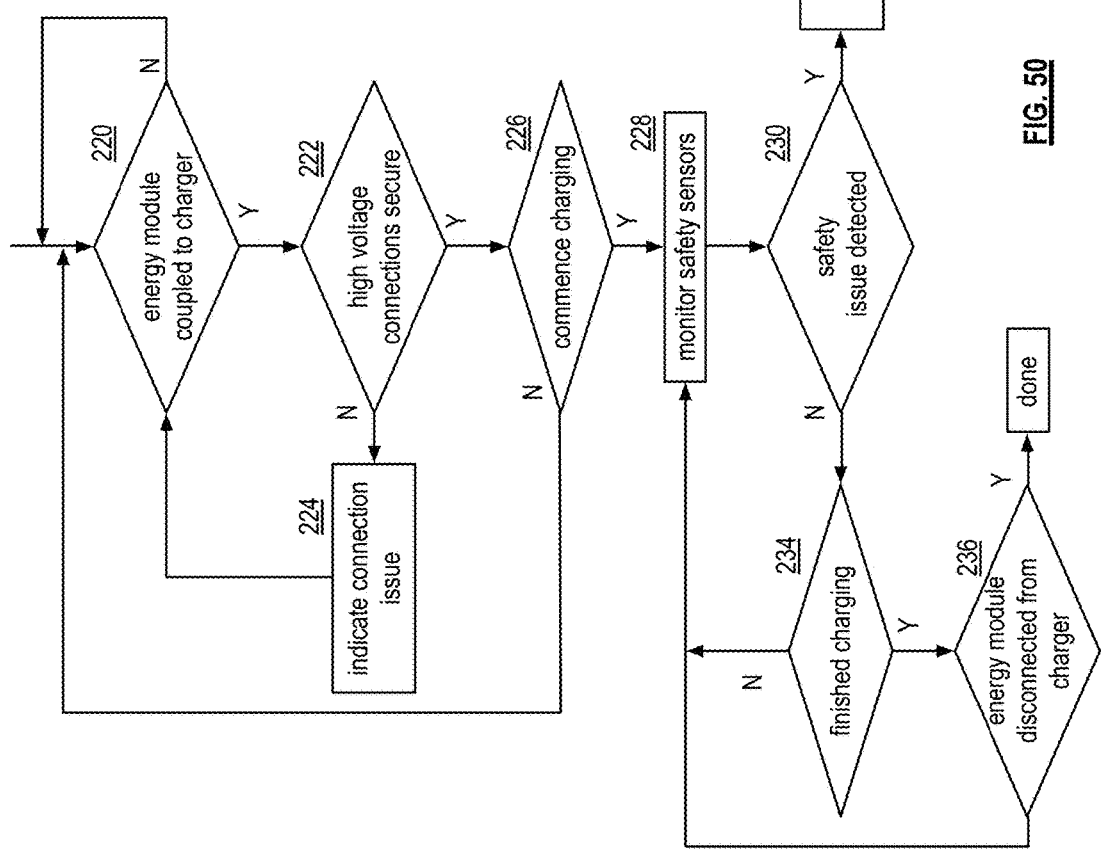
FIG. 50 is a logic diagram of an example of high voltage charging an energy module in accordance with the present invention.
FIG. 51 is a diagram of an example of processing issues regarding high voltage charging an energy module in accordance with the present invention.

FIG. 50 is a logic diagram of an example of high voltage charging of an energy module. The method begins at step 220 by detecting when the energy module 10 is properly coupled to the charger 14. This may be done in a variety of ways. For example, the charger 14 and energy module 10 may include coupling circuitry as previously discussed to provide a make before enable high-voltage connection. As another example, a proximity circuit maybe used to detect the coupling. The proximity circuit may include near field communication circuitry to determine the distance between the energy module 10 and the charger 14. As yet another example, an impedance test of the coupling between the charger 14 and energy module 10 may be used to detect proper coupling.

When it is determined that the energy module 10 is coupled to the charger 14, the method continues at step 222 by determining whether the high-voltage connections there between are secure. If not, the method continues at step 224 by indicating that there is a connection issue and repeating the method. If, however, the high-voltage connections are secure, the method continues at step 226 by commencing charging of the energy module at step 226.

As the energy model is being charged, the safety sensors of the charger 14 and/or of the energy module 10 are monitored at step 228. The method continues at step 230 by determining whether as safety issue is detected. If yes, the method continues at step 232 by implementing a safety plan. An example safety plan is illustrated in FIG. 51. The safety plan includes a column for a particular safety issue and a column for a corresponding action. For example, if the safety issue detected is and excessive moisture level, the corresponding action to be taken is to crowbar the charger 14 and/or open the high-voltage connectors. As another example, if the safety issue is an overcurrent detection in the charger 14, the corresponding action may be to reduce the charge current limit within the charger 14. As yet another example, if the safety issue is a short circuit detected in the charger 14, the corresponding action may be to open all high-voltage connections.

As a further example, if the safety issue is an overvoltage condition within the charger 14, the corresponding action may be to shut down the charger 14. As yet a further example, if the safety issue is an overcurrent condition in the energy module, the corresponding action may be to reduce the charging current. As yet another example, if the safety issue is a short circuit detected in the energy module, the corresponding action may be to open all high-voltage connections. As a further example, if the safety issue is an overvoltage condition within the energy, the corresponding action may be to shut down the energy module.

Returning back to the logic diagram of FIG. 50, if a safety issue is not detected, the method continues at step 234 by determining whether the charging of the energy module 10 is finished. If not, the method remains in a loop of monitoring safety issues and determining when it charging is finished. Once the charging is finished, the method continues at step 236 by determining whether the energy module 10 is disconnected from the charger 14. If so, the charging of the energy model is complete. If, however, the energy module 10 remains connected to the charger 14, the method remains in a loop of detecting for monitoring safety issues and detecting when the energy module 10 is disconnected from the charger 14.

FIG. 52 is a schematic block diagram of an embodiment of an energy module charger 14. The charger 14 includes a power supply 34, one or more current sense circuits 242, 244, one or more voltage sensing circuits 246, 250, one or more crowbar circuits 248, 252, an MCAP charger circuitry 36, a control module 40, an MCAP charge circuit switch, output switches, and fuse 240. The fuse, or circuit breaker, is coupled in series with an AC input of the power supply 34 to protect the circuitry of the charge from over current conditions. Under normal conditions, the power supply 34 generates a DC voltage from the AC input. The remaining circuitry of the charger 14 functions to protect the charger 14 and/or the energy module 10 from an overvoltage condition and/or overcurrent condition.

In an example of operation, the power supply 34 outputs a supply voltage in the range of 50 V to 300 V, or more. The MCAP charger circuitry converts the supply voltage into a charging voltage (e.g., 300 V) that is provided to the energy module. The MCAP charger circuitry also monitors the charging of energy module 10 to ensure proper charging of the energy module.

The first voltage sense module monitors the supply voltage produced by the power supply 34 and provides the sense voltage to the control module. The control module compares the sensed voltage with a range of acceptable supply voltages. As long as the sensed voltage is within the range of acceptable supply voltages, the control module keeps the MCAP charger switch closed and the first crowbar circuit disabled. If the sensed voltage is outside the range of acceptable supply voltages, the control module makes a determination as to the appropriate course of action. For example, if the sensed voltage is above an acceptable supply voltage, the control module determines whether the power supply 34 is in a failure mode. If the power supply 34 is in a failure mode, the control module opens the MCAP charger switch and may activate the first crowbar circuit. As another example, if the sensed voltage is below an acceptable supply voltage, the control module opens the MCAP charger switch.

The first current sense circuit senses the current supply from the power supply 34 to the MCAP charger circuitry and provides the sensed current to the control module. As long as the sensed current is within the range of acceptable supply currents, the control module keeps the MCAP charger switch closed and the first crowbar circuit disabled. If the sensed current is outside the range of acceptable supply currents, the control module makes a determination as to the appropriate course of action. For example, if the sensed current is above an acceptable supply voltage, the control module determines whether there is a short circuit condition. If there is a short circuit condition, the control module opens the MCAP charger switch and disables the power supply 34.

The second voltage sense module monitors the charge voltage outputted by the MCAP charger circuit and provides the sense voltage to the control module. The control module compares the sensed voltage with a range of acceptable charger voltages. As long as the sensed voltage is within the range of acceptable charger voltages, the control module keeps the output switches closed and the second crowbar circuit disabled. If the sensed voltage is outside the range of acceptable charger voltages, the control module makes a determination as to the appropriate course of action. For example, if the sensed voltage is above an acceptable charger voltage, the control module determines whether the MCAP charger circuitry is in a failure mode. If the MCAP charger circuitry is in a failure mode, the control module opens the output switches and may activate the second crowbar circuit. As another example, if the sensed voltage is below an acceptable charger voltage, the control module opens the output switches.

The second current sense circuit senses the charge current from the MCAP charger circuitry to the energy module 10 and provides the sensed current to the control module. As long as the sensed current is within the range of acceptable charger currents, the control module keeps the output switches closed and the second crowbar circuit disabled. If the sensed current is outside the range of acceptable charger currents, the control module makes a determination as to the appropriate course of action. For example, if the sensed current is above an acceptable charger voltage, the control module determines whether there is a short circuit condition. If there is a short circuit condition, the control module opens the output switches and disables the power supply 34 and/or the MCAP charger circuitry.

While the charger 14 is shown with multiple voltage sense circuits, multiple current sensing circuits, and multiple crowbar circuits, the charger 14 may include the first set of protection circuitry (e.g., the first voltage sense circuit, the first current sense circuit, and crowbar circuit) or the second set of protection circuitry. As another alternative, the charger 14 may include the switches, the first voltage sense circuit, the second voltage sense circuit, the second current sense circuit, and the second crowbar circuit.

Figure 53:
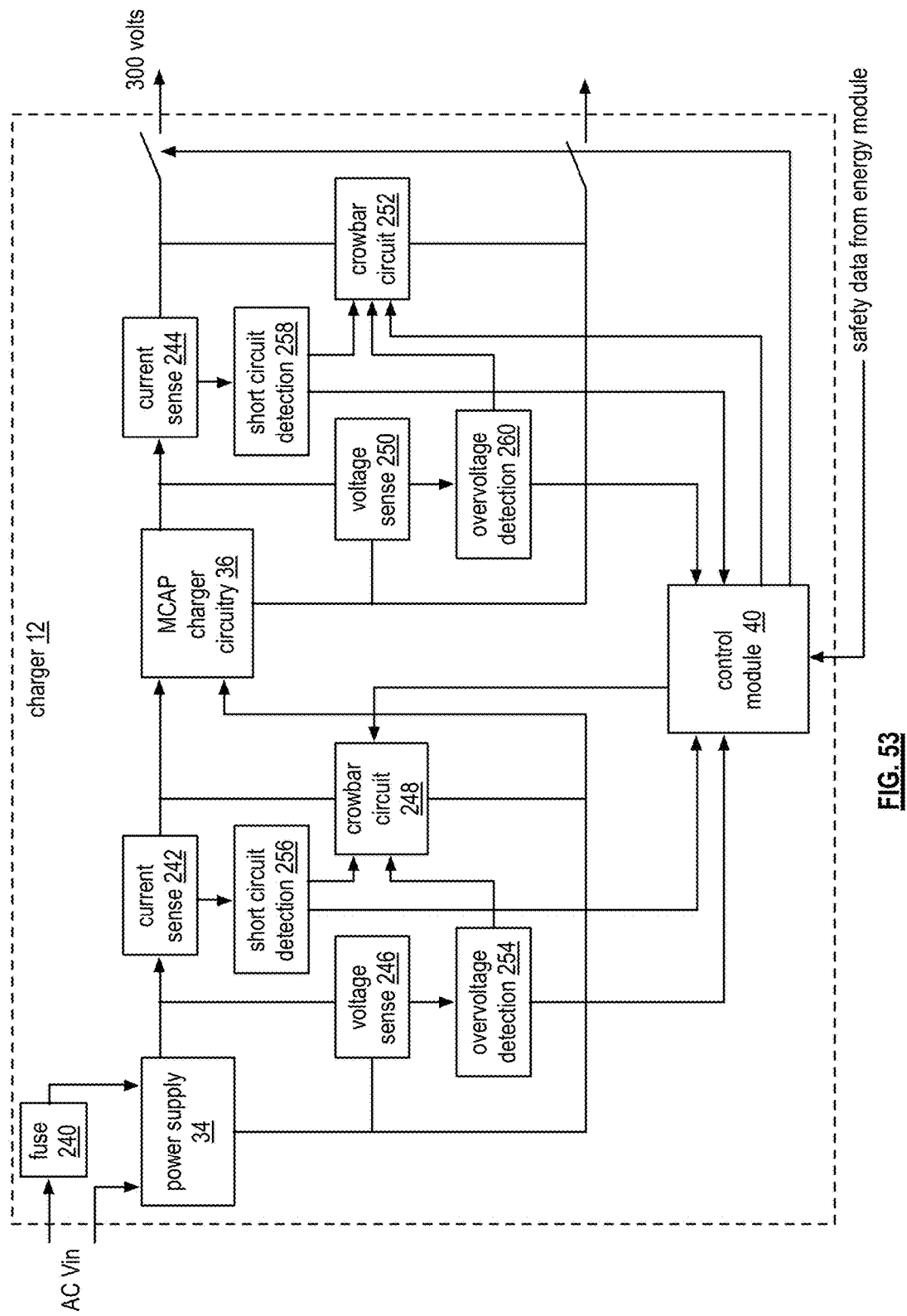
FIG. 53 is a schematic block diagram of another embodiment of an energy module charger in accordance with the present invention.

FIG. 53 is a schematic block diagram of another embodiment of an energy module charger 14. The charger 14 includes a power supply 34, one or more current sense circuits 242, 244, one or more voltage sensing circuits 246, 250, one or more crowbar circuits 248, 252, an MCAP charger circuitry 36, a control module 40, one or more overvoltage detection circuits 254, 260, one or more short circuit detection circuits 256, 258, an MCAP charge circuit switch, output switches, and fuse 240. The fuse, or circuit breaker, is coupled in series with an AC input of the power supply 34 to protect the circuitry of the charge from over current conditions. Under normal conditions, the power supply 34 generates a DC voltage from the AC input. The remaining circuitry of the charger 14 functions to protect the charger 14 and/or the energy module 10 from an overvoltage condition and/or overcurrent condition.

In an example of operation, the power supply 34 outputs a supply voltage in the range of 50 V to 300 V, or more. The MCAP charger circuitry converts the supply voltage into a charging voltage (e.g., 300 V) that is provided to the energy module. The MCAP charger circuitry also monitors the charging of energy module 10 to ensure proper charging of the energy module.

The first voltage sense module monitors the supply voltage produced by the power supply 34 and provides the sense voltage to the first overvoltage detection circuit. The first overvoltage detection circuit compares the sensed voltage with a range of acceptable supply voltages. As long as the sensed voltage is within the range of acceptable supply voltages, the first overvoltage detection circuit keeps the first crowbar circuit disabled. The first overvoltage detection circuit also provides signal to the control module indicating that the sensed voltage is within the acceptable range of voltages. Accordingly, the control module keeps the MCAP charger switch closed.

If the sensed voltage is outside the range of acceptable supply voltages, the first overvoltage detection circuit enables the first crowbar circuit and provides an overvoltage indication to the control module. In response to the signal from the first overvoltage detection circuit, the control module opens the MCAP charger switch. As another example, if the first overvoltage detection circuit determines that the sensed voltage is below an acceptable supply voltage, it provides a corresponding indication to the control module, which may open the MCAP charger switch.

The first current sense circuit senses the current supply from the power supply 34 to the MCAP charger circuitry and provides the sensed current to the first short circuit detection module. As long as the sensed current is within the range of acceptable supply currents, the first short circuit detection circuit keeps the MCAP charger switch closed. The first short circuit detection circuit also provides an indication of the sensed current to the control module. If the sensed current is outside the range of acceptable supply currents (e.g., is high and appears to be a short circuit), the first short circuit detection circuit opens the MCAP charger switch and provides a short circuit indication to the control module. In response to the short circuit indication, the control module determines whether to disable the power supply 34 and/or whether to enable the first crowbar circuit.

The second voltage sense module monitors the charge voltage outputted by the MCAP charger circuit and provides the sense voltage to the second overvoltage detection circuit. The second overvoltage detection circuit compares the sensed voltage with a range of acceptable charger voltages. As long as the sensed voltage is within the range of acceptable charger voltages, the second overvoltage detection circuit keeps the output switches closed. If the sensed voltage is outside the range of acceptable charger voltages, the second overvoltage detection circuit opens the output switches and provides an overvoltage condition indication to the control module. The control module makes a determination as to the appropriate course of action. For example, if the sensed voltage is above an acceptable charger voltage, the control module determines whether the MCAP charger circuitry is in a failure mode. If the MCAP charger circuitry is in a failure mode, the control module activates the second crowbar circuit. As another example, if the second overvoltage detection circuit determines that the sensed voltage is below an acceptable supply voltage, it provides a corresponding indication to the control module, which may open the output switches.

The second current sense circuit senses the charge current from the MCAP charger circuitry to the energy module 10 and provides the sensed current to the second short circuit detection circuit. As long as the sensed current is within the range of acceptable charger currents, the second short circuit detection circuit keeps the output switches closed. If the sensed current is outside the range of acceptable charger currents, the second short circuit detection circuit opens the output switches and provides a short circuit indication to the control module. In response to the short circuit condition, the control module may disable the power supply 34 and/or disable the MCAP charger circuitry.

While the charger 14 is shown with multiple voltage sense circuits, multiple current sensing circuits, and multiple crowbar circuits, the charger 14 may include the first set of protection circuitry (e.g., the first voltage sense circuit, the first current sense circuit, and crowbar circuit) or the second set of protection circuitry. As another alternative, the charger 14 may include the switches, the first voltage sense circuit, the second voltage sense circuit, the second current sense circuit, and the second crowbar circuit.

Figure 54:
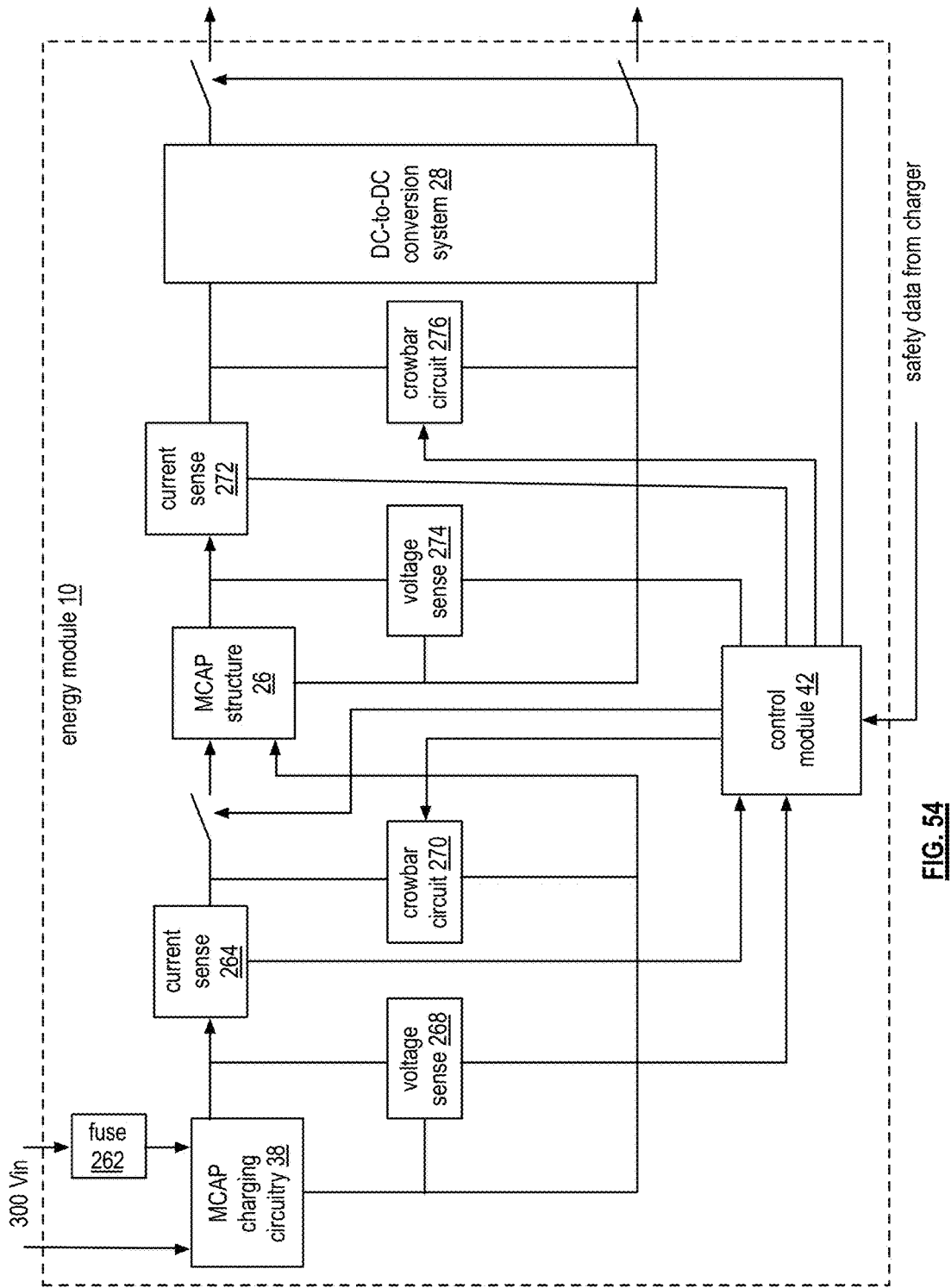
FIG. 54 is a schematic block diagram of another embodiment of an energy module in accordance with the present invention.

FIG. 54 is a schematic block diagram of another embodiment of an energy module. The energy module 10 includes MCAP charging circuitry 38, one or more current sense circuits 264, 272, one or more voltage sensing circuits 268, 272, one or more crowbar circuits 270, 276, an MCAP structure 26, a control module 42, an MCAP structure 26 switch, a DC-to-DC conversion system 28, output switches, and fuse 262. The fuse, or circuit breaker, is coupled in series with a 300 V input of the MCAP charging circuitry 38 to protect the circuitry of the energy module 10 from over current conditions. Under normal charging conditions, the MCAP charging circuitry 38 provides a charge voltage to the MCAP structure 26. Under normal operating conditions, the MCAP structure 26 provides a voltage to the DC-to-DC conversion system 28, which produces one or more supply voltages for powering a device 12. The remaining circuitry of the energy module 10 functions to protect the energy module 10 and/or the device 12 from an overvoltage condition and/or overcurrent condition.

In an example of charging, the MCAP charging circuitry 38 receives an input charge voltage from the charger 14 and provides a charge voltage to the MCAP structure 26. The MCAP charger circuitry may convert the input charge voltage (e.g., 300 V) into the charge voltage (e.g., 300 V, 600 V, etc.) that is provided to the MCAP structure 26. The MCAP charger circuitry also monitors the charging of MCAP structure 26 to ensure proper charging thereof.

The first voltage sense module monitors the charge voltage produced by the MCAP charging circuit and provides the sense voltage to the control module. The control module compares the sensed voltage with a range of acceptable charging voltages. As long as the sensed voltage is within the range of acceptable charging voltages, the control module keeps the MCAP structure 26 switch closed and the first crowbar circuit disabled. If the sensed voltage is outside the range of acceptable charging voltages, the control module makes a determination as to the appropriate course of action. For example, if the sensed voltage is above an acceptable charging voltage, the control module determines whether the MCAP charging circuit and/or the MCAP structure 26 are in a failure mode. If the MCAP charging circuit and/or the MCAP structure 26 is in a failure mode, the control module opens the MCAP structure 26 switch and may activate the first crowbar circuit. As another example, if the sensed voltage is below an acceptable charging voltage, the control module opens the MCAP structure 26 switch.

The first current sense circuit senses the current supply from the MCAP charging circuit to the MCAP structure 26 and provides the sensed current to the control module. As long as the sensed current is within the range of acceptable charge currents, the control module keeps the MCAP structure 26 switch closed and the first crowbar circuit disabled. If the sensed current is outside the range of acceptable charge currents, the control module makes a determination as to the appropriate course of action. For example, if the sensed current is above an acceptable charge voltage, the control module determines whether there is a short circuit condition. If there is a short circuit condition, the control module opens the MCAP structure 26 switch and disables the MCAP charging circuit and/or the MCAP structure 26.

The second voltage sense module monitors the MCAP voltage outputted by the MCAP structure 26 and provides the sense voltage to the control module. The control module compares the sensed voltage with a range of acceptable MCAP voltages. As long as the sensed voltage is within the range of acceptable MCAP voltages, the control module keeps the output switches closed and the second crowbar circuit disabled. If the sensed voltage is outside the range of acceptable MCAP voltages, the control module makes a determination as to the appropriate course of action. For example, if the sensed voltage is above an acceptable MCAP voltage, the control module determines whether the MCAP structure 26 and/or the DC-to-DC conversion system 28 are in a failure mode. If the MCAP structure 26 and/or the DC-to-DC conversion system 28 are in a failure mode, the control module opens the output switches and may activate the second crowbar circuit. As another example, if the sensed voltage is below an acceptable MCAP voltage, the control module opens the output switches.

The second current sense circuit senses the charge current from the MCAP structure 26 to the DC-to-DC conversion system 28 and provides the sensed current to the control module. As long as the sensed current is within the range of acceptable MCAP currents, the control module keeps the output switches closed and the second crowbar circuit disabled. If the sensed current is outside the range of acceptable MCAP currents, the control module makes a determination as to the appropriate course of action. For example, if the sensed current is above an acceptable MCAP current, the control module determines whether there is a short circuit condition. If there is a short circuit condition, the control module opens the output switches and disables the DC-to-DC conversion system 28 and/or the MCAP structure 26.

While the energy module 10 is shown with multiple voltage sense circuits, multiple current sensing circuits, and multiple crowbar circuits, the energy module 10 may include the first set of protection circuitry (e.g., the first voltage sense circuit, the first current sense circuit, and crowbar circuit) or the second set of protection circuitry. As another alternative, the energy module 10 may include the switches, the first voltage sense circuit, the second voltage sense circuit, the second current sense circuit, and the second crowbar circuit.

Figure 55:
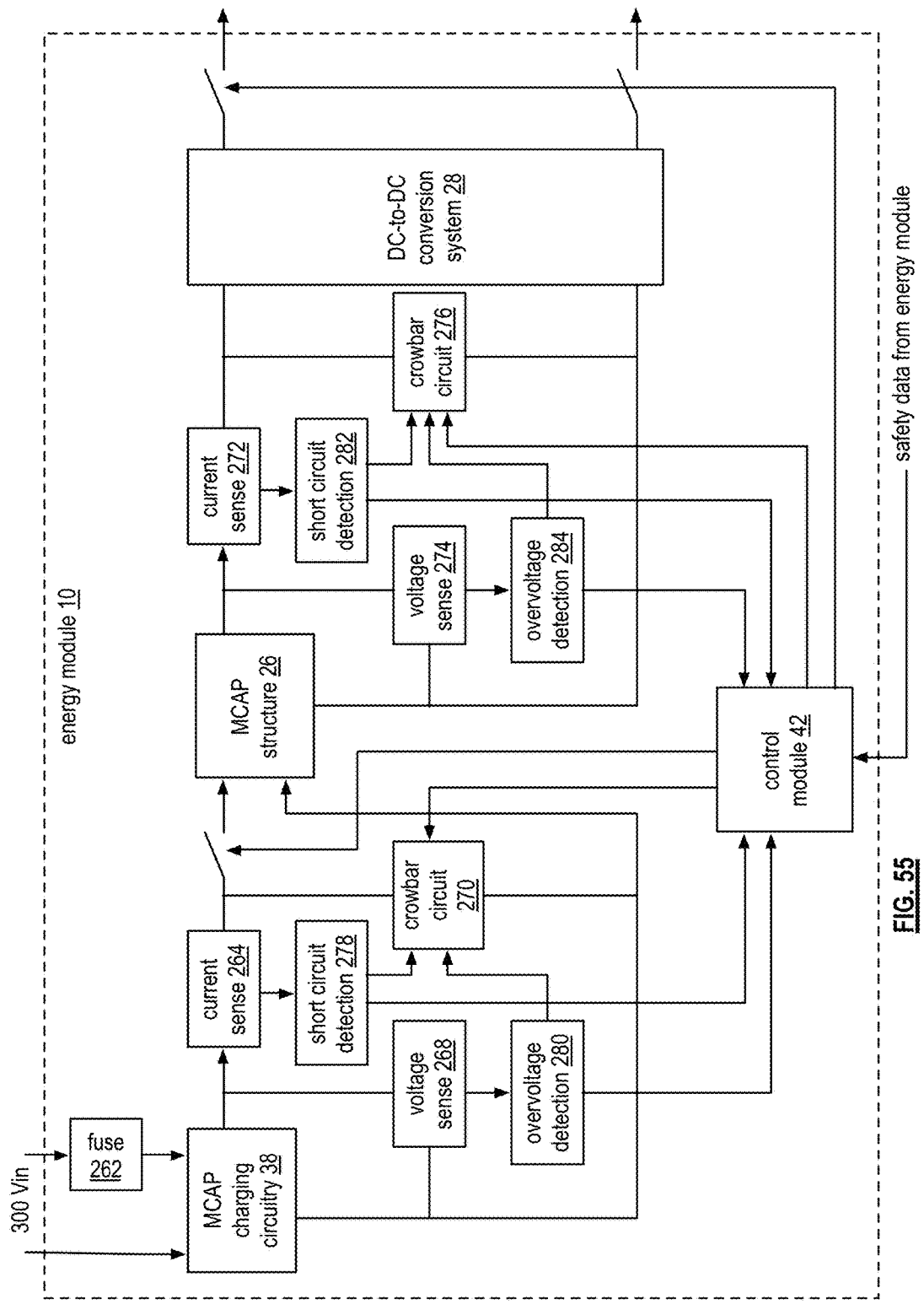
FIG. 55 is a schematic block diagram of another embodiment of an energy module in accordance with the present invention.

FIG. 55 is a schematic block diagram of another embodiment of an energy module. The energy module 10 includes the MCAP charging circuit 38, one or more current sense circuits 264, 272, one or more voltage sensing circuits 268, 274, one or more crowbar circuits 270, 276, an MCAP structure 26, a control module 42, one or more overvoltage detection circuits 280, 284, one or more short circuit detection circuits 278, 282, an MCAP structure 26 switch, the DC-to-DC conversion system 28, output switches, and fuse. The fuse, or circuit breaker, is coupled in series with an input of the MCAP charging circuit to protect the circuitry of the energy module 10 from over current conditions. Under normal operating conditions, the MCAP structure 26 provides a voltage to the DC-to-DC conversion system 28, which produces one or more supply voltages for powering a device 12. The remaining circuitry of the energy module 10 functions to protect the energy module 10 and/or the device 12 from an overvoltage condition and/or overcurrent condition.

In an example of operation, the first voltage sense module monitors the charge voltage outputted by the MCAP charging circuitry 38 and provides the sense voltage to the first overvoltage detection circuit. The first overvoltage detection circuit compares the sensed voltage with a range of acceptable charging voltages. As long as the sensed voltage is within the range of acceptable charging voltages, the first overvoltage detection circuit keeps the first crowbar circuit disabled. The first overvoltage detection circuit also provides signal to the control module indicating that the sensed voltage is within the acceptable range of voltages. Accordingly, the control module keeps the MCAP structure 26 switch closed.

If the sensed voltage is outside the range of acceptable charging voltages, the first overvoltage detection circuit enables the first crowbar circuit and provides an overvoltage indication to the control module. In response to the signal from the first overvoltage detection circuit, the control module opens the MCAP structure 26 switch. As another example, if the first overvoltage detection circuit determines that the sensed voltage is below an acceptable charging voltage, it provides a corresponding indication to the control module, which may open the MCAP structure 26 switch.

The first current sense circuit senses the current supply from MCAP charging circuitry 38 to the MCAP structure 26 and provides the sensed current to the first short circuit detection module. As long as the sensed current is within the range of acceptable charging currents, the first short circuit detection circuit keeps the MCAP structure 26 switch closed. The first short circuit detection circuit also provides an indication of the sensed current to the control module. If the sensed current is outside the range of acceptable charging currents (e.g., is high and appears to be a short circuit), the first short circuit detection circuit opens the MCAP structure 26 switch and provides a short circuit indication to the control module. In response to the short circuit indication, the control module determines whether to disable the MCAP charging circuitry 38, the MCAP structure 26, and/or the DC-to-DC conversion system 28 and/or determines whether to enable the first crowbar circuit.

The second voltage sense module monitors the MCAP voltage outputted by the MCAP structure 26 and provides the sense voltage to the second overvoltage detection circuit. The second overvoltage detection circuit compares the sensed voltage with a range of acceptable MCAP voltages. As long as the sensed voltage is within the range of acceptable MCAP voltages, the second overvoltage detection circuit keeps the output switches closed. If the sensed voltage is outside the range of acceptable MCAP voltages, the second overvoltage detection circuit opens the output switches and provides an overvoltage condition indication to the control module. The control module makes a determination as to the appropriate course of action. For example, if the sensed voltage is above an acceptable MCAP voltage, the control module determines whether the MCAP structure 26 is in a failure mode. If the MCAP structure 26 is in a failure mode, the control module activates the second crowbar circuit. As another example, if the second overvoltage detection circuit determines that the sensed voltage is below an acceptable MCAP voltage, it provides a corresponding indication to the control module, which may open the output switches.

The second current sense circuit senses the supply current from the MCAP structure 26 to the DC-to-DC conversion system 28 and provides the sensed current to the second short circuit detection circuit. As long as the sensed current is within the range of acceptable supply currents, the second short circuit detection circuit keeps the output switches closed. If the sensed current is outside the range of acceptable supply currents, the second short circuit detection circuit opens the output switches and provides a short circuit indication to the control module. In response to the short circuit condition, the control module may disable the MCAP structure 26 and/or disable the DC-to-DC conversion system 28.

While the energy module 10 is shown with multiple voltage sense circuits, multiple current sensing circuits, and multiple crowbar circuits, the energy module 10 may include the first set of protection circuitry (e.g., the first voltage sense circuit, the first current sense circuit, and crowbar circuit) or the second set of protection circuitry. As another alternative, the energy module 10 may include the switches, the first voltage sense circuit, the second voltage sense circuit, the second current sense circuit, and the second crowbar circuit.

Figure 56:
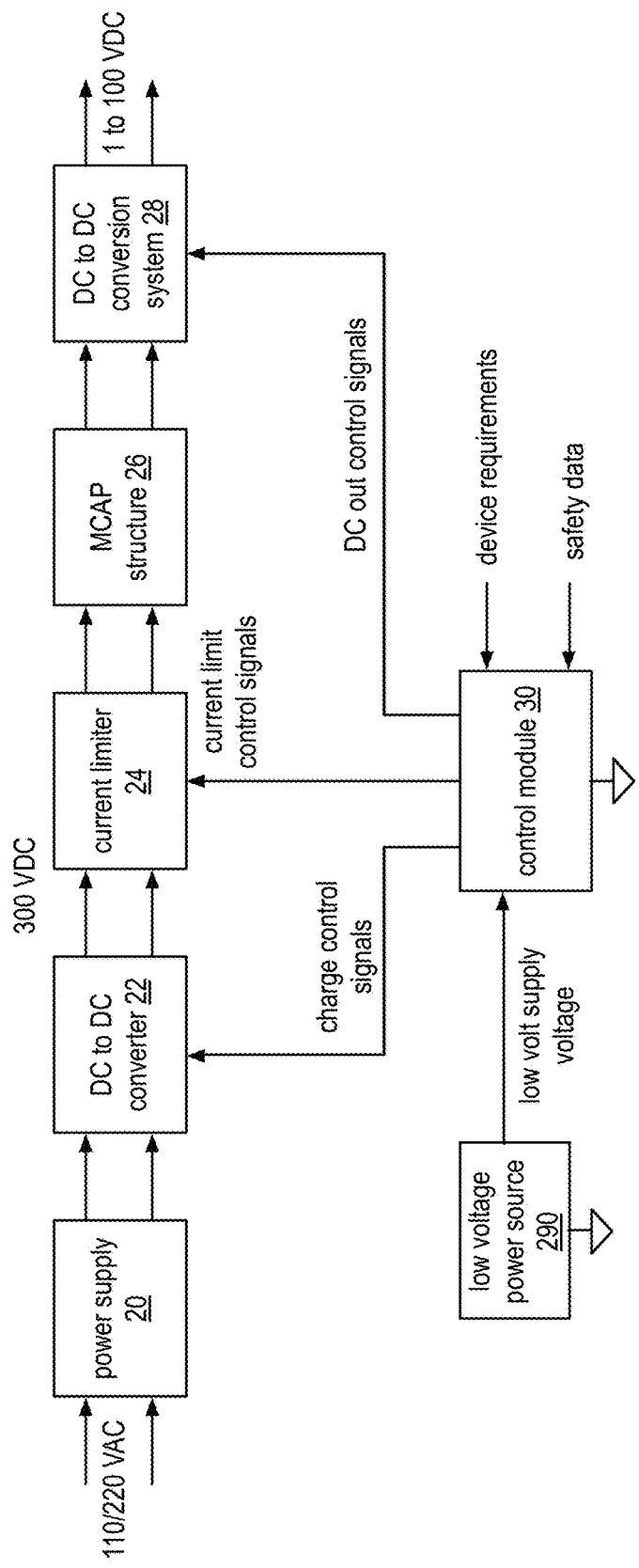
FIG. 56 is a schematic block diagram of another embodiment of an energy module and an energy module charger in accordance with the present invention.

FIG. 56 is a schematic block diagram of another embodiment of an energy module 10 coupled to an energy module charger 14. The charger 14 includes the power supply 20 (which may be the same of different power supply as power supply 32 and/or power supply 34) and a DC-to-DC converter 22. The energy module 10 includes MCAP structure 26 and a DC-to-DC conversion system 28. The current limiting circuit 24 is included in one or both of the energy module 10 and the charger 14. Each of the energy module 10 and charger 14 includes a control module 30, which are shown as a single module. To reduce energy drain on the MCAP structure 26 during times of inactivity, the system further includes a low voltage power source 290 (e.g., watch battery, other type of battery, a DC-to-DC converter 22, an MCAP structure 26, etc.) to power the control module 30.

In an example of operation, the control module 30 determines what features and/or functions that needs to be on for given operating conditions. For example, when the energy module 10 is being charged, the control module 30 determines that the power supply 20, DC-to-DC converter 22, and the current limiter 24 need to be active. As another example, when the energy module 10 is supplying power to a device 12, the MCAP structure 26 and the DC-to-DC conversion system 28 are active. When the energy module 10 is not being charged and is not supplying power to a device 12, the control module 30 determines what, if any, circuitry needs to be enabled.

As a specific example, the control module 30 may determine that the MC AP structure voltage should be monitored even though the energy module 10 is not being charged or supply power to a device 12. Accordingly, the control module 30 enables a high-voltage sensor to sense the voltage of the MCAP structure 26 and enables circuitry that interprets the sensed voltage. Such sensing circuitry may be periodically enabled and disabled to minimize drain on the MCAP structure 26.

Figure 57:
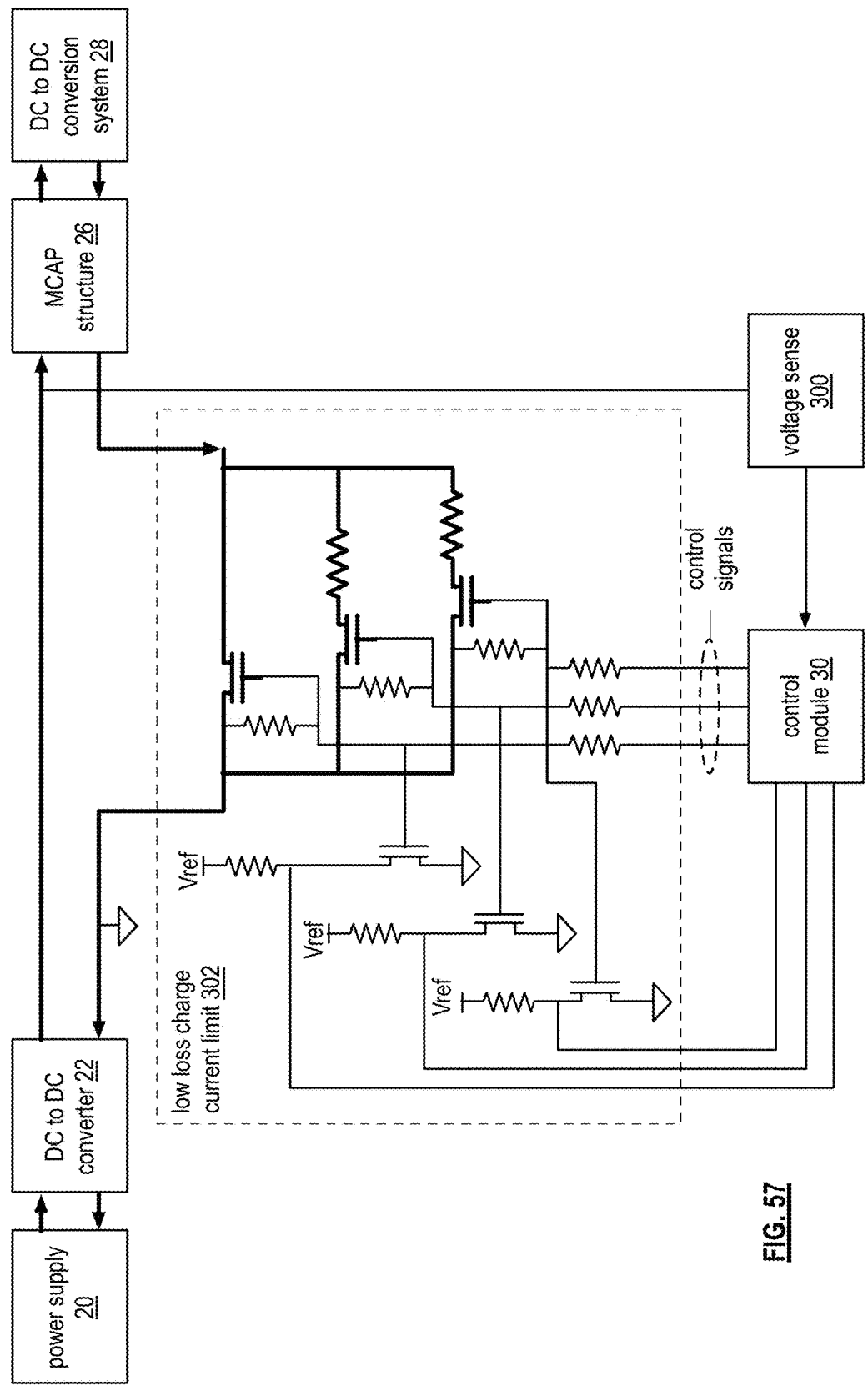
FIG. 57 is a schematic block diagram of another embodiment of an energy module and an energy module charger in accordance with the present invention.

FIG. 57 is a schematic block diagram of another embodiment of an energy module 10 and an energy module charger 14 sharing a low loss charge current limit circuit 302. The low loss charge current limit circuit 302 includes a plurality of power transistors, a plurality of power resistors, and a plurality of enabling circuits.

An example of operation, when the charge voltage is first applied to the MCAP structure 26, the control module 30 enables the low loss charge current limit circuit 302 in a low current limit setting. This is done to prevent damaging the MCAP structure 26 when charging commences. For example, the control module 30 enables a power transistor that is coupled to a power resistor having a resistance value that limits the current to a desired level. As the MCAP structure 26 is charged and its voltage increases, the control module 30 enables different power transistors associated with different power resistors having lower resistance values to provide desired current limit levels. When the MCAP structure 26 voltage reaches a sufficient level, the control module 30 enables the power transistor that has no associated power resistor thereby providing a minimum level of current limiting.

In addition to setting the current limit values, the control module 30 also monitors the current through the selected transistor via a current mirroring circuit. The control module 30 may use the measure current of the selected transistor to determine when to make a current limit adjustment. The control module 30 also receives a sensed voltage from the voltage sensing circuit, which senses the charge voltage provided to the MCAP structure 26 to produce the sensed voltage. Accordingly, the control module 30 may use a combination of the sensed voltage and the sensed current to determine when to make a current limit adjustment.

The current mirroring circuits may use a transistor that is a scaled version of the power transistor. For instance, the current mirror transistor may be $\frac{1}{10}$ two $\frac{1}{100}$ the size of the power transistor. In addition, the current mirroring circuits include a resistor, wherein the voltage drop across the resistor is representative of the mirrored current of the corresponding power transistor.

Note that the low loss charge current limit circuit may include more or less than three transistors are shown. Further note that the low loss charge current limit circuit may have multiple paths (e.g., transistor in series with a resistor) concurrently enabled to provide a more fine tuned current limit value. Still further note that thermistors may be used in conjunction with or in place of the resistors. Even further note that the control module 30 performs a make before break enablement of the power transistors within the low loss charge current limits.

Figure 58:
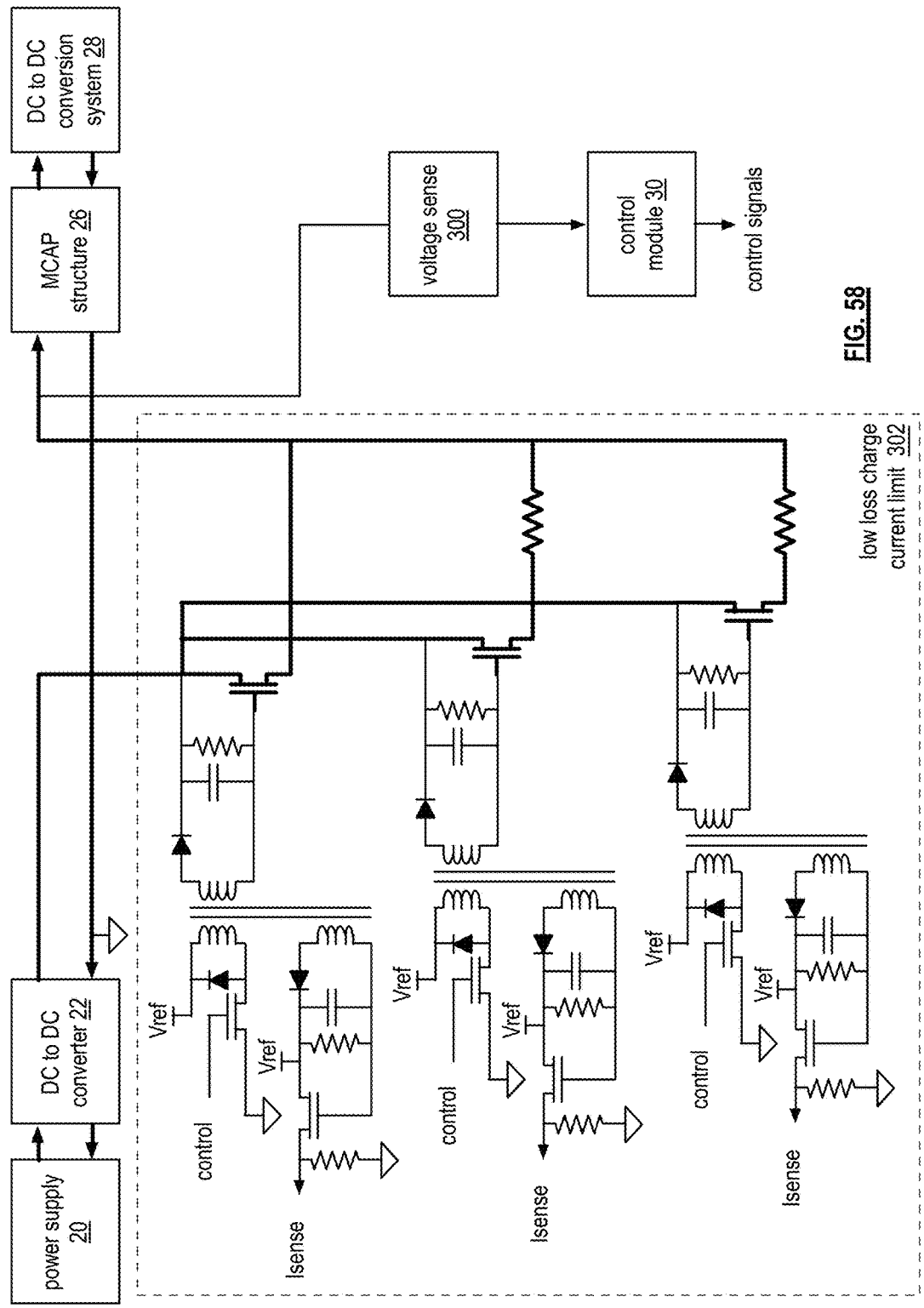
FIG. 58 is a schematic block diagram of another embodiment of an energy module and an energy module charger in accordance with the present invention.

FIG. 58 is a schematic block diagram of another embodiment of an energy module 10 and an energy module charger 14 coupled together via a low loss charge current limit circuit 302. In this embodiment, the low loss charge current limit circuit 302 is in the positive leg of the charge voltage providing to the energy module 10 and includes a plurality of power transistors, a plurality of power resistors, and a plurality of enabling circuits.

An example of operation, when the charge voltage is first applied to the MCAP structure 26, the control module 30 enables the low loss charge current limit circuit in a low current limit setting. This is done to prevent damaging the MCAP structure 26 when charging commences. For example, the control module 30 enables a power transistor that is coupled to a power resistor having a resistance value that limits the current to a desired level. As the MCAP structure 26 is charged and its voltage increases, the control module 30 enables different power transistors associated with different power resistors having lower resistance values to provide desired current limit levels. When the MCAP structure 26 voltage reaches a sufficient level, the control module 30 enables the power transistor that has no associated power resistor thereby providing a minimum level of current limiting.

In addition to setting the current limit values, the control module 30 also monitors the current through the selected transistor via a current mirroring circuit. The control module 30 may use the measured current of the selected transistor to determine when to make a current limit adjustment. The control module 30 also receives a sensed voltage from the voltage sensing circuit, which senses the charge voltage provided to the MCAP structure 26 to produce the sensed voltage. Accordingly, the control module 30 may use a combination of the sensed voltage and the sensed current to determine when to make a current limit adjustment.

The current mirroring circuits may use a transistor that is a scaled version of the power transistor. For instance, the current mirror transistor may be $\frac{1}{10}$ two $\frac{1}{100}$ the size of the power transistor. In addition, the current mirroring circuits include a resistor, wherein the voltage drop across the resistor is representative of the mirrored current of the corresponding power transistor.

Note that the low loss charge current limit circuit may include more or less than three transistors are shown. Further note that the low loss charge current limit circuit may have multiple paths (e.g., transistor in series with a resistor) concurrently enabled to provide a more fine tuned current limit value. Still further note that thermistors may be used in conjunction with or in place of the resistors. Even further note that the control module 30 performs a make before break enablement of the power transistors within the low loss charge current limits.

FIG. 59 is a schematic block diagram of an embodiment of an energy module voltage sensing circuit 300 that monitors the MCAP voltage. As previously discussed, the MCAP voltage may range from 300 V or more down to 30 V or less. Since the control module 30 is a low voltage device 12 (e.g., 3.3 V or less), the sensed MCAP voltage provided by the voltage sense circuit 300 needs to be in a range that is acceptable to the control module 30 (e.g., about ½ of the supply voltage of the control module 30). For example, if the desired representative MCAP voltage is 0.8 V+/−0.4 V, then the voltage sense circuit needs to have an adjustable divider ratio to accommodate the large swing of the MCAP voltage.

FIGS. 60, 61-A, and 61-B are schematic block diagrams of examples of operation of an energy module voltage sensing circuit with varying divider circuits. FIG. 60 illustrates a divide ratio for the voltage set circuit when the MCAP voltage is greater than 100 V. To obtain an MCAP sense voltage in the range of about 0.4 V to 1.2 V, a resistive divider ratio of 239:1 is used. As a specific example, a resistive divider of R1 and R2 may have R1 being a 250 K ohm resistor and R2 being a 59.75 M ohm resistor. In this example, when the MCAP voltage is at 300 V, the MCAP sense voltage is 1.25 V and the power consumption is about 1.5 mW. When the MCAP voltage is at 100 V, the MCAP sense voltage is at 0.416 V and the power consumption is about 0.5 mW.

FIG. 61-A illustrates a divide ratio for the voltage set circuit when the MCAP voltage is greater between 30 V and 100 V. To obtain an MCAP sense voltage in the range of about 0.4 V to 1.2 V, a resistive divider ratio of 79:1 is used. As a specific example, a resistive divider of R1 and R2 may have R1 being a 250 K ohm resistor and R2 being a 19.75 M ohm resistor. In this example, when the MCAP voltage is at 100 V, the MCAP sense voltage is 1.25 V and the power consumption is about 0.5 mW. When the MCAP voltage is at 30 V, the MCAP sense voltage is at 0.375 V and the power consumption is about 0.15 mW.

FIG. 61-B illustrates a divide ratio for the voltage set circuit when the MCAP voltage is greater between 10 V and 30 V. To obtain an MCAP sense voltage in the range of about 0.4 V to 1.2 V, a resistive divider ratio of 23:1 is used. As a specific example, a resistive divider of R1 and R2 may have R1 being a 250 K ohm resistor and R2 being a 5.75 M ohm resistor. In this example, when the MCAP voltage is at 30 V, the MCAP sense voltage is 1.25 V and the power consumption is about 150 μW. When the MCAP voltage is at 10 V, the MCAP sense voltage is at 0.416 V and the power consumption is about 50 μW.

As an alternative to using resistors for the voltage divider, capacitors may be used. For example, R2 may be replaced with a selectable capacitor bank to provide different capacitance values to achieve the different divider ratio and R1 may be replaced with a fixed capacitor. As another example, R2 may be replaced with a fixed capacitor and R1 may be replaced with a selectable capacitor bank to provide different capacitance values to achieve the different divider ratio.

FIG. 62 is a schematic block diagram of another embodiment of an energy module voltage sensing circuit 300 that is associated with a calibration circuit 308. The voltage sensing circuit 300 and the calibration circuit 308 are coupled to a control module 30. The voltage sensing circuit includes switch capacitor circuits 304, 306. The calibration circuit 308 includes a precision resistive divider (e.g., 5% or less tolerance), a transistor, and a fly back converter 310.

To calibrate the voltage sensing circuit, the control module 30 enables the flyback converter, which turns on the transistor allowing the resistive divide to provide a representative voltage of the MCAP voltage. The control module 30 receives the MCAP calibration voltage from the calibration circuit and disables the flyback converter. The control module 30 compares the MCAP calibration voltage to a MCAP sensed voltage produced by the voltage sensing circuit. If the voltages are within acceptable tolerances of each other (e.g., within 5% or less), then the control module 30 maintains the current settings for the control signals.

If, however, the MCAP calibration voltage and the MCAP sensed voltage are not within acceptable tolerances of each other, then the control module 30 adjusts the control signals for one or both of the switch capacitor circuits. In general, a switch capacitor circuit provides an impedance corresponding to R=1/(C*f), where R is the impedance, C is the capacitance, and f is the switching frequency. As such, the control module 30 is adjusting the switching frequency of one or both of the switch capacitor circuits to adjust one or both impedances to achieve a desired impedance divider. By using switch capacitor circuits within the voltage sense circuit, the power consumption is less than when a resistive divider is used. Further power savings can be obtained by periodically enabling the voltage sense circuit when operating conditions allow. For instance, when the MCAP voltage is being sensed to determine remaining "battery life", the voltage sensing circuit may be enabled once every time period (e.g., 1 second, 10 seconds, 30 seconds, 1 minute, etc.).

FIG. 63 is a schematic block diagram of another embodiment of an energy module voltage sensing circuit that includes two switch capacitor circuits and a plurality of mini flyback converters 310. Each switch capacitor circuit includes a capacitor structure (e.g., one or more capacitors) and switches (e.g., high voltage switches, transistors, etc.). Each mini flyback converter includes a switching transistor, a transformer, a clamping diode, a rectifying diode, and a capacitor. For example, the mini flyback converter is configured as the drive circuit for a power transistor as shown in FIG. 58. Note that optical couplers may be used as an alternative to the mini flyback converters.

In an example of operation and to achieve a 239:1 divider ratio for measuring the MCAP voltage above 100 V, the control module 30 generates four control signals (two for each switch capacitor circuit) at a 100 KHz. With C1 being a 40 pico-Farad capacitor and C2 being a 0.167 pico-Farad capacitor, the 239:1 divider ratio is obtained. In particular, during a first phase of a cycle, the control module 30 generates signals Φ1 and Φ4, which provides a charge to C2 from the MCAP voltage and provides a discharge to C1. Note that signals Φ1 and Φ4 may be narrow pulses to limit charge and discharge currents. During the next phase of the cycle, the control module 30 generates signals Φ2 and Φ3, which provides a discharge of C2 to C1.

To achieve a 79:1 divider ratio for measuring the MCAP voltage between 30 V and 100 V, the control module 30 generates four control signals (two for each switch capacitor circuit) at a 100 KHz. With C1 being a 40 pico-Farad capacitor and C2 being a 0.506 pico-Farad capacitor, the 79:1 divider ratio is obtained. In particular, during a first phase of a cycle, the control module 30 generates signals Φ1 and Φ4, which provides a charge to C2 from the MCAP voltage and provides a discharge to C1. Note that signals Φ1 and Φ4 may be narrow pulses to limit charge and discharge currents. During the next phase of the cycle, the control module 30 generates signals Φ2 and Φ3, which provides a discharge of C2 to C1. As an alternative to adjusting the capacitance of C2 or in addition thereto, the switching frequency for C2 may be changed. For instance, if C2 remains a 0.167 pico-Farad capacitor, the switching frequency may be adjusted to 33 KHz.

To achieve a 23:1 divider ratio for measuring the MCAP voltage between 10 V and 30 V, the control module 30 generates four control signals (two for each switch capacitor circuit) at a 100 KHz. With C1 being a 40 pico-Farad capacitor and C2 being a 1.74 pico-Farad capacitor, the 23:1 divider ratio is obtained. In particular, during a first phase of a cycle, the control module 30 generates signals Φ1 and Φ4, which provides a charge to C2 from the MCAP voltage and provides a discharge to C1. Note that signals Φ1 and Φ4 may be narrow pulses to limit charge and discharge currents. During the next phase of the cycle, the control module 30 generates signals Φ2 and Φ3, which provides a discharge of C2 to C1. As an alternative to adjusting the capacitance of C2 or in addition thereto, the switching frequency for C2 may be changed. For instance, if C2 remains a 0.167 pico-Farad capacitor, the switching frequency may be adjusted to 10 KHz.

The switch capacitor circuits of FIG. 63 are one type of switch capacitor circuit using example capacitance values and switching frequencies. Accordingly, alternative types of switch capacitor circuits may be used. Further, different frequencies and/or capacitance values may be used depending the application and/or desired operation.

FIG. 64 is a schematic block diagram of an embodiment of a capacitor circuit for use as C2 in the energy module voltage sensing circuit of FIG. 63. As shown, the capacitor circuit includes a plurality of capacitors and switches. To achieve different capacitance values, the capacitors may be coupled in series and/or in parallel. Further note that the capacitors may be conventional capacitors and/or may be varactors.

FIG. 65 is a schematic block diagram of another embodiment of an energy module 10 and a device 12. The energy module 10 includes the MCAP structure 26, the DC-to-DC conversion system 28, the control module 30, the security module 146, the MCAP charging circuitry 38, and an interface 312. The device 12 includes an interface 314, a power module 152, a processing module 316, memory 318, user input/output (IO) module 320, and device specific circuitry 322. The memory stores one or more software applications 324.

In an example of operation, the energy module 10 and the device 12 share data via the communication link. The data may be a variety of pieces of information. For example, the device 12 provides input voltage information to the energy module, which specifies a desired input voltage level, a desired current limit, etc. Within the device 12, the power unit distributes supply voltages to the various components of the device 12. The power unit may include one or more DC-to-DC converters, one or more linear regulators, etc., to produce the supply voltages. The power unit may perform a power management function to insure that each component is receiving a minimally appropriate amount of power to perform its task(s).

As an alternative to have a power unit in the device 12, the energy module 10 performs the function of a power unit for the device 12. In particular, the energy module 10 generates the desired supply voltages and performs the desired current limiting functions. In addition, the energy module 10 may perform the power management function for the device 12 to insure that each component of the device 12 is receiving a minimally appropriate amount of power to perform its task(s).

As another example, the device 12 provides information regarding the type of battery the device 12 conventionally powered by and provides an indication regarding emulating the battery discharge pattern. In this instance, the control module 30 monitors the MCAP voltage and adjusts the DC-to-DC conversion system 28 such that it output voltages resemble the battery discharge pattern. An example of this was provided with reference to FIGS. 31 and 32.

To facilitate the power management function, the device 12 provides the energy module 10 with data regarding module-by-module power consumption, device use, application use, duration of use, network communications, and any other data regarding functionality and/or use of the device 12. From this information, the energy module 10 calculates the rate of consumption of energy and calculates remaining use time. In addition, the energy module 10 may determine its remaining life cycle (i.e., how many more times it can be recharged and, based on recharge frequency, how many more days, months, and/or years the energy module 10 has of serviceable life).

As another example, the energy module 10 provides a history of energy consumption to the device 12 and an interpretation thereof. The interpretation may include information regarding power consumption per application, power consumption for different times of the day, remaining power, etc. Based on these inputs, the device 12 may alter its performance to extend the remaining power.

The data is conveyed between the energy module 10 and the device 12 using the security information stored on the security module of the energy module. Use of this type of security module was discussed with reference to FIG. 40.

FIG. 66 is a schematic block diagram of another embodiment of an energy module 10 and a device 12. This embodiment functions similarly with respect to the embodiment of FIG. 65, but employs a different scheme for securely conveying data between the energy module 10 and the device 12. In this embodiment, the device 12 and energy module 10 include security modules 146, 156 as previously discussed with references to FIG. 42 and/or 43.

FIG. 67 is a schematic block diagram of another embodiment of an energy module 10, an energy module charger 14, and a device 12. In this embodiment, the high voltage connector for the energy module 10 is used to couple to the charger 14 during charging of the energy module 10 and is used to for coupling to the device 12 during use of the energy module. The high voltage connectors 180, 182 may be similar to the type of connectors discussed with reference to FIGS. 45-49.

FIG. 68 is a schematic block diagram of an embodiment of a high voltage energy module 10 that includes a plurality of MCAP blocks. Each MCAP block includes a plurality of MCAPs. Using a selected number of MCAP blocks, determining the coupling between the MCAP blocks, and determining the coupling of MCAPs within an MCAP block, almost any desired voltage for the high voltage rail may be obtained.

For example, if the high voltage energy module 10 is being used for a 40 KW*hr home backup generator, then it may be desirable to have the rail voltage be 1200 VDC. The 1200 VDC rail can be achieved by coupling 4 MCAPs charged to 300 V in series. The desired power level dictates how many parallel combinations of the 4 MCAPs in series are used. For instance, an MCAP includes a plurality of MCAP cells, where an MCAP cell is a 1 $cm^2$ CMOS device that yields 5 W*hours of power. If an MCAP includes 100 MCAP cells, then it has 500 W*hours of power. From these assumptions and for this example, 80 parallel combinations of the 4 MCAPs in series would be needed to produce 40 KW*hours of power.

FIG. 69 is a schematic block diagram of an embodiment of uninterruptable power system that includes a high voltage energy module 330, an inverter 332, a charger 14, and a VAC switch 334. The inverter may be a switch mode inverter operable to convert a DC voltage into an AC voltage. The charger 14 may be similar to the types already discussed or to be discussed.

In an example of operation, when conventional 110 VAC or 220 VAC is present, the VAC switch couples the 110 VAC or 220 VAC to the charger 14 and disconnects the output of the inverter. In this mode, the high voltage MCAP block structure is being charged. When AC power is lost or interrupted, the inverter is enabled and the charger 14 is disabled. In addition, the VAC switch couples the output of the inverter to the power lines within the home (or other area being serviced).

FIG. 70 is a schematic block diagram of an embodiment of a power tool 340 that includes a high voltage energy blocks 330, power control DC motor drive circuit 342, and a DC motor 344. The high voltage MCAP blocks is a structure similar to the one depicted in FIG. 68 to produce a desired DC voltage (e.g., 300 V to 1200 V, or more). The DC motor may be a brushed DC motor, a brushless DC motor, homopolar DC motor, a ball bearing DC motor, or any other type of DC motor to produce the desired power, revolutions per minute (RPMs), torque, etc.

In an example of operation, the power control DC motor drive circuit receives user inputs and a DC supply voltage from the high voltage MCAP blocks. The user inputs include one or more of: on/off, forward/reverse, increase RPMs, decrease RPMs, increase power, decrease power, etc. Based on the user inputs, the power control DC motor drive circuit converts the DC supply voltage into a DC motor drive signal. For example, the DC motor drive signal is a current signal that is switched on and off, thereby switching on and off the magnetic field of the stator, which causes the armature to move. As another example, the DC motor drive signal is a current signal that has its direction through the coil of the stator reversed (e.g., $0°$ and $180°$), which causes the armature to move.

As the user inputs change, the power control DC motor drive circuit changes the DC motor drive signal. For example, of the user input changes from a forward direction to a reverse direction, the power control DC motor drive circuit changes the DC motor drive signal to the current flow through the coil of the stator (e.g., reverse the direction of the magnetic field), thereby causing the armature to rotate in the opposite direction. As another example, if the user input is to increase power, the power control DC motor drive circuit creates the DC motor drive signal to have a higher current level, thereby increasing the strength of the magnetic field.

The power control DC motor drive circuit also includes circuitry to protect against an overvoltage condition, a short circuit condition, or other error condition that may potentially damage the MCAP blocks and/or the motor. For instance, the power control DC motor drive circuit may include protection circuitry as discussed with reference to one or more of FIGS. 50-58. An example embodiment of the power control DC motor drive circuit will be described with reference to FIG. 74.

FIG. 71 is a schematic block diagram of an embodiment of a power tool that includes a high voltage MCAP blocks 330, power control AC motor drive circuit 346, and an AC motor 348. The high voltage MCAP blocks is a structure similar to the one depicted in FIG. 68 to produce a desired DC voltage (e.g., 300 V to 1200 V, or more). The AC motor may be a single phase or multiple phase induction motor, a single phase or multiple phase synchronous motor, a universal motor (AC or DC), a repulsion motor, or any other type of AC motor to produce the desired power, revolutions per minute (RPMs), torque, etc.

In an example of operation, the power control AC motor drive circuit receives user inputs and a DC supply voltage from the high voltage MCAP blocks. The user inputs include one or more of: on/off, forward/reverse, increase RPMs, decrease RPMs, increase power, decrease power, etc. Based on the user inputs, the power control AC motor drive circuit converts the DC supply voltage into an AC motor drive signal. For example, the AC motor drive signal is a sinusoidal signal that is provided to the coils of the stator to produce the desired magnetic field, which causes the rotor to move.

As the user inputs change, the power control AC motor drive circuit changes the AC motor drive signal. For example, of the user input changes from a forward direction to a reverse direction, the power control AC motor drive circuit changes the polarity of the AC motor drive signal to reverse the current flow through the coil(s) of the stator (e.g., reverse the direction of the magnetic field), thereby causing the rotor to rotate in the opposite direction. As another example, if the user input is to increase the speed, the power control AC motor drive circuit creates a higher frequency AC motor drive signal (the speed of an AC motor is primarily determined by the frequency of the AC signal and the number of poles of the stator coil(s)).

The power control AC motor drive circuit also includes circuitry to protect against an overvoltage condition, a short circuit condition, or other error condition that may potentially damage the MCAP blocks and/or the motor. For instance, the power control AC motor drive circuit may include protection circuitry as discussed with reference to one or more of FIGS. 50-58.

FIG. 72 is a diagram of an example of current for a power tool that includes a high voltage energy module 10 and a DC motor. The example current diagram includes an in-rush current when the power tool is turned on; includes a steady-state current when the power tool is being used at a constant power level; includes a relatively long burst current when more power is requested of the power tool; and includes a relatively short burst current.

The current variations of this example are typical for a power tool. Accordingly, the power control DC motor drive circuit needs to allow for these current conditions to occur, while still protecting the MCAP blocks and the motor from damage. For example, each of these conditions is predicated by a change in a user input (e.g., turn on, increase power, change direction, etc.). Knowing the requested action and the corresponding current pattern, the power control DC motor drive circuit adjusts its levels for overvoltage protection and/or overcurrent protection based on the known current pattern. As a specific example, in-rush current may be 10-15 times a steady state current level, but only lasts for a short period of time (e.g., typically less than a few seconds). Thus, the power control DC motor drive circuit adjusts the current limit threshold high enough to allow for the in-rush current to safely occur, but does so for a short period of time.

FIG. 73 is a diagram of an example of current for a power tool that includes a high voltage energy module and an AC motor. The example current diagram includes an in-rush current when the power tool is turned on; includes a steady-state current when the power tool is being used at a constant power level; and includes a burst current when more power is requested of the power tool.

The current variations of this example are typical for a power tool. Accordingly, the power control AC motor drive circuit needs to allow for these current conditions to occur, while still protecting the MCAP blocks and the motor from damage. For example, each of these conditions is predicated by a change in a user input (e.g., turn on, increase power, change direction, etc.). Knowing the requested action and the corresponding current pattern, the power control AC motor drive circuit adjusts its levels for overvoltage protection and/or overcurrent protection based on the known current pattern. As a specific example, in-rush current may be 10-15 times a steady state current level, but only lasts for a short period of time (e.g., typically less than a few seconds). Thus, the power control AC motor drive circuit adjusts the current limit threshold high enough to allow for the in-rush current to safely occur, but does so for a short period of time.

FIG. 74 is a schematic block diagram of another embodiment of a power tool that includes a high voltage energy module (e.g., MCAP structure 26 or MCAP blocks 330), the power control DC motor drive circuit, and a DC motor 344. The power control DC motor drive circuit includes a full bridge switching circuit 70, switching transistors, a switch mode regulation circuit 78, a transformer assembly, a current control module 350, a dependent current source, and a polarity coupling circuit 352. The transformer assembly includes a primary winding, a plurality of secondary windings, rectifying circuitry (not shown), filtering capacitors, and selection switches.

In an example of operation, the full bridge switching circuit, the switching transistors, the switch mode regulation circuit, and the transformer assembly function similarly to the DC-to-DC power conversion system of one or more of FIGS. 20-26 to produce a controlled output voltage. Alternatively, the MCAP structure 26 is configurable as discussed with reference to FIGS. 28 and 29 and the full bridge switching circuit, the switching transistors, the switch mode regulation circuit, and the transformer assembly function similarly to the DC-to-DC power conversion system of FIG. 30 to produce a controlled output voltage.

The controlled output voltage is provided to the dependent current source, which generates a current at a level dictated by the current control module. The current control module determines the particular current level based on the user inputs. In addition, the current control module provides a signal to the polarity coupling circuit to indicate the polarity of the current provided to the DC motor. For example, the polarity coupling circuit, in accordance with the control signal, periodically switches on and off the supplying of current to the DC motor. This effectively switches on and off the magnetic field of the stator, which causes the armature to move. As another example, the polarity coupling circuit, in accordance with the control signal, periodically changes the polarity of the current provided to the DC motor. This effectively changes the polarity of the magnetic field of the coil of the stator reversed (e.g., $0°$ and $180°$), which causes the armature to move.

As the user inputs vary, the control module 30 adjusts the level of the current being supplied to the DC motor, the direction of the current provided to the DC motor (e.g., for forward or reverse operation), and/or a combination thereof. In addition, the level of the controlled output voltage may be adjusted based on the user inputs to provide more or less power to the DC motor.

FIG. 75 is a schematic block diagram of an embodiment of an energy module 10 and a DC powered radio frequency (RF) device 12. The RF device 12 may be any portable device that includes cellular telephony functionality, a wireless local area network (WLAN) access point, a WLAN device, a Bluetooth device, and/or other wireless communication protocol based device. The energy module, which includes the DC-to-DC conversion system 28, powers the RF device 12. Due to the switching natures of the DC-to-DC conversion system 28, it may produce signals that interfere with the operation of the RF device 12.

For instance and as shown in FIG. 76, the DC-to-DC conversion system 28 is switched a lower frequency than the RF band of operation of the RF device 12. Harmonic frequencies of the switching frequency, however, may fall within the RF band. When this occurs, the harmonic frequency of the DC-to-DC conversion system 28 may interfere with the transmission and/or reception of signals in the RF band.

One obvious solution is to select a switching frequency for the DC-to-DC conversion system 28 that does not have a harmonic frequency in the RF band. This, however, is not always possible, and is less and less possible as the RF band increases (e.g., wide band devices are continually increasing their RF band of operation). FIGS. 77-80 present a method for eliminating or substantially reducing interference of the RF device 12 causes by the DC-to-DC conversion system 28.

The method begins at step 360 by determining whether a harmonic frequency of the DC-to-DC conversion system 28 falls within the RF band of operation of the RF device 12. If so, the method continues at step 362 by determining whether the harmonic frequency is interfering with transmitting signals by the RF device 12. If yes, the method continues at step 364 by determining whether the RF device 12 is transmitting at a maximum power. If not, the method continues at step 366 where the transmitting power is increased and the method repeats by determining whether the increased power overcomes the interference produced by the DC-to-DC conversion system 28.

If the transmit power is at a maximum level and the harmonic frequency of the DC to DC conversion system is interfering with transmission of signals by the RF device 12, the method continues at step 370 by adjusting the switching frequency of the DC to DC conversion system. The adjusting of the switching frequency at step 372 may not take the harmonic frequency outside of the RF band but may move it within the RF band to decrease its level of interference.

If adjusting the switching frequency does not reduce the interference to an acceptable level, the method continues at step 374 by determining whether the DC-to-DC conversion system 28 can be turned off for the transmission. If so, the method continues at step 376 where the DC-to-DC conversion system 28 is turned off (i.e., the switching frequency is disabled) for the transmission and then re-enabled once the transmission is completed.

If the DC to DC conversion system cannot be turned off for the transmission (e.g., the supply voltage produced by the DC to DC conversion system will drop to an unacceptable level during the transmission), the method continues at step 378 by determining whether the transmission channel can be changed. If so, the method continues at step 380 by changing the channel and determining whether the switching frequency harmonic is not interfering with the transmission.

If the transmission channel cannot be changed, the method continues at step 382 by determining whether the interference is unacceptable. If it is, the transmission is ended. If not, the method repeats by determining whether the switching frequency can be adjusted, the switching frequency can be disabled, and/or the transmission channel can be changed.

If the switching harmonic is not interfering with transmission, the method continues at step 368 by determining whether the switching harmonic is interfering with reception of signals. If so, the method continues at step 384 in FIG. 78 where a determination is made as to whether the switching frequency can be adjusted to reduce the harmonic interference. If so, the method continues at step 386 by adjusting the switching frequency and determining whether the harmonic interference is at or below an acceptable level.

If the switching frequency cannot be adjusted to reduce the harmonic interference, the method continues at step 388 by determining whether the switching frequency can be disabled during reception of signals. If so, the method continues at step 390 where the switching frequency is disabled during the reception of signals. If not, the method continues at step 392 by determining whether the received channel can be changed. If the received channel can be changed, the method continues at step 394 by changing the received channel and determining whether that reduces the harmonic interference to an acceptable level.

If the received channel cannot be changed, the method continues at step 396 by determining whether the harmonic interference is unacceptable. If it is, the reception of signals is ended. If, however, the interference is not unacceptable, the method continues by trying to reduce the level of harmonic interference.

FIG. 79 illustrates a logic diagram for adjusting the switching frequency of the DC-to-DC conversion system 28 to reduce harmonic interference with transmission of signals. This begins at step 400 by determining whether the switching frequency can be moved to produce harmonic frequencies that are outside of the RF band. If so, the method continues at step 402 where the switching frequency is changed. In most cases, the switching frequency cannot be changed to produce harmonic frequencies that are outside of the RF band. When this occurs, the method continues at step 404 by determining whether the switching frequency can be adjusted to move a harmonic frequency to an unused channel within the RF band. If so, the switching frequency is accordingly adjusted.

If the switching frequency cannot be adjusted to move a harmonic frequency to an unused channel, the method continues at step 406 by determining whether the switching frequency can be moved to correspond to a channel boundary (e.g., boundary between two channels). If so, the switching frequency is accordingly adjusted and the method continues by determining whether such an adjustment reduced the harmonic interference.

FIG. 80 illustrates a logic diagram for adjusting the switching frequency of the DC-to-DC conversion system 28 to reduce harmonic interference with reception of signals. This begins at step 408 by determining whether the switching frequency can be moved to produce harmonic frequencies that are outside of the RF band. If so, the method continues at step 410 where switching frequency is changed. In most cases, the switching frequency cannot be changed to produce harmonic frequencies that are outside of the RF band. When this occurs, the method continues at step 412 by determining whether the switching frequency can be adjusted to move a harmonic frequency to an unused channel within the RF band. If so, the switching frequency is accordingly adjusted.

If the switching frequency cannot be adjusted to move a harmonic frequency to an unused channel, the method continues at step 414 by determining whether the switching frequency can be moved to correspond to a channel boundary (e.g., boundary between two channels). If so, the switching frequency is accordingly adjusted and the method continues by determining whether such an adjustment reduced the harmonic interference.

If the switching frequency cannot be adjusted to move a harmonic frequency to a channel boundary, the method continues at step 416 by determining whether the switching frequency can be adjusted to move the harmonic frequency to a transmission channel. If so and the harmonic frequency does not adversely affect transmission, the switching frequency is adjusted.

FIG. 81 is a schematic block diagram of an embodiment of a power grid having an MCAP based generating station that includes an MCAP based generating station 420, a step up inverter 422, and one or more of each of: a transmission customer centers 424, a substation step down transformer 426, a sub-transmission customer 428, a primary customer 430, a local transformer 432, and a secondary customer 434.

In an example of operation, the MCAP-based generating station includes a plurality of MCAP blocks to generate a high DC voltage at a substantial power level. For example, the MCAP-based generating station may generate a DC voltage in a range of 1200 V to 36,000 V or more and at a power level to power a geographic area for weeks to months. To achieve enough power to provide 10,000 homes with power for a month (assuming the average home consumes 900 KW*hrs per month), the MCAP based generating station would need to provide 9,000,000 Kilo-Watt*hrs.

With a 1 $cm^2$ die yielding a 5 W*hr MCAP cell and with a die thickness of 0.2 mm, 1 $cm^3$ yields a 250 W*hr MCAP cell. Accordingly, a 1 $m^3$ block of MCAP cells produces (100*100*100)*250 W*hrs or 250,000 KW*hrs of power.

Thus, to provide 10,000 homes power for a month, the MCAP-based generating station would be 36 cubic meters in size.

The step up inverter converts the output voltage of the MCAP-base generating station to a high voltage AC voltage (e.g., 138 KV, 230 KV, etc.). The high-voltage AC voltage is transmitted from the step up converter to a substation step down transformer via high voltage transmission lines. The substation step down transformer steps down the high-voltage to a lower high-voltage level (e.g., 4 KV, 9 KV, 13 KV, 20 KV, etc.). For residential use, a local transformer converts the output of the substation step down transformer to 120 V or 240 V.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

The invention claimed is:

1. An energy module comprises:
a capacitance-based power source structure that includes a magnetic capacitor, wherein the magnetic capacitor includes a plurality of nanocells, wherein a nanocell of the plurality of nanocells includes two magnetic conductors and a dielectric having a magnetic-dielectric constant, wherein a magnetic conductor of the two conductors includes a plurality of thin film layers, wherein a first layer of the plurality of thin film layers is a metal layer and a second layer of the plurality of layers is a magnetic layer, wherein the capacitance-based power source structure is operable to:
supply a voltage when the energy module is in a voltage supply mode, wherein, when substantially fully charged, the voltage is at least 48 volts; and
receive a charge when the energy module is in a charge mode;
charging circuitry operable to provide a regulated charge voltage to the capacitance-based power source structure when the energy module is in the charge mode;
a DC-to-DC conversion system operable to convert the voltage into one or more regulated supply voltages when the energy module is in the voltage supply mode; and
an energy control module operable to determine the voltage supply mode and the charge mode.

2. The energy module of claim 1, wherein the capacitance-based power source structure further comprises one or more of:
a plurality of battery cells;
a plurality of capacitor cells;
a plurality of solar cells; and
a plurality of hydrogen cells.

3. The energy module of claim 1, wherein the capacitance-based power source structure comprises:
a plurality of energy source cells interoperably coupled to produce the voltage; and
a configuration module operably coupled to the plurality of energy source cells to adjust configuration of the plurality of energy source cells to maintain a voltage range as the plurality of energy source cells are discharged.

4. The energy module of claim 1, wherein the DC-to-DC conversion system comprises:
a configurable infrastructure to maintain the one or more regulated supply voltages at a desired level when, during discharging of the capacitance-based power source structure to supply the voltage, the voltage decreased by factor of at least three.

* * * * *